United States Patent
Nakayama et al.

(10) Patent No.: US 7,829,494 B2
(45) Date of Patent: Nov. 9, 2010

(54) CATALYST FOR SYNTHESIZING CARBON NANOCOILS, SYNTHESIZING METHOD OF THE SAME, SYNTHESIZING METHOD OF CARBON NANOCOILS, AND CARBON NANOCOILS

(75) Inventors: Yoshikazu Nakayama, Hirakata (JP); Lujun Pan, Sakai (JP); Toshikazu Nosaka, Izumi (JP); Osamu Suekane, Sakai (JP); Nobuharu Okazaki, Kurashiki (JP); Takeshi Nagasaka, Tokyo (JP); Toshiki Goto, Osaka (JP); Hiroyuki Tsuchiya, Kyoto (JP); Takashi Okawa, Osaka (JP); Keisuke Shiono, Osaka (JP)

(73) Assignees: Japan Science and Technology Agency, Kawaguchi (JP); Public University Corporation, Osaka Prefecture University, Sakai, Osaka (JP); Otsuka Chemical Co., Ltd., Osaka (JP); Nissin Electric Co., Ltd., Kyoto (JP)

( * ) Notice: Subject to any disclaimer, the term of this patent is extended or adjusted under 35 U.S.C. 154(b) by 618 days.

(21) Appl. No.: 10/558,291

(22) PCT Filed: May 28, 2004

(86) PCT No.: PCT/JP2004/007797

§ 371 (c)(1),
(2), (4) Date: Dec. 5, 2006

(87) PCT Pub. No.: WO2004/105940

PCT Pub. Date: Dec. 9, 2004

(65) Prior Publication Data

US 2007/0098622 A1    May 3, 2007

(30) Foreign Application Priority Data

May 29, 2003  (JP) ............................ 2003-152297
Feb. 18, 2004  (JP) ............................ 2004-040736
Feb. 18, 2004  (JP) ............................ 2004-040852

(51) Int. Cl.
*B01J 21/18*  (2006.01)
(52) U.S. Cl. .................. 502/100; 502/177; 502/355; 502/349; 423/447.3
(58) Field of Classification Search .......... 423/447.3, 423/447.1; 502/100, 177, 355, 349
See application file for complete search history.

(56) References Cited

U.S. PATENT DOCUMENTS

| | | | |
|---|---|---|---|
| 3,520,829 A | 7/1970 | Mulaskey | |
| 4,737,480 A | 4/1988 | Frame et al. | |
| 4,795,851 A | 1/1989 | Frame et al. | |
| 6,037,295 A | 3/2000 | Satyavathi et al. | |
| 6,461,539 B1 * | 10/2002 | Gaffney | ............ 252/373 |
| 7,384,470 B2 * | 6/2008 | Binkle et al. | ............ 106/286.8 |
| 2002/0136953 A1 * | 9/2002 | Vaughey et al. | ............ 429/218.1 |
| 2003/0008772 A1 * | 1/2003 | Ma et al. | ............ 502/180 |
| 2003/0010279 A1 * | 1/2003 | Nakayama et al. | ............ 117/84 |
| 2003/0012721 A1 * | 1/2003 | Nakayama et al. | ............ 423/447.3 |
| 2003/0109382 A1 * | 6/2003 | Nakayama et al. | ............ 502/336 |
| 2003/0186522 A1 * | 10/2003 | Duan et al. | ............ 438/584 |
| 2007/0253890 A1 * | 11/2007 | Nakayama et al. | ............ 423/447.3 |

FOREIGN PATENT DOCUMENTS

| | | |
|---|---|---|
| CN | 1036147 A | 10/1989 |
| GB | 1557142 | 12/1979 |
| JP | 10-37024 A | 2/1998 |
| JP | 2001-192204 A | 7/2001 |
| JP | 2001-310130 A | 11/2001 |
| JP | 2002-255519 A | 9/2002 |
| JP | 2003-26410 A | 1/2003 |
| JP | 2003-200053 A | 7/2003 |
| JP | 2003-313017 A | 11/2003 |
| JP | 2004-105827 A | 4/2004 |
| WO | WO-89/04818 A1 | 6/1989 |
| WO | WO-2005/118473 A1 | 12/2005 |

OTHER PUBLICATIONS

J.F. Colomer et al., Proceedings-Electrochemical Society, 1998, vol. 98-8, pp. 830 to 842.
X. Chen et al., Proceedings-Electrochemical Society, 2000, vol. 2000-13, pp. 385 to 392.
S. Motojima et al., Carbon, 1996, vol. 34, No. 3, pp. 289 to 296.
Fonseca et al., J. of Molecular Catalysis A: Chemical, vol. 107, pp. 159-168, (1996).
Hernadi et al., Zeolites, vol. 17, pp. 416-423, (1996).
S. Hoyokawa et al., The Japan Society of Applied Physics and Related Societies, No. 2, Mar. 27, 2003 p. 1040, 30a-ZG-9 with English translation.

(Continued)

*Primary Examiner*—Timothy C Vanoy
*Assistant Examiner*—Michelle Hou
(74) *Attorney, Agent, or Firm*—Birch, Stewart, Kolasch & Birch, LLP

(57)  ABSTRACT

A method for synthesizing carbon nanocoils with high efficiency, by determining the structure of carbon nuclei that have been attached to the ends of carbon nanocoils and thus specifying a true catalyst for synthesizing carbon nanocoils is implemented. The catalyst for synthesizing carbon nanocoils according to the present invention is a carbide catalyst that contains at least elements (a transition metal element, In, C) or (a transition metal element, Sn, C), and in particular, it is preferable for the transition metal element to be Fe, Co or Ni. In addition to this carbide catalyst, a metal catalyst of (Fe, Al, Sn) and (Fe, Cr, Sn) are effective. From among these, catalysts such as $Fe_3InC_{0.5}$, $Fe_3InC_{0.5}Snw$ and $Fe_3SnC$ are particularly preferable. The wire diameter and the coil diameter can be controlled by using a catalyst where any of these catalysts is carried by a porous carrier.

10 Claims, 31 Drawing Sheets

OTHER PUBLICATIONS

K. Nishimura et al., The Japan Society of Applied Physics and Related Societies, No. 2, Mar. 27, 2003, p. 1040, 30a-Zg-11 with English translation.

X. Li et al., The Japan Society of Applied Physics and Related Societies, No. 2, Mar. 27, 2003, p. 1039, 30a-Zg-8 with English translation.

Partial English translation of DE 198 534 91 A1 published May 25, 2000.

Chinese Office Action issued on Apr. 13, 2010 in corresponding Chinese Application No. 200810110284.4 with its English translation.

* cited by examiner $Fe_3InC_{0.5}$ formed at 650°C $Fe_3InC_{0.5}$ formed at 700°C (16A)

(16B)

(17A)

(17B)

(19a) Fe—In—Sn—O (19b) Fe—Al—Sn—O (19c) Fe—Cr—Sn—O (19d) Fe—Sn—O (20a) Fe—Al—Sn—O (20b) Fe—In—Sn—O (21a) Fe : Sn = 3 : 0.05

(21b)

(21c) Fe : Sn = 3 : 0.1

(21d)

(21e) Fe : Sn = 3 : 1

(21f)

(22a)  Fe:In:Sn = 3:1:0

(22b)  Fe:In:Sn = 3:1:0.03

(22c)  Fe:In:Sn = 3:1:0.1

(22d)  Fe:In:Sn = 3:1:0.15

(22e)  Fe:In:Sn = 3:1:0.3

(22f)  Fe:In:Sn = 3:1:0.5

(22g)  Fe:In:Sn = 3:1:1

(22h)  Fe:In:Sn = 3:1:3

(23a) Fe:In:Sn=3:0:0.1

(23b) Fe:In:Sn = 3:0.05:0.1

(23c) Fe:In:Sn = 3:0.1:0.1

(23d) Fe:In:Sn = 3:0.3:0.1

(23e) Fe:In:Sn = 3:1:0.1

(23f) Fe:In:Sn = 3:3:0.1

(23g) Fe:In:Sn= 3:9:0.1

(24a) Fe : Al : Sn = 3 : 0.3 : 0.1      (24b)

(24c) Fe : Al : Sn = 3 : 1 : 0.1      (24d)

(24e) Fe : Al : Sn = 3 : 9 : 0.1      (24f)

(25a)  Fe : Cr : Sn = 3 : 0.3 : 0.1

(25b)

(26a)  Fe : Cr : Sn = 3 : 1 : 0.1

(26b)

Structure pattern of Zeolite.

CATALYST FOR SYNTHESIZING CARBON NANOCOILS, SYNTHESIZING METHOD OF THE SAME, SYNTHESIZING METHOD OF CARBON NANOCOILS, AND CARBON NANOCOILS

TECHNICAL FIELD

The present invention relates to a catalyst for synthesizing carbon nanocoils in accordance with a chemical vapor deposition method, in particular, a catalyst for synthesizing carbon nanocoils with which carbon nanocoils can be efficiently synthesized, a synthesizing method of the same, a synthesizing method of carbon nanocoils, and carbon nanocoils that are ultimately obtained.

BACKGROUND ART

Carbon nanocoils that are wound in coil form of which the outer diameter is no greater than 1000 nm have been synthesized. Carbon nanocoils have similar properties as carbon nanotubes and significant electromagnetic induction, and thus, are useful for the material for the head of a hard disc and for an absorber of electromagnetic waves. In addition, carbon nanocoils have spring elasticity that makes it return to its original length when expanded to a length that is twice as long, and therefore, have been attracting attention as a material for the springs of micro-machines and actuators, as well as a resin reinforcing material.

Carbon nanocoils were synthesized for the first time using a chemical vapor deposition method (hereinafter referred to as CVD method), by Amelinckx et al. (Amelinckx, X. B. Zhang, D. Bernaerts, X. F. Zhang, V. Ivanov and J. B. Nagy, SCIENCE, 265 (1994) 635) in 1994. It was also clarified that carbon micro-coils that had been synthesized before had an amorphous structure, whereas carbon nanocoils had a graphite structure.

In accordance with their synthesizing method, a single metal catalyst, such as Co, Fe and Ni, is formed as microscopic powder, and the vicinity of this catalyst is heated to 600° C. to 700° C., and then, an organic gas, such as acetylene or benzene, is made to flow so as to make contact with this catalyst, so that these organic molecules are decomposed. However, the form of the generated carbon nanocoils varies, and the yield is low, indicating that carbon nanocoils were merely accidentally generated. That is, the method cannot be industrially utilized, and a more efficient synthesizing method has been in demand.

Li et al. (W. Li, S. Xie, W. Liu, R. Zhao, Y. Zhang, W. Zhou and G. Wang, J. Material Sci., 34 (1999) 2745) succeeded in generating carbon nanocoils using a new method in 1999. In accordance with their synthesizing method, a catalyst where the outer periphery of a graphite sheet is coated with iron particles is placed in the middle, and the vicinity of this catalyst is heated to 700° C. using a nichrome wire, and then, a mixed gas of 10% by volume of acetylene and 90% by volume of a nitrogen gas is brought into contact with this catalyst, so as to cause a reaction. However, this synthesizing method also has a small yield of coils, and is insufficient as an industrial method for mass production.

The key for increasing the yield of carbon nanocoils in accordance with a CVD method is in the development of an appropriate catalyst. Considering this point, some of the present inventors developed an Fe.In.Sn-based catalyst so as to obtain a yield of no less than 90%, and this achievement was disclosed as Japanese Patent Laying-Open No. 2001-192204 (Patent Document 1). This catalyst is formed by vapor depositing an iron thin film on an ITO substrate on which a mixed thin film of an In oxide and an Sn oxide has been formed. ITO is an abbreviation of indium-tin-oxide.

In addition, some of the present inventors formed an Fe.In.Sn-based catalyst in accordance with another method and succeeded in synthesizing a large amount of carbon nanocoils, and this achievement was disclosed as Japanese Patent Laying-Open No. 2001-310130 (Patent Document 2). This catalyst is formed by mixing an In organic compound and an Sn organic compound into an organic solvent so as to form an organic liquid, applying this organic liquid to a substrate so as to form an organic film, baking this organic film so as to form an In.Sn oxide film, and forming an iron thin film on this In.Sn oxide film. The In.Sn oxide film corresponds to the aforementioned ITO film (mixed thin film).

Meanwhile, research aiming to increase the efficiency of the catalyst by making a particular carrier carry a compound catalyst has been conducted. Research in this field was conducted in the area of carbon nanotubes and disclosed in Japanese Patent Laying-Open No. 2002-255519 (Patent Document 3) and Japanese Patent Laying-Open No. 2003-313017 (Patent Document 4).

These Patent Documents 3 and 4 relate to a synthesizing method of single layer carbon nanotubes. Both of these known technologies relate to a technology for generating carbon nanotubes by making zeolite absorb a catalyst for synthesizing carbon nanotubes. It has been reported that the generated carbon nanotubes have a relatively uniform tube diameter. That is, the technology has an object of synthesizing relatively uniform carbon nanotubes having the diameter of the microscopic pores by making the microscopic pores of the zeolite absorb the catalyst.

Patent Document 1: Japanese Patent Laying-Open No. 2001-192204

Patent Document 2: Japanese Patent Laying-Open No. 2001-310130

Patent Document 3: Japanese Patent Laying-Open No. 2002-255519

Patent Document 4: Japanese Patent Laying-Open No. 2003-313017

The present inventors began recognizing an interesting fact while energetically conducting research for synthesizing carbon nanocoils in accordance with a CVD method using the Fe.In.Sn-based catalyst that were developed in Patent Documents 1 and 2. This is the fact that a substance in particle form attaches itself to the ends of carbon nanocoils as seen in photomicrographs. The present inventors refer to this substance in particle form as catalyst nuclei.

The present inventors came to think that the catalyst nuclei that attach themselves to the ends of carbon nanocoils are a true catalyst substance. That is, these catalyst nuclei decompose carbon compound gas that exists around the catalyst nuclei so as to make carbon nanocoils grow while taking in carbon atoms. Carbon nanocoils are a microscopic carbon substance, and therefore, the substance in catalyst form that attaches itself to the ends of carbon nanocoils is ultra-fine particles of a nano-size.

It is an extremely difficult task to sample one carbon nanocoil so as to directly analyze one microscopic catalyst nucleus that attaches itself to the end of this carbon nanocoil. The catalyst nucleus is extremely small and easily falls off, and therefore, it is extremely difficult to determine its composition formula or structure in accordance with a physical or chemical technique. In addition, it is also a difficult task to take a high resolution transmission electron microscope image of such a catalyst nucleus.

However, in case these catalyst nuclei are a true catalyst, it is extremely important to determine their structure. That is, it became an extremely important issue for the present inventors to determine whether these catalyst nuclei were mere microscopic pieces of the Fe.In.Sn-based catalyst or made of another substance. This is because there was a possibility that a more effective catalyst for synthesizing carbon nanocoils could be provided by determining the structure of these catalyst nuclei.

In addition, in accordance with the known technology disclosed in Patent Document 3, zeolite is made to absorb fine particles of Fe and fine particles of Ni as fine particles of a catalyst. The fine particles of Fe and the fine particles of Ni are much greater in size than the molecules of compounds that dissolve, and therefore, there is a drawback that fine particles of the catalyst cannot be absorbed by the pores of the zeolite in the case where the diameter of the pores is small. In addition, even in the case where the fine particles of the catalyst are absorbed by the pores, the diameter of pores has a distribution in a certain range, and there is dispersion in the tube diameter, in accordance with this distribution. Furthermore, the diameter of fine particles of a metal that mono-disperses is approximately 10 nm in the state of the art. When no greater than 10 nm, the fine particles of the metal combine with each other so as to lump together, and the diameter of the secondary particles that have lumped together reaches several tens of nm or higher, and therefore, there is a drawback that carbon nanotubes having an extremely large tube diameter grow when attached to the surface of this zeolite.

Patent Document 4 discloses a technology for making zeolite absorb iron nitrate molecules in a solution. That is, it has been found that iron nitrate molecules are absorbed by the pores of zeolite, and the ratio of filling of the catalyst into the pores becomes higher than that of the aforementioned fine particles of a catalyst. However, catalysts that are absorbed by zeolite are one type of metal element or a substance that contains such a metal, and not a mixture of a plurality of types of metal elements or a substance that contains such metals. Catalysts of carbon nanotubes are fine particles of single Fe or fine particles of single Ni, and therefore, are possible to uniformly inject into the pores of zeolite. However, catalysts for synthesizing carbon nanocoils are formed of a plurality of types of metals, like the Fe.In.Sn catalyst, and therefore, it is necessary to simultaneously fill the same pore with a plurality of types of metal. It is easy to understand that it is difficult to simultaneously inject a plurality of types of metals into the same pore. Accordingly, it is totally unknown whether or not a plurality of catalysts for synthesizing carbon nanocoils can be absorbed by zeolite, and such an experiment has never been carried out.

Accordingly, an object of the present invention is to identify the true catalyst for synthesizing carbon nanocoils, by indirectly determining the structure of the catalyst nuclei attached to the ends of carbon nanocoils, establish a synthesizing method of such a catalyst, and synthesize carbon nanocoils of a high density with high efficiency in a short period of time. Another object is to develop a novel catalyst for synthesizing carbon nanocoils, other than the Fe.In.Sn catalyst. Still another object is to provide a novel catalyst for synthesizing carbon nanocoils, where this novel catalyst substance is carried by a porous carrier. Yet another object is to establish a method for synthesizing carbon nanocoils using this novel catalyst for synthesizing carbon nanocoils, and provide uniform and inexpensive carbon nanocoils for the market.

DISCLOSURE OF THE INVENTION

The present invention has been made in order to achieve the aforementioned objects, and the first mode of the present invention provides a catalyst for synthesizing carbon nanocoils having an outer diameter of no greater than 1000 nm in accordance with a chemical vapor deposition method, wherein this catalyst is formed of a metal carbide that includes at least one or more types of transition metal elements. Transition metal elements means the transition elements shown in the periodic table, and concretely, are Sc to Cu in Period 4, Y to Ag in Period 5, La to Au in Period 6 and the like, which are known as catalysts for synthesizing carbon nanotubes. The present inventors discovered that carbon nanocoils are generated where any of these transition metal elements and other elements coexist, like in the case of the Fe.In.Sn catalyst, and that carbon nanocoils are efficiently grown when this catalyst becomes a carbide, and then, completed the present invention. The aforementioned catalyst nuclei are a metal carbide of the present invention.

The second mode of the present invention provides a catalyst for synthesizing carbon nanocoils having an outer diameter of no greater than 1000 nm in accordance with a chemical vapor deposition method, wherein this catalyst is a carbide catalyst that contains at least one or more types of transition metal elements, In and C. Transition metal elements are defined as described above, and such transition metal elements, In and C, are combined so as to form a carbide catalyst, which becomes an effective catalyst for synthesizing carbon nanocoils.

The third mode of the present invention provides the catalyst for synthesizing carbon nanocoils, wherein the transition metal element is one or more types of element A selected from among Fe, Co and Ni, and the composition formula for a carbide catalyst is represented by at least $A_xIn_yC_z$. Though Fe, Co and Ni are well known as catalysts for carbon nanotubes, it was discovered for the first time, by the present inventors, that they become a catalyst for carbon nanocoils in the presence of $A_xIn_yC_z$. Though the role of In is not clear at present, it is conceivable that Fe, Co and Ni make carbon nanotubes grow, C becomes the raw material for forming carbon nanocoils, and In makes these carbon nanotubes wind. However, the micro-mechanism for this is unclear at present. In this carbide catalyst, the composition ratio of A to In to C is represented by x, y and z, and a carbide catalyst where this composition ratio x, y and z can be designed to a desired value is proposed.

The fourth mode of the present invention provides the catalyst for synthesizing carbon nanocoils, wherein the elements A are Fe and a composition formula for the carbide catalyst is represented by at least $Fe_3InC_{0.5}$. The present inventors confirmed the fact that Fe.In catalyst thin film can be first converted to fine particles during the synthesize of carbon nanocoils by bringing a carbon compound gas into contact with a substrate on which the Fe.In catalyst thin film has been formed, and these fine particles work as catalyst nuclei, so as to grow carbon nanocoils. Powder X-ray analysis was carried out on the fine particles of the catalyst that had been formed on this substrate, in order to confirm that it is a carbide catalyst that contains Fe, In and C. It was ascertained from this diffraction pattern that the composition formula for this carbide catalyst can be said to be $Fe_3InC_{0.5}$. Accordingly, carbon nanocoils can be synthesized with high efficiency using a carbide catalyst having this composition formula.

This carbide catalyst is a catalyst for synthesizing carbon nanocoils of which the composition formula was identified as the one discovered for the first time by the present inventors, and is a true catalyst for growing carbon nanocoils.

The fifth mode of the present invention provides the catalyst for synthesizing carbon nanocoils, wherein one or more types of other elements are added to the carbide catalyst of the second mode. The other elements may be elements other than the transition metal elements, In and C that form the catalyst, and are effective as elements which accelerate the growth of carbon nanocoils. The elements may be, for example, transition elements other than the transition metal elements, or may be typical elements. In the case where the transition metal elements are Fe, for example, the other elements may be, for example, Co or Ni. Concretely, Si, Ge or Sn in the carbon group, B, Al, Ga or Ti in the boron group, P, As, Sb or Bi in the nitrogen group, other metal elements or non-metal elements, for example, can be selected as the other elements.

The sixth mode of the present invention is the catalyst for synthesizing carbon nanocoils, wherein the other elements of the fifth mode are Sn. In this case, an Fe.In.Sn based carbide catalyst can be cited as a catalyst for synthesizing carbon nanocoils of the present invention. In the case where carbon nanocoils are synthesized using the conventional Fe.In.Sn-based catalyst, it takes a long time to grow carbon nanocoils to a certain length, and therefore, there is a drawback that the efficiency of operation of the reaction apparatus is low. However, when the Fe.In.Sn-based carbide catalyst of the mode of the present invention is used, the efficiency of the catalyst is high, so that carbon nanocoils can be grown in a short period of time, and therefore, there is an advantage that the efficiency of operation of the reaction apparatus is high. In addition, in the case where this carbide catalyst is formed as fine particles, the diameter of carbon nanocoils can be controlled, by controlling the diameter of the fine particles of the carbide catalyst, thus making it possible to synthesize coils having an arbitrary diameter.

The seventh mode of the present invention provides the catalyst for synthesizing carbon nanocoils, wherein a composition formula of the carbide catalyst is represented by at least $Fe_xIn_yC_zSn_w$ in the sixth mode. In this carbide catalyst, the composition ratio of Fe to In to C to Sn is represented by x, y, z and w, and a carbide catalyst where this composition ratio x, y, z and w can be designed to a desired value is proposed.

The eighth mode of the present invention provides the carbon catalyst for synthesizing carbon nanocoils, wherein a composition formula for the carbide catalyst is represented by at least $Fe_3In_{1-v}C_{0.5}Sn_w$ ($1>v\geqq0$, $w\geqq0$). The catalyst of the present mode is a carbon catalyst of which the central composition is $Fe_3InC_{0.5}$, and which is generated by removing In from this central composition with a composition ratio v ($1>v\geqq0$), and adding Sn with a composition ratio w ($\geqq0$). In the case where the composition ratio v and w is zero, the composition becomes $Fe_3InC_{0.5}$, and the removed amount v and the added amount w can be set to desired values in a range which goes no lower than zero. A carbide catalyst which can efficiently synthesize carbon nanocoils can be provided by adjusting the composition ratio v and w to an optimal value. The added composition ratio w of Sn can be freely set within a range where w>0, and it is possible to add a microscopic amount of to a large amount of Sn. There is an advantage that the efficiency of generation can be adjusted through the added amount of Sn.

The ninth mode of the present invention provides the catalyst for synthesizing carbon nanocoils, wherein Fe is selected as the element A, and an exhibited diffraction intensity distribution has a first intensity peak in the vicinity of approximately 40° and a second intensity peak in the vicinity of approximately 46.3° when powder X-ray diffraction is carried out on this catalyst, and a diffraction angle is measured as 2θ in the catalyst of the third mode. A carbide catalyst having the first intensity peak in the vicinity of approximately 40°, as described above, precisely in the vicinity of 39.6°, and the second intensity peak in the vicinity of 46.3° was discovered for the first time by the present inventors, and this carbide catalyst is proposed as a catalyst for synthesizing carbon nanocoils.

The tenth mode of the present invention provides a catalyst for synthesizing carbon nanocoils having an outer diameter of no greater than 1000 nm in accordance with a chemical vapor deposition method, wherein this catalyst is a carbide catalyst that contains at least one or more types of transition metal elements, Sn and C. This is a carbide catalyst where In of the catalyst of the second mode is replaced with Sn. A (transition metal element, Sn, C) carbide catalyst is a catalyst for synthesizing carbon nanocoils that was discovered for the first time by the present inventors, together with a (transition metal element, In, C) carbide catalyst. Transition metal elements are defined as described above, and such transition metal elements, Sn and C are combined so as to form a carbide catalyst which becomes an effective catalyst for synthesizing carbon nanocoils. A concrete appropriate transition metal can be freely selected, taking the efficiency of synthesize and the conditions for synthesis into consideration.

The eleventh mode of the present invention provides the catalyst for synthesizing carbon nanocoils, wherein the transition metal elements are one or more types of element A selected from among Fe, Co and Ni, and a composition formula of the carbide catalyst is represented by at least $A_xSn_yC_z$ in the catalyst of the tenth mode. Though Fe, Co and Ni are well known as catalysts for carbon nanotubes, it was discovered for the first time by the present inventors that they become a catalyst for carbon nanocoils in the presence of $A_xSn_yC_z$. Though the role of Sn is not clear at present, it is conceivable that Fe, Co and Ni make carbon nanotubes grow, C becomes the raw material for forming carbon nanocoils, and Sn makes these carbon nanotubes wind. However, the micro-mechanism for this is unclear at present. In this carbide catalyst, the composition ratio of A to Sn to C is represented by x, y and z, and a carbide catalyst where this composition ratio x, y and z can be designed to a desired value is proposed.

The twelfth mode of the present invention provides the catalyst for synthesizing carbon nanocoils, wherein the elements A are Fe and a composition formula for the carbide catalyst is represented by at least $Fe_3SnC$ in the catalyst of the eleventh mode. The present inventors confirmed the fact that Fe.Sn catalyst thin film can be converted to fine particles during the synthesize of carbon nanocoils by bringing a carbon compound gas into contact with a substrate on which the Fe.Sn catalyst thin film has been formed, and these fine particles work as catalyst nuclei, so as to grow carbon nanocoils. Powder X-ray analysis was carried out on the fine particles of the catalyst that had been formed on this substrate, in order to confirm that it is a carbide catalyst that contains Fe, Sn and C. It was ascertained from this diffraction pattern that the composition formula for this carbide catalyst can be said to be $Fe_3SnC$. Accordingly, carbon nanocoils can be synthesized with high efficiency using a carbide catalyst having this composition formula. This carbide catalyst is a catalyst for synthesizing carbon nanocoils of which the composition formula was identified as the one discovered by the present inventors, and is a catalyst for growing carbon nanocoils.

The thirteenth mode of the present invention provides the catalyst for synthesizing carbon nanocoils, wherein one or more types of other elements are added to the carbide catalyst in the catalyst of the tenth mode. The other elements may be elements other than the transition metal elements, Sn and C that form the catalyst, and are effective as elements which accelerate the growth of carbon nanocoils. The elements may be, for example, transition elements other than the transition metal elements, or may be typical elements. In the case where the transition metal elements are Fe, for example, the other elements may be, for example, Co or Ni. Concretely, Si, Ge or Sn in the carbon group, B, Al, Ga or Tl in the boron group, P, As, Sb or Bi in the nitrogen group, other metal elements or non-metal elements, for example, can be selected as the other elements, and an appropriate amount of these can be freely added on the basis of the purpose.

The fourteenth mode of the present invention provides the catalyst for synthesizing carbon nanocoils, wherein the elements A are Fe, and an exhibited diffraction intensity distribution has a first intensity peak in the vicinity of approximately 40° when powder X-ray diffraction is carried out on the catalyst, and a diffraction angle is measured as 2θ in the catalyst of the eleventh mode. A carbide catalyst having the first intensity peak in the vicinity of approximately 40° was discovered by the present inventors, and this carbide catalyst is proposed as a catalyst for synthesizing carbon nanocoils.

The fifteenth mode of the present invention provides a catalyst for synthesizing carbon nanocoils that contains one or more types of transition metal elements, Al and Sn. This catalyst is a novel metal catalyst discovered by the present inventors, and not a carbide catalyst. Transition metal elements have already been defined in the above, and an appropriate transition metal element can be utilized on the basis of the purpose. Carbon nanocoils can be efficiently synthesized by applying this catalyst to synthesis in accordance with a CVD method, and thus, this catalyst can contribute to industrial mass production of carbon nanocoils.

The sixteenth mode of the present invention provides the catalyst for synthesizing carbon nanocoils where the transition metal elements, Al and Sn exist as oxides. The catalyst of the fifteenth mode can be baked in an oxygen atmosphere in order to generate and obtain an oxide catalyst. Iron, aluminum or tin can be utilized as a catalyst for synthesizing carbon nanocoils in the form of iron oxide, aluminum oxide or tin oxide, and these can provide a stable catalyst because they cannot be oxidized any more than they are when used in the air.

The seventeenth mode of the present invention provides the catalyst for synthesizing carbon nanocoils, wherein the transition metal elements are Fe and $y \leqq 1$ and $z \leqq 3$ when $x=3$ with a proportional distribution of (x, y, z) in a composition ratio (mol ratio) of a composition (Fex—Aly—Snz) in the catalyst of the fifteenth or sixteenth mode. When this composition is used, carbon nanocoils can be synthesized with high generation efficiency. Catalyst (Fex—Aly—Snz) of the present mode is formed with a composition ratio of, for example, $x=3$, $y=1$ and $z=0.1$.

The eighteenth mode of the present invention provides the catalyst for synthesizing carbon nanocoils that contains one or more types of transition metal elements, Cr and Sn. This catalyst is another novel metal catalyst discovered by the present inventors, and not a carbide catalyst. Transition metal elements have already been defined in the above, and a variety of transition metal elements can be utilized on the basis of the purpose. Carbon nanocoils can be efficiently synthesized by applying this catalyst to synthesis in accordance with a CVD method, and thus, this catalyst can contribute to industrial mass production of carbon nanocoils.

The nineteenth mode of the present invention provides the catalyst for synthesizing carbon nanocoils where transition metal elements, Cr and Sn exist as oxides in the catalyst of the eighteenth mode. The catalyst of the eighteenth mode can be baked in an oxygen atmosphere in order to generate and obtain an oxide catalyst. Transition metal elements, chromium or tin can be utilized as a catalyst for synthesizing carbon nanocoils in the form of transition metal oxides, aluminum oxide or tin oxide, and these can provide a stable catalyst because they cannot be oxidized any more than they are when used in the air.

The twentieth mode of the present invention provides the catalyst for synthesizing carbon nanocoils, wherein the transition metal elements are Fe and $y \leqq 1$ and $z \leqq 3$ when $x=3$ with a proportional distribution of (x, y, z) in a composition ratio (mol ratio) of a composition (Fex—Cry—Snz) in the catalyst of the eighteenth or nineteenth mode. When this composition is used, carbon nanocoils can be synthesized with high generation efficiency. The catalyst (Fex—Cry—Snz) of the present mode is formed with a composition ratio of, for example, $x=3$, $y=0.3$ and $z=0.1$.

The twenty-first mode of the present invention provides a catalyst for synthesizing carbon nanocoils, which includes at least a composition (Fex—Iny—Snz) formed of elements Fe, In and Sn, wherein $y \leqq 9$ and $z \leqq 3$ when $x=3$ with a proportional distribution of (x, y, z) in a composition ratio (mol ratio) of the respective elements. The present inventors have already disclosed the Fe.In.Sn catalyst, and in the present mode, the composition of the respective component elements is limited to a specific range, and thereby, carbon nanocoils are successfully synthesized more efficiently. The catalyst (Fex—Iny—Snz) of the present mode is formed with a composition ratio of, for example, $x=3$, $y=0.3$ and $z=0.1$.

The twenty-second mode of the present invention provides the catalyst for synthesizing carbon nanocoils, wherein Fe, In or Sn exists as an oxide in the catalyst of the twenty-first mode. Iron, indium or tin can be utilized as a catalyst for synthesizing carbon nanocoils in the form of iron oxide, indium oxide or tin oxide, and these can provide a stable catalyst because they cannot be oxidized any more than they are when used in the air.

The twenty-third mode of the present invention provides the catalyst for synthesizing carbon nanocoils, wherein the catalyst is obtained as fine particles in any of the first to twenty-second modes. The present inventors discovered that catalyst nuclei exist at the ends of grown carbon nanocoils and these catalyst nuclei decompose the carbon compound gas so that carbon nanocoils can grow while taking in carbon atoms. In the case where a carbon catalyst is provided as fine particles on the basis of this knowledge, it becomes possible to efficiently synthesize carbon nanocoils by making these fine particles function as catalyst nuclei. There is an advantage that the coil wire diameter and the coil outer diameter of carbon nanocoils can be uniformly controlled to desired values by adjusting the diameter of the fine particles.

The twenty-fourth mode of the present invention provides a synthesizing method of the catalyst for synthesizing carbon nanocoils of the second or tenth mode, wherein a thin film that contains at least (a transition metal element, In) or (a transition metal element, Sn) is formed on a substrate, and the surface of the thin film of the substrate is carbonized by a carbon compound gas in a heated state, so that a carbide catalyst that contains elements of at least (a transition metal element, In, C) or (a transition metal element, Sn, C) is formed. It becomes possible to mass-produce a carbide catalyst that contains elements of at least (a transition metal element, In, C) or (a transition metal element, Sn, C) simply by carbonizing a thin film catalyst that has been formed on a substrate. The transition metal elements are of a variety of types as described above, and thus, a carbide catalyst that contains an arbitrary transition metal element can be inexpensively mass-produced.

The twenty-fifth mode of the present invention provides a synthesizing method of the catalyst for synthesizing carbon nanocoils of the second or tenth mode, wherein fine particles that contain at least (a transition metal element, In) or (a transition metal element, Sn) are formed, and these fine particles are made to react with a carbon compound gas in a heated state, so that a carbide catalyst that contains elements of at least (a transition metal element, In, C) or (a transition metal element, Sn, C) is formed. It becomes possible to mass-produce a (transition metal element, In) carbide catalyst or a (transition metal element, Sn, C) carbide catalyst using a variety of methods, and this can contribute to reduction in the price of the catalysts. As the method for forming fine particles, physical vapor deposition (PVD) methods, such as vapor deposition, sputtering, ion plating, plasma and molecular beam, chemical vapor deposition (CVD) methods, such as vapor phase decomposition methods and spray thermal decomposition methods and the like can be utilized.

The twenty-sixth mode of the present invention provides a synthesizing method of the catalyst for synthesizing carbon nanocoils of the second or tenth mode, wherein a solution or a dispersion liquid where at least (a transition metal compound and an In compound) or (a transition metal compound and an Sn compound) are added to a solvent is formed, a solid component is separated from this solution or dispersion liquid, and the solid component is brought into contact with a carbon compound gas in a heated state so as to be carbonized, and thus, fine particles of a carbide catalyst that contain elements of at least (a transition metal element, In, C) or (a transition metal element, Sn, C) are formed. As the transition metal compounds, In compounds and Sn compounds, transition metal oxides, In oxides and Sn oxides can be cited as examples, and these are uniformly mixed in a solution and the solid component is separated. A large amount of fine particles of a (transition metal element, In, C) carbide catalyst or fine particles of a (transition metal element, Sn, C) carbide catalyst can be easily synthesized, by carrying out a carbonizing process on this solid component with a carbon compound gas. As the material that can be carbonized, it is possible to use a variety of compounds, in addition to the oxides.

The twenty-seventh mode of the present invention provides a synthesizing method of the catalyst for synthesizing carbon nanocoils of the second or tenth mode, wherein a solution or a dispersion liquid where at least (a transition metal compound and an In compound) or (a transition metal compound and an Sn compound) are added to a solvent is formed, a solid component is separated from this solution or dispersion liquid, the separated solid component is baked so as to generate fine particles of at least (a transition metal element, In) or (a transition metal element, Sn), and these fine particles are brought into contact with a carbon compound gas in a heated state so as to be carbonized, and thus, fine particles of a carbide catalyst that contain elements of at least (a transition metal element, In, C) or (a transition metal element, Sn, C) are formed. As the transition metal compounds, In compounds and Sn compounds, transition metal oxides, In oxides and Sn oxides can be cited as examples, and these are uniformly mixed in a solution and the solid component is separated, and then, this solid component is baked so as to burn the organic substances, so as to easily fabricate fine particles of (a transition metal element, In) or (a transition metal element, Sn). In the case of baking in an oxygen atmosphere, fine particles of oxides, fine particles of hydroxides and the like are generated, and in the case of baking in another atmosphere, fine particles of other types are generated. Arbitrary microscopic particles that transform into fine particles of a target carbide can be utilized. A large amount of fine particles of a carbide catalyst that contain (a transition metal element, In, C) or (a transition metal element, Sn, C) can be easily synthesized, by carrying out a carbonizing process on these fine particles with a hydrocarbon gas.

The twenty-eighth mode of the present invention provides a synthesizing method of the catalyst for synthesizing carbon nanocoils of the second or tenth mode, wherein at least (a transition metal compound gas and an In compound gas) or (a transition metal compound gas and an Sn compound gas) are brought into contact and made to react with a carbon compound gas in a reaction vessel in a heated state, so that fine particles of a carbide catalyst that contain elements of at least (a transition metal element, In, C) or (a transition metal element, Sn, C) are formed. In this mode, it becomes possible to mass-produce fine particles of a target carbide catalyst through a chemical gas reaction, using a gas having a catalyst material component, and this can contribute to reduction in the price of the catalyst.

The twenty-ninth mode of the present invention provides the synthesizing method of the catalyst for synthesizing carbon nanocoils, wherein the transition metal elements are one or more types of element A selected from among Fe, Co and Ni, and a composition formula of the carbide catalyst is represented by at least $A_xIn_yC_z$ or $A_xSn_yC_z$ in any of the twenty-fourth to twenty-eighth modes. Though Fe, Co and Ni are well known as catalysts for carbon nanotubes, it was discovered by the present inventors that they become catalysts for carbon nanocoils when combined with In.C or Sn.C. In this carbide catalyst, the component ratio is represented by x, y and z, and a carbide catalyst where the composition ratio x, y and z can be designed to a desired value is provided.

The thirtieth mode of the present invention provides the synthesizing method of the catalyst for synthesizing carbon nanocoils, wherein the element A is Fe, and a composition formula of the carbide catalyst is represented by at least $Fe_3InC_{0.5}$ or $Fe_3SnC$ in the twenty-ninth mode. In the present mode, specifically Fe is selected from among Fe.Co.Ni. In the case of Fe, there is an advantage that a carbide can be easily generated. Carbides made of $Fe_3InC_{0.5}$ and $Fe_3SnC$ as catalysts for synthesizing nanocoils are substances that were discovered by the present inventors before anyone else in the world.

The thirty-first mode of the present invention provides the synthesizing method of the catalyst for synthesizing carbon nanocoils, wherein one or more types of other elements are added to the carbide catalyst in any of the twenty-fourth to thirtieth modes. The other elements may be elements other than (the transition metal elements, In and C) or (the transition metal elements, Sn and C) those form the catalyst, and are effective as elements which accelerate the growth of carbon nanocoils. The elements may be, for example, transition elements other than the transition metal elements, or may be typical elements. In the case where the transition metal elements are Fe, for example, the other elements may be, for example, Co or Ni. Concretely, Si, Ge or Sn in the carbon group, B, Al, Ga or Tl in the boron group, P, As, Sb or Bi in the nitrogen group, other metal elements or non-metal elements, for example, can be selected as the other elements.

The thirty-second mode of the present invention provides the catalyst for synthesizing carbon nanocoils, wherein a carbide catalyst or/and oxide catalyst for synthesizing carbon nanocoils is carried by a porous carrier. The catalyst that is utilized in the present mode is a carbide catalyst or/and oxide catalyst with which carbon nanocoils can be synthesized with high efficiency. In addition, these catalysts are carried by a porous carrier, and thereby, uniform pores of the porous carrier can be filled in with the catalyst for synthesizing carbon nanocoils. The size of the pores of the porous carrier is approximately 0.5 nm to 2 nm in the case of Y type zeolite, and the minimum diameter of pores is 0.74 nm in the case of zeolite. In this manner, in the case where the catalyst for synthesizing carbon nanocoils is absorbed by pores having a uniform cross sectional area, the amount of catalyst held by the pores (amount of filling) can be made uniform. That is, the areas of the catalyst that follow the cross sectional areas of the pore of the porous carrier, as well as the amount of catalyst that follows the volume of the pores can both be made uniform. Accordingly, carbon nanocoils having a wire diameter that corresponds to the diameter of the pores grow, and therefore, the wire diameter is uniform. The research conducted by the present inventors shows that there is an extremely close correlation between the outer diameter of carbon nanocoils and the wire diameter of carbon nanocoils, and the outer diameter of coils can be made uniform by making the wire diameter uniform. As described above, the areas of the catalyst and the amount of catalyst, which are factors in defining the wire diameter of carbon nanocoils, are uniform, and thereby, the wire diameter of carbon nanocoils can be made uniform, and as a result, a catalyst for mass producing carbon nanocoils where the outer diameter of coils can be made uniform can be successfully implemented. In addition, some porous carriers have a great number of pores, and carbon nanocoils of which the number is proportional to the number of these pores can be formed. Accordingly, there is an advantage that carbon nanocoils can be mass-produced with high efficiency. Furthermore, porous carriers of various types of forms exist, for example, in block form, sheet form, plate form, grain form, fine particle form and ultra-fine particle form.

The thirty-third mode of the present invention provides the catalyst for synthesizing carbon nanocoils, which carries any of the carbide catalysts of the first to fourteenth modes in the thirty-second mode. The carbide catalysts of the first to fourteenth modes are catalysts discovered by the present inventors, and have an advantage that carbon nanocoils can be synthesized with high efficiency.

The thirty-fourth mode of the present invention provides the catalyst for synthesizing carbon nanocoils, wherein any of the catalysts of the fifteenth to twenty-second modes is carried by a porous carrier. The catalysts of the fifteenth to twenty-second modes are catalysts discovered by the present inventor, and have an advantage that carbon nanocoils can be synthesized with high efficiency in the same manner as carbide catalysts, though they are not carbide catalysts.

The thirty-fifth mode of the present invention provides a catalyst for synthesizing carbon nanocoils, wherein a transition metal element.In.Sn-based catalyst for synthesizing carbon nanocoils, a transition metal element.Al.Sn-based catalyst, a transition metal element.Cr.Sn-based catalyst, a transition metal element.In-based catalyst or a transition metal element.Sn-based catalyst is carried by a porous carrier. Carbon nanocoils having a uniform wire diameter and a uniform coil diameter can be mass-produced, by making these catalysts be carried by the pores of a porous carrier. These catalysts are two element-based or three element-based catalysts, and the present invention makes it possible to simultaneously carry multiple elements in pores. Efficiency in the generation of carbon nanocoils varies, depending on the type of catalyst. Accordingly, it becomes possible to freely adjust the efficiency in the generation of carbon nanocoils, by appropriately adjusting the combination of catalysts.

The thirty-sixth mode of the present invention provides the catalyst for synthesizing carbon nanocoils, wherein the transition metal elements are one or more types of element selected from among Fe, Co and Ni in the catalyst of the thirty-fifth mode. Fe, Co or Ni, which allows carbon nanocoils to be synthesized efficiently, is utilized, from among the transition metal elements. As a result, the catalyst of the present mode makes it possible to mass-produce carbon nanocoils, and can contribute to reduction in the price of the catalyst.

The thirty-seventh mode of the present invention provides the catalyst for synthesizing carbon nanocoils, wherein the porous carrier is selected from zeolite, aluminophosphate, silica-aluminophosphate, meso-porous bodies, porous ceramics, molecular sieves, metal oxide based porous bodies, silica-porous bodies and carbon-based porous bodies in the catalyst of any of the thirty-second to thirty-sixth modes. Zeolite is a general name for porous bodies having a structure where tetrahedrons of $SiO_4$ and $AlO_4$ alternately combine by sharing oxygen. There are 100 or more types of skeleton structures for natural zeolite and synthetic zeolite combined, and the properties thereof differ, depending on the ratio of Si atoms to Al atoms (ratio of Si/Al). In addition, Si atoms are partially replaced with Al atoms, and therefore, negative charge is provided, so that a catalyst for synthesizing carbon nanocoils can be easily carried in accordance with an ion exchanging method. ALPO (aluminophosphate) has a skeleton structure where tetrahedrons of $Al_4$ and $PO_4$ alternately combine by sharing oxygen. Though the porous structure of ALPO is the same as that of zeolite, it does not have ion exchanging performance, due to its neutrality. SAPO (silica-aluminophosphate) is provided by partially replacing the P atoms of ALPO with Si atoms, so that ion exchanging performance that is the same as that of zeolite is provided. Accordingly, SAPO can easily be made to carry a catalyst for synthesizing carbon nanocoils in accordance with an ion exchanging method. Resin absorbance, porous ceramics, metal oxide-based porous bodies and silica porous bodies also have the same porous structure as that of zeolite, and thus, are able to carry a catalyst for synthesizing carbon nanocoils. The diameter of the pores of zeolite, ALPO and SAPO is 0.5 nm to 2 nm, and some silica porous bodies have pores as large as 1.5 nm to 10 nm. Furthermore, carbon-based porous bodies, such as carbon nanostructures, including activated charcoal and carbon nanotubes can also be utilized. Accordingly, there is an advantage that carbon nanocoils having a wire diameter that depends on the diameter of these pores and a uniform outer diameter of coils can be mass-produced when carbon nanocoils are synthesized with a catalyst that is carried in the pores of these porous carriers.

The thirty-eighth mode of the present invention provides a synthesizing method of the catalyst for synthesizing carbon nanocoils of the thirty-second to thirty-seventh modes, wherein the fine particles of a catalyst for synthesizing carbon nanocoils are dispersed in a solvent, and a porous carrier is immersed in this solvent so that the fine particles of the catalyst are carried on the surface or/and in the pores of the porous carrier. When fine particles of a catalyst are dispersed in a solvent, the fine particles of the catalyst uniformly disperse in this solvent. When a porous carrier is immersed in this solvent, the catalyst for synthesizing carbon nanocoils is uniformly absorbed by each pore of the porous carrier. In order to enhance the efficiency of absorption, an arbitrary process, such as stirring of the solvent, an ultrasound process, or a process using a homogenizer or an atomizer may be added after the porous carrier has been immersed in the solvent.

The thirty-ninth mode of the present invention provides a synthesizing method of the catalyst for synthesizing carbon nanocoils of the thirty-second to thirty-seventh modes, wherein the catalyst for synthesizing carbon nanocoils is made to fill in or flow through a space while a porous carrier is placed in this space, so that the fine particles of the catalyst are carried on the surface or/and in the pores of the porous carrier. Fine particles of a catalyst are made to fill in or flow through a space, and therefore, the fine particles of the catalyst can be easily absorbed into the surface or/and the pores of the porous carrier, simply by placing a porous carrier in this space. The porous carrier may be placed so as to be stationary within a processing chamber, or may be sprayed or stirred, and thus, known means for enhancing the efficiency of absorption from the gas phase can be adopted. In addition, the physical conditions within the processing chamber can be arbitrarily adjusted. For example, the porous carrier may be placed under high pressure, in a vacuum, or it is also possible to apply heat to or cool the system. In the case where fine particles of a catalyst for synthesizing carbon nanocoils are absorbed by a porous carrier in accordance with this method, carbon nanocoils can be synthesized efficiently and inexpensively.

The fortieth mode of the present invention provides the synthesizing method of the catalyst for synthesizing carbon nanocoils, wherein the porous carrier which carries the fine particles of the catalyst is baked in the thirty-eighth or thirty-ninth mode. Fine particles of the catalyst are fixed within the pores of the porous carrier through baking, and thus, the carrying strength can be increased.

The forty-first mode of the present invention provides a synthesizing method of carbon nanocoils, wherein any of the catalysts for synthesizing carbon nanocoils of the first to twenty-second and thirty-second to thirty-seventh modes is placed inside a reactor, the vicinity of this catalyst is heated to a temperature no lower than that where the carbon compound gas that is used as a material decomposes by the working effects of the catalyst, and the carbon compound gas is made to flow so as to make contact with the catalyst, and thus, carbon nanocoils having an outer diameter of no greater than 1000 nm are grown on the surface of the catalyst while the carbon compound gas is being decomposed in the vicinity of the catalyst. Carbon nanocoils can be generated with high efficiency on the surface of the catalyst while a carbon compound gas, such as a hydrocarbon, is efficiently being decomposed using a carbide catalyst, a metal catalyst or a catalyst of an oxide of these, or a porous carrier catalyst according to the present invention, and thus, industrial mass production of carbon nanocoils can be implemented.

The forty-second mode of the present invention provides a synthesizing method of carbon nanocoils, wherein a catalyst precursor substance that contains at least a transition metal element and In is brought into contact with a carbon compound gas in a heated state so as to form a carbide catalyst having at least a transition metal element, In and C, and immediately after this, the carbon compound gas is decomposed by the carbide catalyst in a heated state, so that carbon nanocoils are grown. A synthesizing method in two sequential stages is provided, where the catalyst precursor substance that contains a transition metal element and In is changed to a carbide catalyst, and immediately after this, carbon nanocoils are mass-produced. In the case where a catalyst precursor substance, to which one or more types of other effective elements have been added, in addition to the transition metal element and In, is utilized, the efficiency in the synthesis of carbon nanocoils can further be increased.

The forty-third mode of the present invention provides a synthesizing method of carbon nanocoils, wherein a catalyst precursor substance that contains at least a transition metal element and Sn is brought into contact with a carbon compound gas in a heated state so as to form a carbide catalyst having at least a transition metal element, Sn and C, and immediately after this, the carbon compound gas is decomposed by the carbide catalyst in a heated state, so that carbon nanocoils are grown. A synthesizing method in two sequential stages is provided, where the catalyst precursor substance that contains a transition metal element and Sn is changed to a carbide catalyst, and immediately after this, carbon nanocoils are mass-produced. In the case where a catalyst precursor substance, to which one or more types of other effective elements have been added in addition to the transition metal element and Sn, is utilized, the efficiency in the synthesis of carbon nanocoils can further be increased.

The forty-fourth mode of the present invention provides a synthesizing method of carbon nanocoils, wherein a catalyst precursor substance that contains at least a transition metal element, In and Sn is brought into contact with a carbon compound gas in a heated state so as to form a carbide catalyst having at least a transition metal element, In, Sn and C, and immediately after this, the carbon compound gas is decomposed by the carbide catalyst in a heated state, so that carbon nanocoils are grown. A synthesizing method in two sequential stages is provided, where the catalyst precursor substance that contains a transition metal element, In and Sn is changed to a carbide catalyst, and immediately after this, carbon nanocoils are mass-produced. In the case where a catalyst precursor substance to which one or more types of other effective elements have been added, in addition to the transition metal element, In and Sn, is utilized, the efficiency in the synthesis of carbon nanocoils can further be increased.

The forty-fifth mode of the present invention provides the synthesizing method of carbon nanocoils, wherein a film or a fine particle film of the catalyst for synthesizing carbon nanocoils is formed on a substrate, and a carbide compound gas is decomposed by this catalyst, so that carbon nanocoils are grown on the substrate in the forty-first to forty-fourth modes. Carbon nanocoils can be generated on a catalyst film with high density by using the catalyst film. In addition, carbon nanocoils can be mass-produced on a substrate with fine particles of a catalyst as catalyst nuclei, by using a fine particle film of the catalyst. Carbon nanocoils having a smaller size can be synthesized by reducing the diameter of the fine particles of the catalyst, and conversely, carbon nanocoils having a greater size can be synthesized by increasing the diameter of the fine particles of the catalyst. As described above, there is an advantage that carbon nanocoils can be freely mass-produced by controlling the diameter of the fine particles of the catalyst.

The forty-sixth mode of the present invention provides the synthesizing method of carbon nanocoils, wherein fine particles of the catalyst for synthesizing carbon nanocoils are made to float in a reaction vessel, and a carbon compound gas is decomposed by these fine particles of the catalyst, so that carbon nanocoils are grown in a floating state in the forty-first to forty-fourth modes. The time for growing carbon nanocoils can be controlled relatively easily, by restricting the region for reaction through which the fine particles of the catalyst flow, and thus, the size of carbon nanocoils can be easily controlled.

The forty-seventh mode of the present invention provides the synthesizing method of carbon nanocoils, wherein fine particles of the catalyst for synthesizing carbon nanocoils are deposited in a reaction vessel, and a carbon compound gas is decomposed while these deposited fine particles of the catalyst are being stirred, so that carbon nanocoils are grown in a stirred state in the forty-first to forty-fourth modes. For example, a powder of fine particles of the catalyst can be deposited in a rotary kiln, and the rotary kiln can be rotated while a carbon compound gas is being made to flow, and then, the catalyst powder becomes of a stirred state, and carbon nanocoils can be mass-produced with the fine particles of catalyst as catalyst nuclei. As for the stirring method, a rotation method, a vibration method or other known methods can be adopted.

The forty-eighth mode of the present invention provides carbon nanocoils that are synthesized in accordance with any of the synthesizing methods for carbon nanocoils of the forty-first to forty-fourth modes. Accordingly, a large amount of carbon nanocoils can be synthesized, thus providing inexpensive nanocoils. In addition, carbon nanocoils having a uniform wire diameter and a uniform coil outer diameter can be provided when synthesized using a catalyst that is carried by a porous carrier. Accordingly, these carbon nanocoils having a uniform wire diameter and a uniform coil outer diameter can be utilized so that high quality nano-substances, such as nano-springs, nano-machines, electromagnet wave absorbers, electron emitters, nano-electron devices and hydrogen occluding bodies can be synthesized, so as to meet the requirements of various fields.

BEST MODE FOR CARRYING OUT THE INVENTION

The detailed description of the embodiments of the present invention is formed of the following four parts. Accordingly, the embodiments of the present invention are described with reference to the drawings in this order.

(1) Description of carbide catalysts of (a transition metal element, In, C).

(2) Description of carbide catalysts of (a transition metal element, Sn, C).
(3) Description of metal catalysts.
(4) Description of porous carriers for carrying a catalyst.

(1) Description of Carbide Catalyst of (Transition Metal Element, In, C)

In this first part, Fe is adopted as a representative example of transition metal elements, and a (Fe, In, C) carbide catalyst is described as an example of a (transition metal element, In, C) carbide catalyst. The same results can be obtained in the case where a transition metal element such as Co or Ni is used instead of Fe.

The present inventors diligently conducted research in order to mass-produce carbon nanocoils, and as a result, discovered that a Fe, In and Sn-based catalyst that is used as a starting catalyst is carbonized by a carbon compound gas which is a material gas in a reaction vessel. This carbide was analyzed and found to be a carbide having component elements of at least Fe, In and C, and the fact that this carbide catalyst makes carbon nanocoils grow and thus the present invention was completed.

The process of this discovery is described in the following. When carbon nanocoils are grown in accordance with a CVD method, an electronic microscope image thereof shows catalyst nuclei which are attached to the ends of tubules of the carbon nanocoils. The present inventors consider that these catalyst nuclei are made of a catalyst material which directly makes carbon nanocoils grow.

The present inventors consider that these catalyst nuclei decompose the carbon compound gas so as to generate carbon atoms, and tubules grow while winding during the process where these carbon atoms are deposited on the ends of the tubules, and thus, carbon nanocoils grow.

Figure 1:
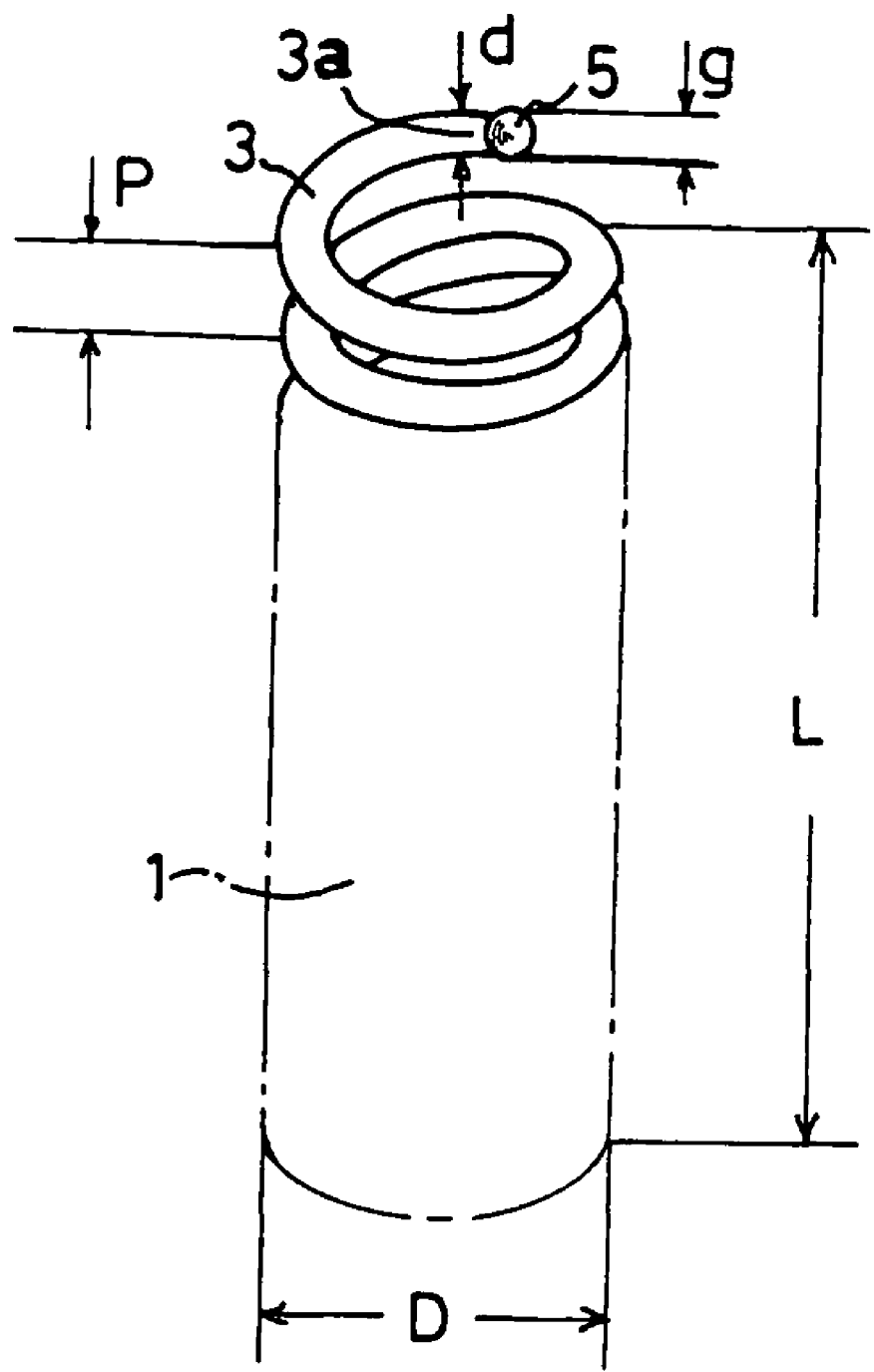
FIG. 1 is a schematic perspective diagram showing a carbon nanocoil 1.

FIG. 1 is a schematic prospective diagram showing a carbon nanocoil 1. Carbon nanocoil 1 has a tubule 3 that is formed so as to wind, and has a coil outer diameter D, a coil length L, and a coil pitch P. A tubule means a carbon fiber. What is important is the fact that a catalyst nucleus 5 is attached to the end 3a of the tube.

The diameter of this catalyst nucleus 5 is assumed to be g. It is considered that this catalyst nucleus 5 decomposes a carbon compound gas so that carbon atoms are deposited on the nucleus, and thereby, tubule 3 having a cross sectional diameter of d grows. It is observed that tubule 3 is a carbon nanotube.

Though catalyst nuclei 5 may vary in shape such as spherical, angular, and plug-shaped, a representative portion thereof is assumed to have diameter g. Diameter d of the tubule is not necessarily equal to diameter g of the catalyst nucleus, however, the diameters of both of these seem to correlate with each other.

It was found through the observation by the present inventors that the tubule diameter d is small when the diameter g of the catalyst nucleus is small and the tubule diameter g is great when the diameter g of the catalyst nucleus is great. From this fact, it can be said that the smaller the diameter g of the catalyst nucleus is, the smaller the diameter d of the tubule of the formed carbon nanocoil 1 is.

The present inventors also discovered while searching this point above that there is a certain correlation between the diameter d of the tube and the outer diameter D of the coil. That is, the outer diameter D of the coil tends to be small when the diameter d of the tubule is small, and the outer diameter D of the coil tends to be great when the diameter d of the tubule is great.

The discovery of these two correlations leads to the conclusion as follows. The smaller the diameter g of the catalyst nucleus is, the smaller the diameter d of the tubule and the outer diameter D of the coil are, and conversely, the greater the diameter g of the catalyst nucleus is, the greater the diameter d of the tubule and the outer diameter D of the coil of carbon nanocoil 1 tend to be. In other words, carbon nanocoils 1 of a small size can be synthesized by using catalyst nuclei 5 having a small diameter g, and carbon nanocoils 1 of a uniform size can be synthesized by using catalyst nuclei 5 having a uniform diameter g.

Next the present inventors examined where catalyst nuclei 5 that are attached to ends 3a of the tubules of carbon nanocoils 1 come from. As for a substrate method where a catalyst thin film is formed on a substrate, the presumption of the inventors is as follows. First, the catalyst thin film is granulated and converted to a catalyst fine particle film during the process where a carbon compound gas flows through the catalyst thin film on the substrate. These fine particles of the catalyst decompose the carbon compound gas, making carbon atoms be deposited beneath the fine particles, and then, carbon nanocoils 1 grow upward. As a result, it is considered that the fine particles of the catalyst are lifted up so as to be attached to ends 3a of the tubules. In order to confirm this, an experiment of growing carbon nanocoils 1 was carried out.

Figure 2:
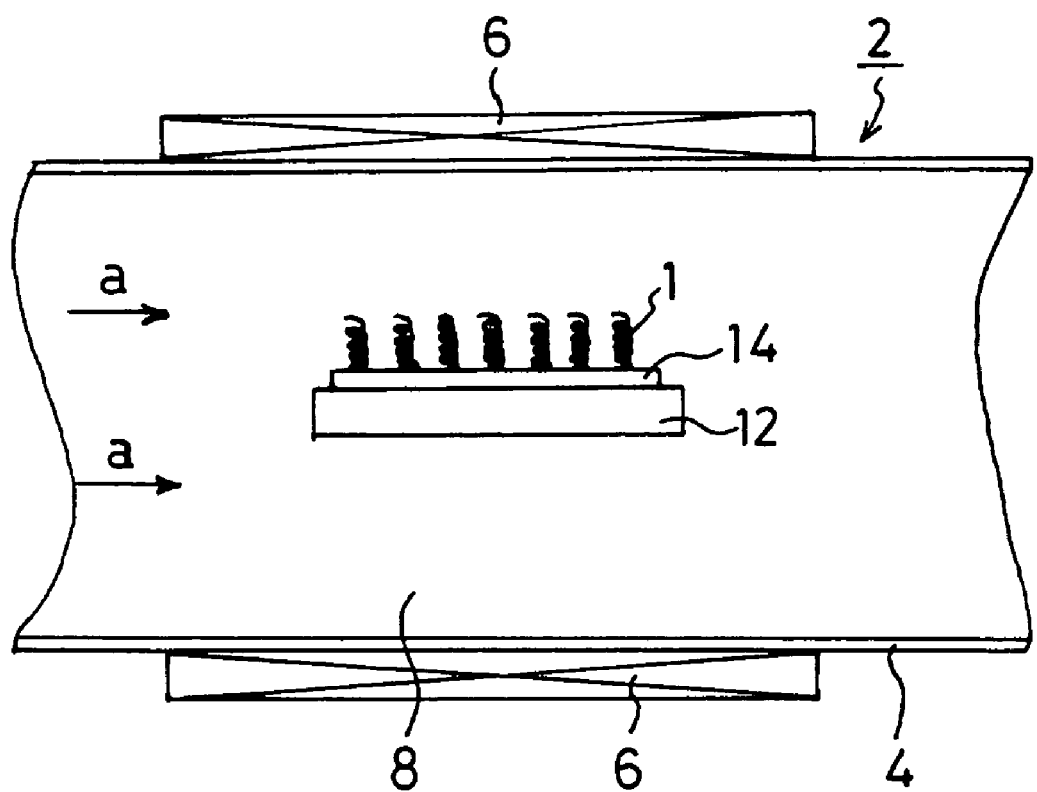
FIG. 2 is a schematic diagram showing the configuration of a carbon nanocoil synthesizing apparatus 2.

FIG. 2 is a schematic diagram showing the configuration of a carbon nanocoil synthesizing apparatus 2. In this carbon nanocoil synthesizing apparatus 2, a heating apparatus 6 is placed around the outside of a reaction vessel 4 and a reaction chamber 8 that becomes an isothermal region is formed in reaction vessel 4.

A substrate 12 on which a catalyst thin film 14 is formed is placed in a predetermined position in reaction chamber 8. This catalyst thin film 14 is made of a catalyst for synthesizing carbon nanocoils, which is an Fe.In.Sn-based catalyst thin film that has already been discovered by some of the present inventors. Though the compounding ratio of Fe to In to Sn can be adjusted freely, for example, it is desired for Fe to be adjusted to a range from 10 mol % to 99.99 mol % relative to In, and for Sn to be adjusted to a range from 0 mol % to 30 mol % relative to In.

A carrier gas and a carbon compound gas (material gas) are supplied to the reaction chamber in the direction of arrow a. The carbon compound gas is a carbon source gas for growing carbon nanocoils, and organic gases such as nitrogen containing organic gases, sulfur containing organic gases, and phosphorus containing organic gases in addition to hydrocarbons are widely used. From among these, hydrocarbons which do not generate an extra substance are preferable.

As for the hydrocarbons, alkane compounds such as methane and ethane, alkene compounds such as ethylene and butadiene, alkyne compound such as acetylene, aryl hydrocarbons such as benzene, toluene and styrene, aromatic hydrocarbons such as naphthalene and phenanthrene, and cycloparaffin compounds such as cyclopropane and cyclohexane can be utilized. In addition, a mixed hydrocarbon gas of two or more types may be used, and particularly, low molecular hydrocarbons such as acetylene, allylene, ethylene, benzene and toluene are preferable.

As for the carrier gas, gases such as He, Ne, Ar, $N_2$ and $H_2$ are utilized and a He gas is utilized in this embodiment. The carrier gas is a gas for carrying the carbon compound gas, and gases which do not react and are not consumed are utilized as the carrier gas contrary to the carbon compound gas which is consumed through reaction.

The inside of reaction chamber 8 is heated to a predetermined temperature. The heating temperature is adjusted to the minimum temperature or higher where the carbon compound gas is decomposed by the catalyst. Accordingly, though the heating temperature varies and is adjusted depending on the type of the catalyst and the type of the carbon compound gas, it is desired for it to be set at, for example, 600° C. or higher.

The carbon compound gas and the carrier gas are supplied as a mixed gas in the direction of arrow a, and substrate 12 is placed so that this carbon compound gas makes contact with the surface of the catalyst. The carbon compound gas is decomposed during the process of making contact with catalyst thin film 14, and carbon atoms that are generated through decomposition of the gas are deposited on the surface of the catalyst so that carbon nanocoils 1 are formed.

An innumerable number of carbon nanocoils 1 are generated on the surface of catalyst thin film 14. As described above, catalyst thin film 14 is an Fe.In.Sn-based catalyst thin film, and it is determined from the amount of carbons in the carbon compound gas and the amount of the generated carbon nanocoils that the yield is approximately 90% when this catalyst is used.

Figure 3:
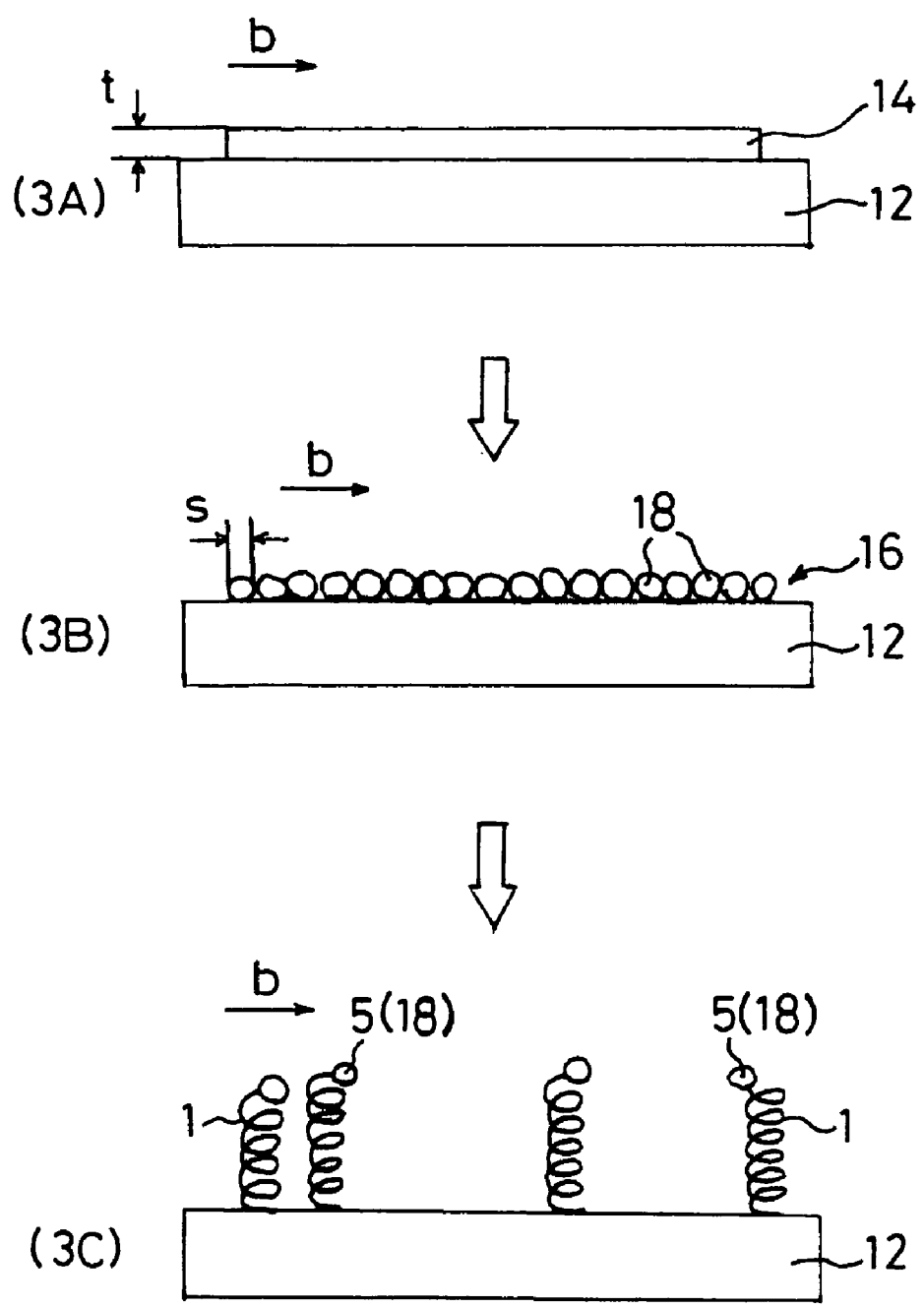
FIG. 3 is a schematic diagram illustrating a process during which carbon nanocoils 1 grow on a catalyst thin film 14.

FIG. 3 is a schematic diagram showing the process during which carbon nanocoils 1 grow due to catalyst thin film 14. In this embodiment, 60 sccm of a $C_2H_2$ gas is utilized as a carbon compound gas and 200 sccm of an $H_2$ gas is utilized as a carrier gas and the heating temperature is set at 700° C. in order to decompose acetylene.

Catalyst thin film 14 is formed of a catalyst thin film of mixed oxides of an Fe oxide, an In oxide and an Sn oxide. The composition formula of the oxide catalyst differs depending on the compounding ratio of the respective component oxides, and a catalyst thin film of mixed oxides where the composition formula is represented by, for example, $Fe_5InSn_{0.1}O_y$, $Fe_3InSn_{0.1}O_y$ or $FeInSn_{0.1}O_y$ is utilized. In this embodiment, a catalyst thin film of mixed oxides where the composition formula is $Fe_3InSn_{0.1}O_y$ is used. The film thickness t of the catalyst is set to 200 nm.

In (3A), a $C_2H_2$ gas that flows in the direction of arrow b makes contact and reacts with catalyst thin film 14 so as to be decomposed. When this reaction process is observed through a scanning electron microscope (hereinafter referred to as SEM), it was observed that catalyst thin film 14 is granulated before carbon nanocoils 1 grow.

In (3B), a state where catalyst thin film 14 has been granulated is shown. Catalyst thin film 14 is changed to a catalyst fine particle film 16 made of catalyst fine particles 18. When a $C_2H_2$ gas is made to continuously flow, catalyst thin film 14 is gradually divided into sections and each section is changed in the form to a catalyst fine particle 18. It was confirmed that the diameter (particle diameter) s of catalyst fine particles 18 is gradually reduced from a large size to a small size as time elapses.

In (3C), when a $C_2H_2$ gas is made to continuously flow through this catalyst fine particle film 16, it was observed that carbon nanocoils 1 grow. It was confirmed through the SEM that catalyst nuclei 5 are attached to the ends of carbon nanocoils 1. It was also confirmed that carbon nanocoils 1 start growing at a stage where catalyst fine particles 18 are minimized.

Carbon nanocoils 1 start growing at a stage where catalyst fine particles 18 are minimized to a degree where they can not be seen by the SEM, and therefore, the present inventors determine without doubt that these minimized catalyst fine particles 18 become catalyst nuclei 5 for growing carbon nanocoils 1. Accordingly, in (3C), catalyst nuclei 5 are denoted as catalyst nuclei 5 (18).

The present inventors carried out a powder X-ray analysis by irradiating the catalyst surface with X-rays and measuring the intensity of the diffracted rays with a diffractometer in order to analyze the structure of the substance of catalyst fine particles 18 shown in (3B). It was confirmed that the distribution of this X-ray intensity has a first intensity peak in the vicinity where 2θ is approximately 39.6° and has a second intensity peak in the vicinity of approximately 46.3° when the diffraction angle is measured as 2θ. When this intensity distribution is compared with intensity data on the known substances, it was strongly presumed that the structure of catalyst fine particles 18 is $Fe_3InC_{0.5}$. Accordingly, the composition formula of this catalyst is determined to be $Fe_3InC_{0.5}$.

$Fe_3InC_{0.5}$ is a carbide of Fe.In and it has become certain that the catalyst thin film that is formed of an Fe.In.Sn-based catalyst chemically reacts with $C_2H_2$ so as to be carbonized. It was also found that Sn exists as impurity atoms within the substance of $Fe_3InC_{0.5}$.

As described above, the carbide catalyst according to the present invention is a carbide catalyst made of, at least, Fe, In, and C, and is a carbide catalyst of which the composition formula is at least represented by $Fe_xIn_yC_z$. In a more specific form, this is a carbide catalyst of which the composition formula is at least represented by $Fe_3InC_{0.5}$.

In addition, in the case where Sn is taken into consideration as an added element, the carbide catalyst according to the present invention is a carbide catalyst made of at least, Fe, In, C and Sn and is a carbide catalyst of which the composition formula is at least represented by $Fe_xIn_yC_zSn_w$. In a more specific form, this is a carbide catalyst of which the composition formula is at least represented by $Fe_3InC_{0.5}Sn_w$ (w>0). The added ratio of Sn can be adjusted, and therefore, the condition of w>0 is added.

Further details are described as follows. The composition formula of catalyst thin film 14 before being carbonized is $Fe_3InSn_{0.1}O_x$, where the content of Sn is 1/30 of Fe and at the same time, 1/10 of In. Accordingly, Sn is added from the beginning in such a manner that the amount thereof is approximately that of impurities, and therefore, it is considered that Sn still exists in $Fe_3InC_{0.5}$ as an impurity after the catalyst thin film has become a carbide. From this point of view, this carbide, in the case where Sn is contained, is represented by $Fe_3InC_{0.5}Sn_w$ (w>0). The composition ratio w may be greater than zero and Sn is added in a desired ratio.

It is clarified from the fact that the true catalyst for growing carbon nanocoils 1 is a carbide that is generated when the Fe.In.Sn-based catalyst is carbonized by a carbon compound gas, that is, $Fe_3InC_{0.5}$ or $Fe_3InC_{0.5}Sn_w$ (w>0). Accordingly, these carbides are referred to as carbide catalyst in the present invention and are differentiated from the Fe.In.Sn-based catalyst.

The component elements of these carbide catalysts include many of the boron group elements (group 3) and the carbon group elements (group 4), such as In, C and Sn, and Sn which belongs to the carbon group elements is added to the catalysts as an element for growing carbon nanocoils. In addition, it was confirmed that carbon nanocoils grow with a high density when Sn is added, and thus, it can be said that Sn is an element for growth acceleration.

From this point of view, the carbon group elements such as Si and Ge in addition to Sn, the boron group elements such as B, Al, Ga and Tl and the nitrogen group elements such as N, P, As, Sb and Bi can be utilized as an element for group acceleration. In addition, a boron group element and a nitrogen group element may be combined, or a combination of an alkaline earth element (Be, Mg, Ca, Sr or Ba) in group 2 and an oxygen group element (S, Se, Te or Po) in group 6 can be utilized. Furthermore, other metal elements, non-metal elements and the like which have a function of growth acceleration can of course be utilized.

Figure 4:
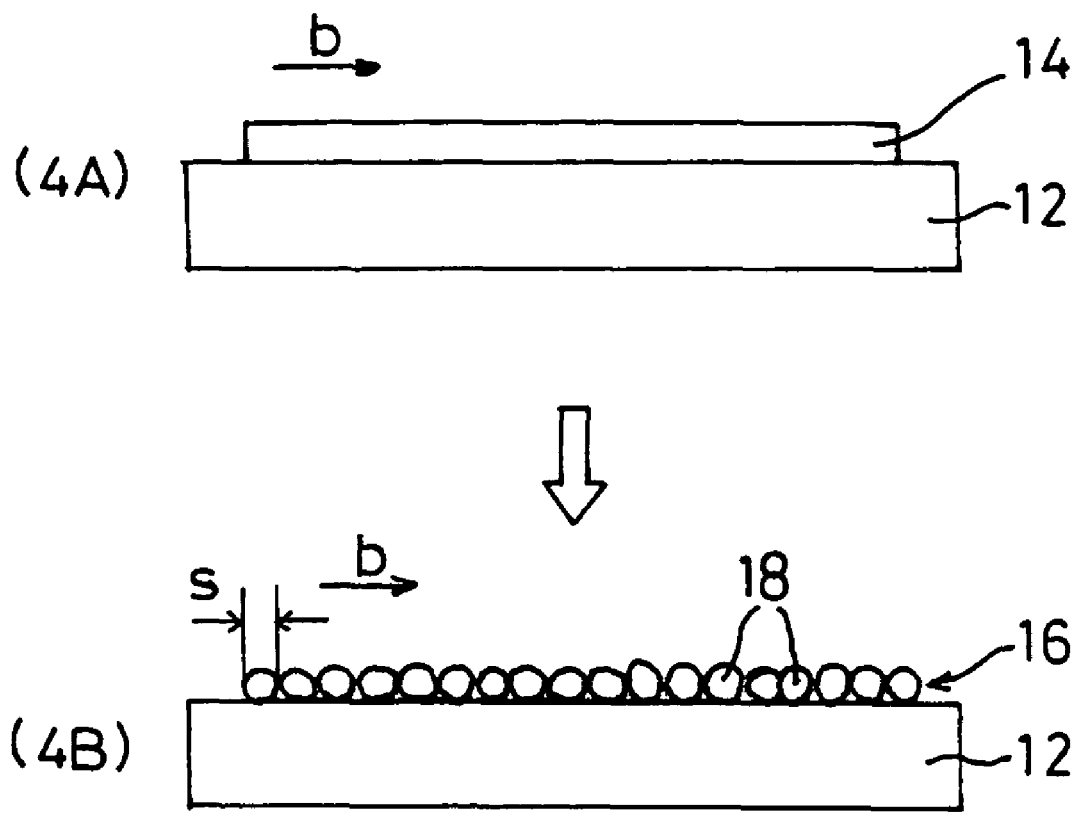
FIG. 4 is a diagram showing the steps of a first method for synthesizing a carbide catalyst.

FIG. 4 is a diagram showing the process of a first method for synthesizing a carbide catalyst. In (4A) a catalyst thin film 14 made of an Fe.In.Sn-based catalyst is formed on the surface of a substrate 12. This Fe.In.Sn-based catalyst may be a thin film that includes at least the three elements Fe, In and Sn. In the case of an oxide, for example, the catalyst is formed of mixed oxides of an Fe oxide, an In oxide and an Sn oxide and there are oxides of which the composition formulas are, for example, $Fe_5InSnO_{0.1}O_x$ or $FeInSn_{0.1}O_x$. The catalyst may, of course, be a compound other than the above, or may be an alloy of Fe.In.Sn.

Though an appropriate film thickness t of this catalyst thin film 14 is in a range from 10 nm to several μm, it is not limited to a value in this range. The smaller the film thickness t is, the smaller diameter s of the below described catalyst fine particles 18 can be. When a carbon compound gas is made to flow in the direction of arrow b so as to make contact with the surface of this catalyst thin film 14, catalyst thin film 14 starts being carbonized by this carbon compound gas.

In (4B), catalyst thin film 14 is carbonized, and a catalyst fine particle film 16 made of catalyst fine particles 18 of a carbide is generated. Diameter s of catalyst fine particles 18 becomes smaller as the process of carbonization progresses. Accordingly, the flow of the carbon compound gas is blocked at an appropriate point in time, in order to determine the size of diameter s of carbon fine particles 18 at this point in time.

The reason why diameter s of catalyst fine particles 18 changes is considered to be as follows. In the case where catalyst thin film 14 is an oxide catalyst, catalyst thin film 14 expands during the process of absorbing C atoms, and contracts and granulates during the process of releasing O atoms. Subsequently, catalyst fine particles 18 expand during the process of absorbing C atoms, contract during the process of releasing O atoms, and diameter s of the particles gradually becomes smaller due to the release of a large amount of O atoms. When heating is stopped at an arbitrary point in time, or the supply of a carbon compound gas is stopped, the process of expansion and contraction of catalyst fine particles 18 is completed, so that diameter s can be determined.

Figure 5:
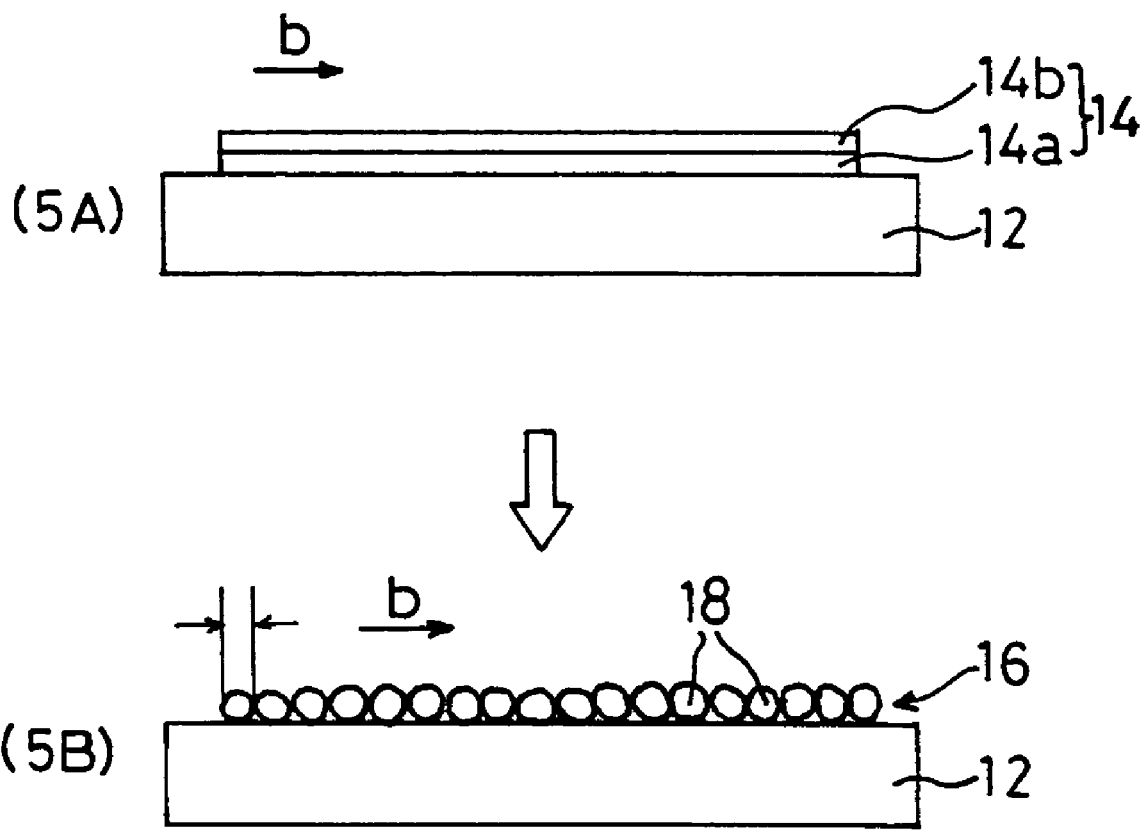
FIG. 5 is a diagram showing the steps of a second method for synthesizing a carbide catalyst.

FIG. 5 is a diagram showing the process of a second method for synthesizing a carbide catalyst. In (5A), a catalyst thin film 14 made of an Fe.In.Sn-based catalyst is formed on the surface of a substrate 12. This catalyst thin film 14 is a two-layer catalyst thin film where an Fe thin film 14b is formed on an In.Sn-based catalyst thin film 14a. A mixed oxide thin film of, for example, an In oxide and an Sn oxide, that is, an ITO thin film, is on In.Sn-based catalyst thin film 14a. A carbon compound gas is made to flow in the direction of arrow b along the surface of this catalyst thin film 14.

In (5B), a catalyst fine particle film 16 made of catalyst fine particles 18 of a carbide is generated. The process of carbonization due to a carbon compound gas progresses in the same manner as in (4B) on the two-layer type catalyst thin film. As a result, catalyst thin film 14 is carbonized, so as to be changed into catalyst fine particles 18 of a carbide. Diameter s of catalyst fine particles 18 becomes smaller as the process of carbonization progresses, and the flow of the carbon compound gas is blocked at an appropriate point in time, in order to determine the size of diameter s of carbide fine particles 18 at this point in time.

The reason why diameter s of catalyst fine particles 18 changes is considered to be exactly the same as that of FIG. 4, and therefore, the details thereof are omitted. Accordingly, in the case where heating is stopped, or the supply of the carbon compound gas is stopped at an arbitrary point in time, the process of expansion and contraction of catalyst fine particles 18 is completed and diameter s is determined.

Other fabrication methods for Fe.In.Sn-based catalyst thin film 14 in FIGS. 4 and 5 include a vapor phase method, a liquid phase method and a solid phase method. A physical vapor deposition method (PVD method) and a chemical vapor deposition method (CVD method) can be utilized as the vapor phase method. The CVD method is also referred to as chemical vapor growth method.

The PVD method includes vapor deposition, electron beam deposition, laser ablation, molecular beam epitaxy (MBE), reactive vapor deposition, ion plating, cluster ion beam, glow discharge sputtering, ion beam sputtering and reactive sputtering. MOMBE using a metal organic (MO) material, chemical beam epitaxy (CBE) and gas source epitaxy (GSE) can be utilized as the MBE method.

The CVD method includes thermal CVD, metal organic CVD (MOCVD), RF plasma CVD, ECR plasma CVD, optical CVD, laser CVD and mercury photosensitization.

The liquid phase method includes liquid phase epitaxy, electro plating, electroless plating and an application method. In addition, the solid phase method includes solid phase epitaxy, a re-crystallization method, graphoepitaxy, a laser beam method, and a sol-gel method.

Figure 6:
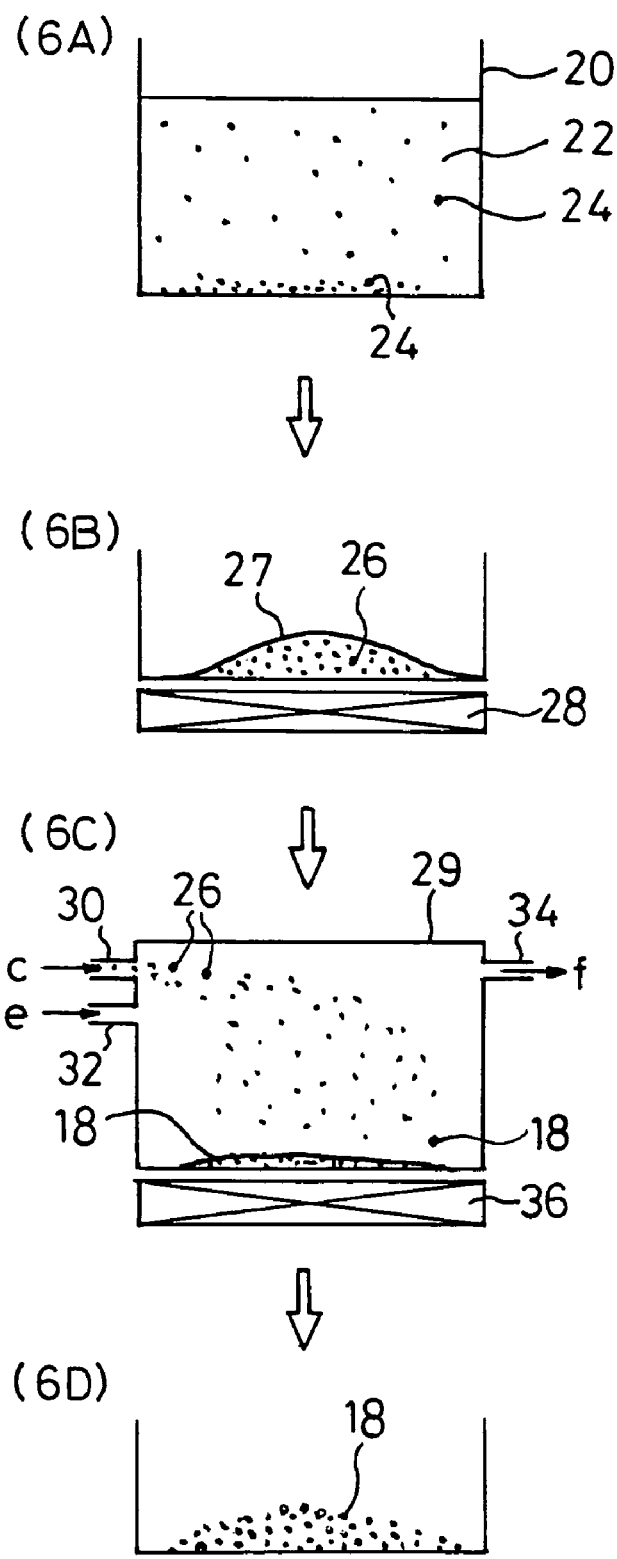
FIG. 6 is a diagram showing the steps of a third method of the present invention for synthesizing fine particles 18 of a carbide using a solution method.

FIG. 6 is a diagram showing the steps for synthesizing catalyst fine particles 18 of a carbide using a solution method in accordance with a third method. This solution method is characterized in that a larger amount of a powder of catalyst fine particles 18 can be synthesized than in the substrate method.

In (6A), a solvent 22 is contained in a container 20, and an Fe compound, an In compound and an Sn compound are added to this solvent 22. When the solution is mixed and stirred, these three types of compound are uniformly mixed and converted into a colloid, in such a manner that an innumerable number of colloid particles 24 are formed in the solution.

During the process of conversion into a colloid, the three types of compound form an intermediate through a physical or chemical reaction, and this intermediate forms colloid particles 24. The diameter of colloid particles 24 can be freely controlled by adjusting the concentration of the added compounds. In some cases, an excessive amount of colloid particles 24 settle on the bottom of container 20.

In (6B), colloid particles 24 are separated from solvent 22 and put into a heating container as a solid component 27. This solid component 27 is baked in an oxygen atmosphere using a heating apparatus 28, so as to generate fine particles 26 of oxides of Fe.In.Sn. It is possible to control the diameter of oxide fine particles 26 by controlling the diameter of colloid particles 24. The diameter of colloid particles 24 can be controlled by adjusting, for example, the concentration or the temperature.

In (6C), carbide catalyst fine particles 18 are generated from oxide fine particles 26. A baking furnace 29 is heated to an appropriate baking temperature using a heating apparatus 36. Oxide fine particles 26 are introduced in the direction of arrow c through a nozzle pipe 30. A mixed gas of a carbon compound gas and a carrier gas is introduced in the direction of arrow e through a gas-supplying pipe 32.

In baking furnace 29, oxide fine particles 26 are carbonized by the carbon compound gas. It is preferable for the baking temperature to be 300° C. to 1200° C., and the time for carbonization is adjusted to several seconds to several tens of minutes. The time for carbonization can also be adjusted through the concentration of the carbon compound gas. The carrier gas and the carbon compound gas are selected from the types of gases.

Carbide catalyst fine particles 18 that are generated through baking process drop and are deposited on the bottom of baking furnace 29. The gas after the reaction is discharged in the direction of arrow f through a discharging pipe 34. As described above, as shown in (6D), carbide catalyst fine particles 18, such as $Fe_3InC_{0.5}$ or $Fe_3InC_{0.5}Sn_x$ (x>0) are synthesized.

Diameter s of these carbide catalyst fine particles 18 depends on the diameter of colloid particles 24, and is adjusted in a range form 1 nm to 100 μm. The smaller diameter s is, the smaller tubule diameter d of carbon nanocoils 1 becomes. As a result, carbon nanocoils 1 of a smaller size can be synthesized.

Known inorganic compounds.organic compounds can be utilized as the Fe compound, the In compound and the Sn compound that are utilized in this method. Iron chloride, iron sulfate, iron nitrate, iron bromide, iron carbonyl, indium chloride, indium sulfate, indium nitrate, indium carboxylate, indium acetyl-acetonate, tin chloride, tin sulfate, tin nitrate and tin carboxylate, for example, can be cited. In addition to these, various types of known compounds are also used. In particular, in the case where an organic compound is used, the organic matter is completely burned and removed through baking, and a pure Fe.In.Sn carbide catalyst can be synthesized.

A mixed solution of an Fe compound and an In compound, or a mixed solution of an Fe compound, an In compound and an Sn compound may be prepared, or other compounds of an element for growth acceleration may be added. The total concentration of metal ions in the solution is not particularly limited, but rather, may be a concentration for allowing the reaction to progress smoothly. Usually, the concentration is 0.01 wt % to 50 wt %, and preferably, 0.1 wt % to 20 wt %.

Concretely, the process, from the formation of the solution to baking, is as follows. An alkaline mixed solution of an iron salt, an indium salt and a tin salt, for example, is prepared, and after that, the solid component is separated, this solid component is dried and ground, if necessary, and finally, carbonized through baking, so as to synthesize carbide fine particles 18. Alternatively, organic compounds of iron, indium and tin may be dispersed in a solvent, and a precursor of an Fe.In.Sn based compound formed through a chemical reaction, for example, a hydrolysis reaction. This precursor may be separated, dried and ground, if necessary, and finally, baked and carbonized so as to synthesize carbide fine particles.

Any known separation methods can be utilized for the separation of the solid component from the solution. Drying is usually carried out in a range of room temperature to 300° C., preferably 50° C. to 200° C., and known inorganic substance grinding methods can be adopted for the grinding.

The composition ratio (mol %) of iron/indium of oxide fine particles 26 that are obtained in accordance with a solution method is usually 10 to 99.99 (mol %), preferably 20 to 99 (mol %). The composition ratio of tin/indium is 0 to 30 (mol %), preferably 0.1 to 10 (mol %). Diameter s of carbide catalyst fine particles 18 that are ultimately generated is 1 nm to 100 μm, depending on the solution parameters, such as the diameter of colloid particles.

A sputtering method may be utilized as another synthesizing method of the carbide catalyst. A target that contains at least Fe and In is sputtered with ions, so as to make target particles fly off. These target fine particles are carbonized in a heated state, by making them make contact and react with a carbon compound gas, and thereby, a carbide catalyst that contains at least elements Fe, In and C is synthesized. Sn may be added to the target as another element, and thereby, a carbide catalyst that contains at least elements Fe, In, C and Sn can be synthesized.

A gas phase reaction method may be utilized as still another synthesizing method of the carbide catalyst. At least an Fe compound gas and an In compound gas are brought into contact and made to react with a carbon compound gas so as to be carbonized in a reaction vessel in a heated state, and thereby, fine particles of a carbide catalyst that contains at least elements Fe, In and C are synthesized. In the gas phase reaction method, known gas phase reaction technologies can be utilized. In the case where an Sn compound gas is added as another element gas, a carbide catalyst that contains at least elements Fe, In, C and Sn can be synthesized.

Next, a synthesizing method of carbon nanocoils using the carbide catalyst of the present invention is described. In accordance with the first basic principle of this synthesizing method of carbon nanocoils, carbon nanocoils are grown by making a carbon compound gas make contact with a carbide catalyst that contains at least Fe, In and C, so that the carbon compound gas is decomposed by this carbide catalyst in a heated state. There is an advantage that carbon nanocoils can be mass-produced, simply by bringing a carbon compound gas into contact with a carbide catalyst in a heated state. In the case where fine particles of the carbide catalyst are used, the size of the carbon nanocoils can be controlled.

In accordance with the second basic principle, a two-stage synthesizing method is provided. In the first process, a catalyst precursor substance that contains at least Fe and In is brought into contact with a carbon compound gas in a heated state, so as to form a carbide catalyst having at least Fe, In and C. Immediately after this first process, in the second process, the carbon compound gas is decomposed in a heated state due to the carbide catalyst, so as to grow carbon nanocoils. The first process and the second process are sequentially carried out, and thereby, the catalyst precursor substance is changed into a carbide catalyst, and subsequently, carbon nanocoils start growing. This is different from the first basic principle in that the starting substance is a catalyst precursor substance in the second basic principle. In the following, a synthesizing method of carbon nanocoils is concretely described.

In accordance with the first basic principle, in the case where a carbide catalyst to which Sn is added, in addition to elements Fe, In and C, is utilized, it becomes possible to grow carbon nanocoils with high efficiency. In addition, in accordance with the second basic principle, Sn may, of course, be added to the catalyst precursor substance as another element, in order to make it possible to grow carbon nanocoils with high efficiency in the same manner.

Figure 7:
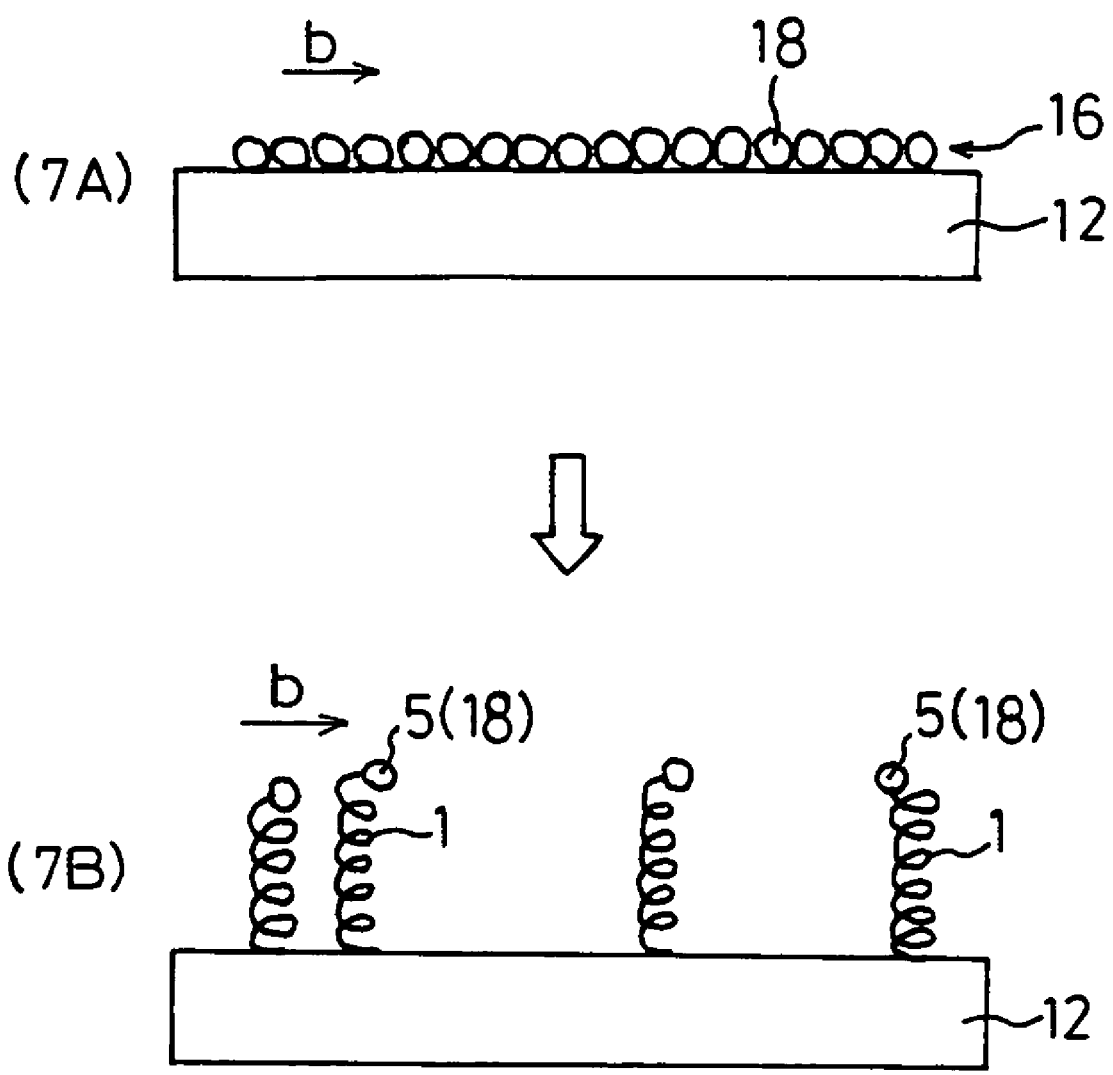
FIG. 7 is a diagram showing the steps of a first synthesizing method of carbon nanocoils using fine particles 18 of a carbide catalyst.

FIG. 7 is a diagram showing the steps of the first synthesizing method of carbon nanocoils using carbide catalyst fine particles 18. In (7A), carbide catalyst fine particles 18 are applied to a substrate 12 so as to form a catalyst fine particle film 16. A carbon compound gas is made to flow together with a carrier gas in the direction of arrow b while heating this substrate 12 to an appropriate temperature.

In (7B), carbide catalyst fine particles 18 become catalyst nuclei 5, and thereby, an innumerable number of carbon nanocoils 1 grow on substrate 12. Carbon nanocoils 1 are scraped off from substrate 12 with a scraper or the like, so that carbon nanocoils 1 can be collected after having been grown.

Figure 8:
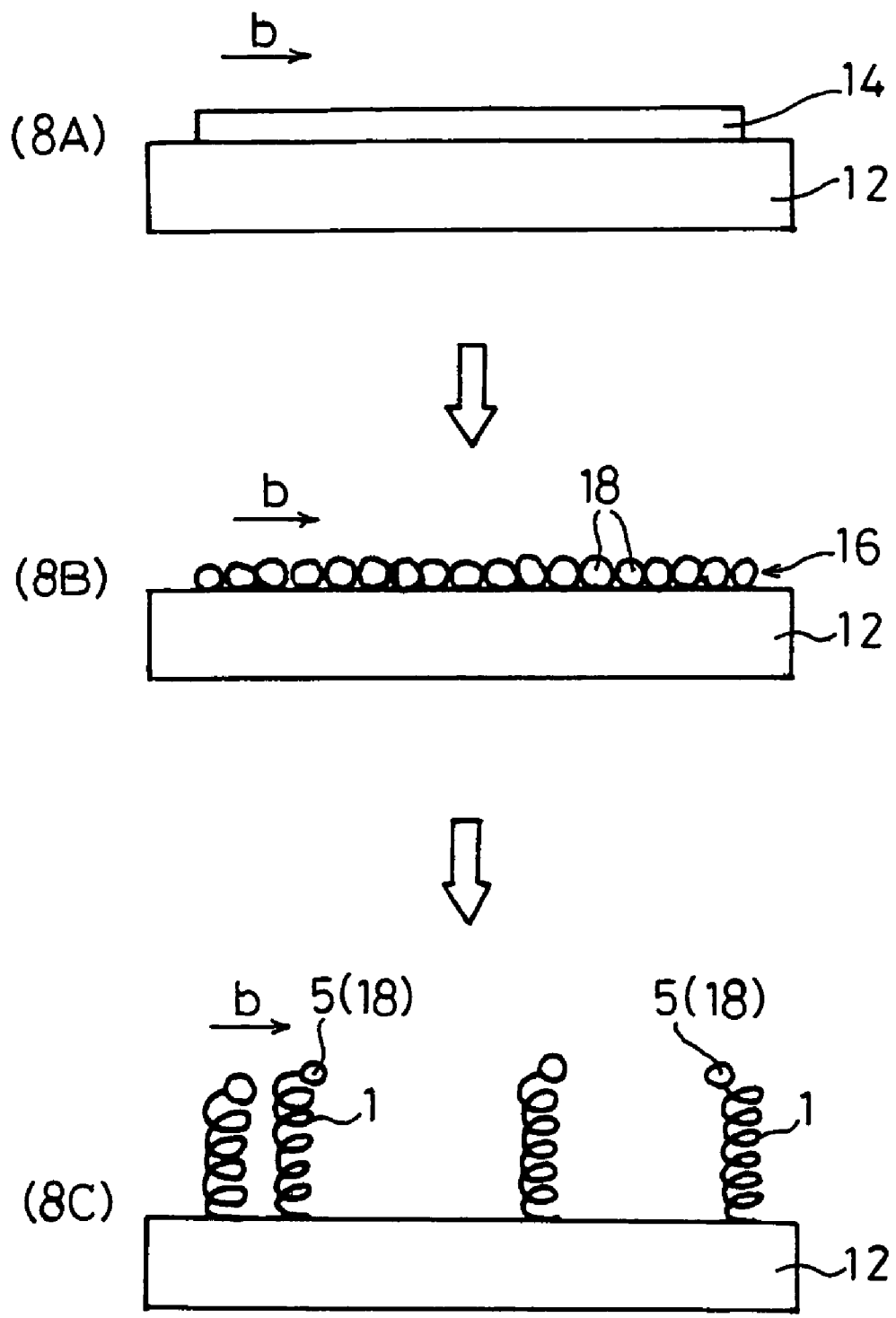
FIG. 8 is a diagram showing the steps of a second synthesizing method of carbon nanocoils, starting from an Fe.In.Sn-based catalyst thin film 14.

FIG. 8 is a diagram showing the steps of the second synthesizing method of carbon nanocoils, starting from an Fe.In.Sn-based catalyst thin film 14. In (8A), Fe.In.Sn-based catalyst thin film 14 is formed on a substrate 12. A carbon compound gas is made to flow together with a carrier gas in the direction of arrow b while heating this substrate 12 to an appropriate temperature.

In (8B), Fe.In.Sn-based catalyst thin film 14 is carbonized by the carbon compound gas, so as to form catalyst fine particles 18 of a carbide, and thus, a catalyst fine particle film 18 is formed on substrate 12. The process of carbonizing Fe.In.Sn-based catalyst thin film 14 into catalyst fine particle film 18 occurs for several seconds to several tens of minutes. This time for carbonization depends on the amount of flow and the concentration of the carbon compound gas, as well as the heating temperature.

In (8C), immediately after the formation of catalyst fine particle film 16, a carbon compound gas is made to flow in the direction of arrow b, so that an innumerable number of carbon nanocoils 2 are grown on substrate 12 due to catalyst fine particle film 18. The figure shows that catalyst fine particles 18 become catalyst nuclei 5 of carbon nanocoils 1.

Figure 9:
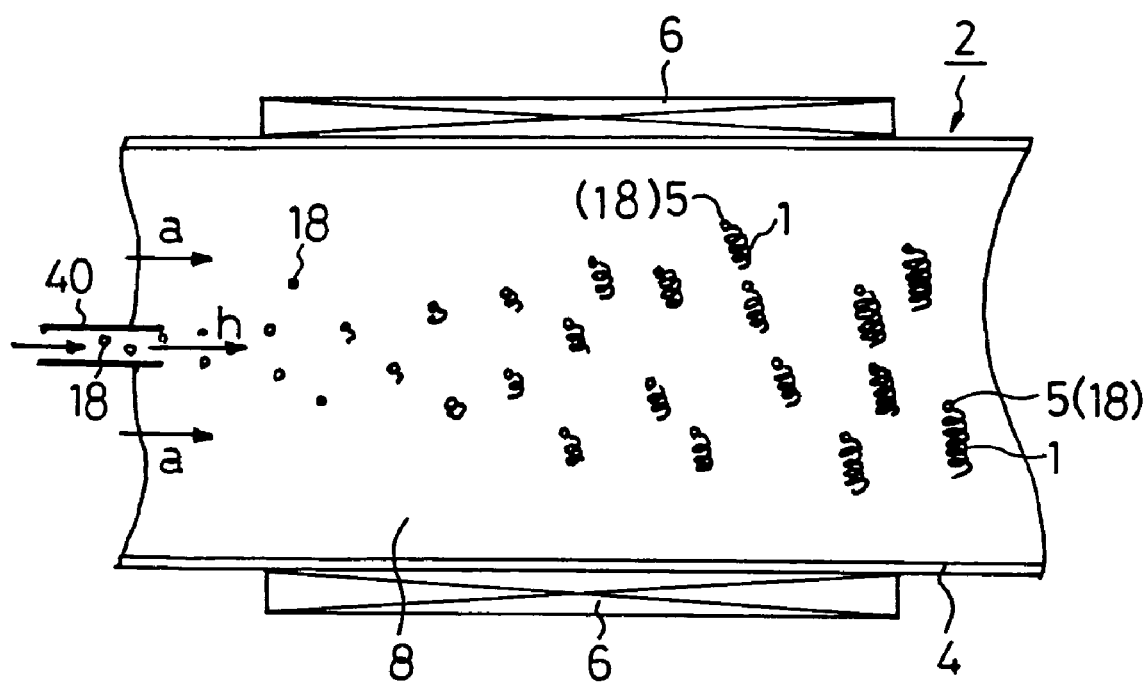
FIG. 9 is a schematic diagram for illustrating a third method (flowing synthesizing method) for synthesizing carbon nanocoils 1 by making fine particles 18 of a carbide catalyst float.

FIG. 9 is a schematic diagram illustrating the third method (flow synthesizing method) for synthesizing carbon nanocoils 1 by making carbide catalyst fine particles 18 float. In this carbon nanocoil synthesizing apparatus 2, a heating apparatus 6 is placed around the outside of a reaction vessel 4, and a reaction chamber 8 is formed inside. A spraying nozzle 40 is placed on the left side of reaction vessel 4.

A carbon compound gas flows together with a carrier gas in the direction of arrow a. A powder made of carbide catalyst fine particles 18 is sprayed from spraying nozzle 40 into this carbon compound gas in the direction of arrow h. Catalyst fine particles 18, which are dispersed in the space, become catalyst nuclei 5, and thereby, carbon nanocoils 1 grow. Catalyst fine particles 18 flow together with the flow of the carrier gas, and during this flowing process, carbon nanocoils 1 grow and are collected by a collecting apparatus, not shown.

Figure 10:
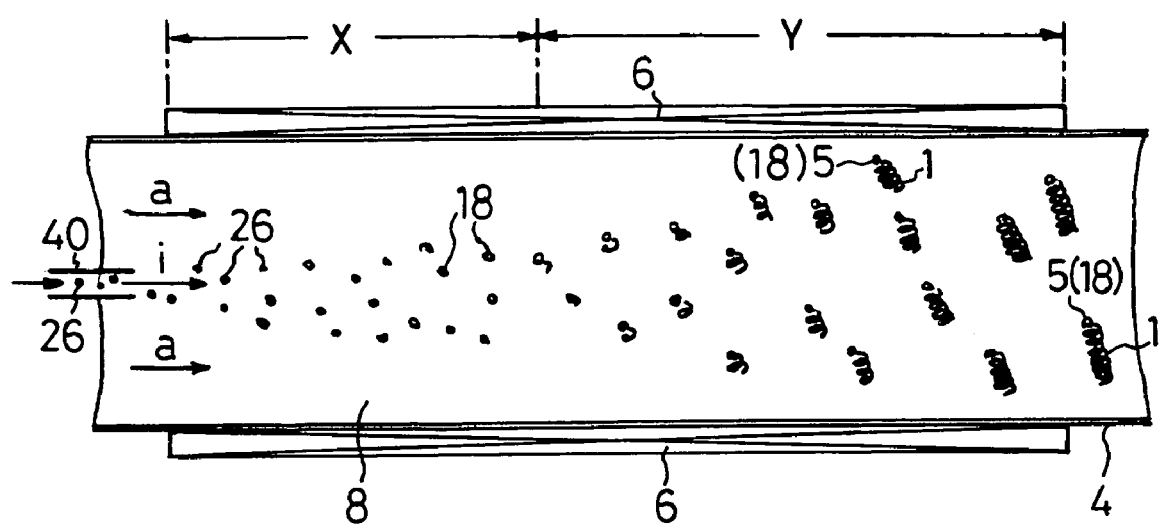
FIG. 10 is a schematic diagram for illustrating a fourth method (flowing synthesizing method) for synthesizing carbon nanocoils 1 by forming fine particles 18 of a carbide catalyst from fine particles 26 of an oxide that has been sprayed.

FIG. 10 is a schematic diagram illustrating the fourth method (flow synthesizing method) for synthesizing carbon nanocoils 1 by forming catalyst fine particles 18 from sprayed oxide fine particles 26. This carbon nanocoil synthesizing apparatus 2 is basically the same as that of FIG. 9, and therefore, only the differences are described. Reaction chamber 8 is formed of a catalyst fine particle-forming region X and a carbon nanocoil forming region Y, and heating apparatus 6 is made longer than that of FIG. 9, so that the two regions can be heated.

A carbon compound gas is made to flow together with a carrier gas in the direction of arrow a. Oxide fine particles 26 are sprayed into this carbon compound gas from spraying nozzle 40. These oxide fine particles 26 are carbonized by the carbon compound gas in catalyst fine particle forming region X, and thus, carbide catalyst fine particles 18 are formed.

These carbide catalyst fine particles 18 move through carbon nanocoil forming region Y in a floating state. Carbide catalyst fine particles 18 become catalyst nuclei 5 in this region Y, and thus, carbon nanocoils 1 grow. Catalyst fine particles 18 flow together with the flow of the carrier gas, and during this flowing process, carbon nanocoils grow and are collected by a collecting apparatus, not shown.

In addition to the substrate method and flow method, a stirring method can be utilized as a synthesizing method of carbon nanocoils. In accordance with this method, fine particles of a carbide catalyst are deposited in a reaction vessel, and a carbon compound gas is decomposed while stirring these deposited catalyst fine particles, so that carbon nanocoils can be grown in a stirred state.

This is described in further detail below. A powder of fine particles of a carbide catalyst is deposited, for example, in a rotary kiln, and the rotary kiln is rotated while carbon compound gas is being made to flow, so that the catalyst powder of a stirred state, and carbon nanocoils can be mass-produced with the catalyst fine particles as catalyst nuclei. A rotational method, a vibration method and other known methods can be adopted as the stirring method.

EXAMPLE 1

Synthesis of Carbon Nanocoils from Fe.In.Sn Oxide Thin Film

An Fe.In.Sn oxide thin film having a film thickness of 200 nm was formed on the (001) surface of an Si substrate. Carbon nanocoils were synthesized at approximately 700° C. with this oxide thin film as a starting catalyst by means of the carbon nanocoil synthesizing apparatus shown in FIG. 2. 60 sccm of a $C_2H_2$ gas was utilized as a carbon compound gas, which is a material gas, and 200 sccm of a He gas was used as a carrier gas.

The substrate was taken out 1 second, 5 seconds, 10 seconds, 1 minute, 5 minutes and 30 minutes after the gases were made to flow, and the state on the surface of the substrate was observed through a scanning electron microscope (SEM). The change in the Fe.In.Sn oxide thin film and the degree of growth of carbon nanocoils was confirmed from the respective states on the surface of the substrate.

Figure 11:
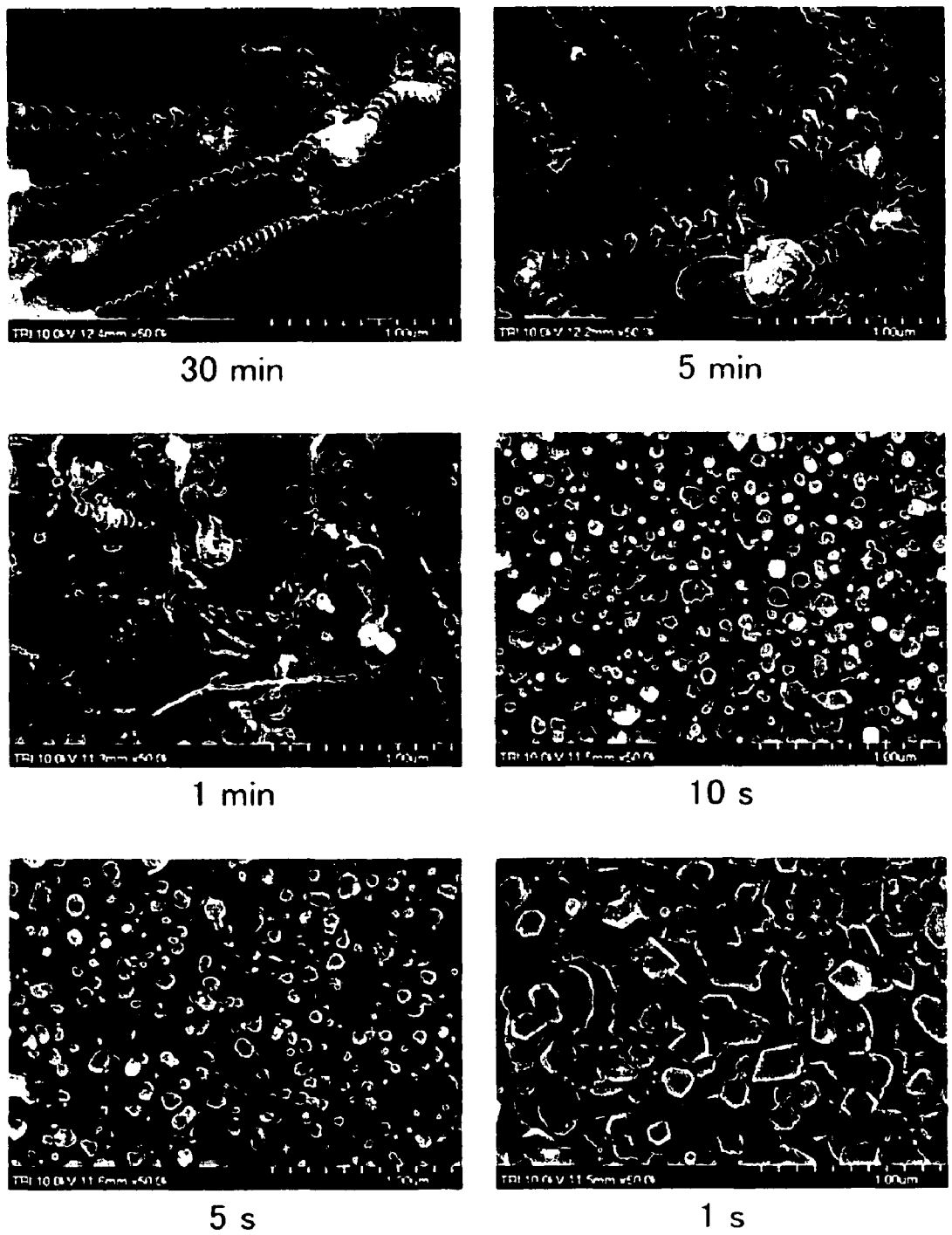
FIG. 11 shows images of an Fe.In.Sn oxide thin film which have been taken by a scanning electron microscope with a magnification of 50,000 times.

FIG. 11 is a SEM image of the Fe.In.Sn oxide thin film, taken at a magnification of 50,000 times. It was found that granulation of the Fe.In.Sn oxide tin film started after one second, and granulation was approximately completed after 5 or 10 seconds. These particles are carbide catalysts fine particles that were formed when the Fe.In.Sn oxide thin film was carbonized. As for the form of the particles, a variety of forms, such as spherical forms, diamond forms and the like are mixed.

The reason why the size of the catalyst fine particles after 1 second is greater than that of the catalyst fine particles after 5 or 10 seconds is considered to be as follows. C that was decomposed from $C_2H_2$ during the CVD growth for 1 second was absorbed by the catalyst, and as a result of this absorption, the volume of the catalyst fine particles increased. After this, the volume of the catalyst fine particles decreased by releasing O, so as to make the catalyst contract. It is assumed that the size of the catalyst fine particles decreased while this process was being repeated, until carbonization was completed and contraction stopped with a constant size of the catalyst fine particles.

After approximately 1 minute, carbon nanocoils started growing with the carbide catalyst fine particles as catalyst nuclei. It was observed that carbon nanocoils having a small size grew after 1 minute and carbon nanocoils having a large size grew after 5 minutes. Furthermore, it was confirmed that carbon nanocoils having a great coil length grew after 30 minutes.

Figure 12:
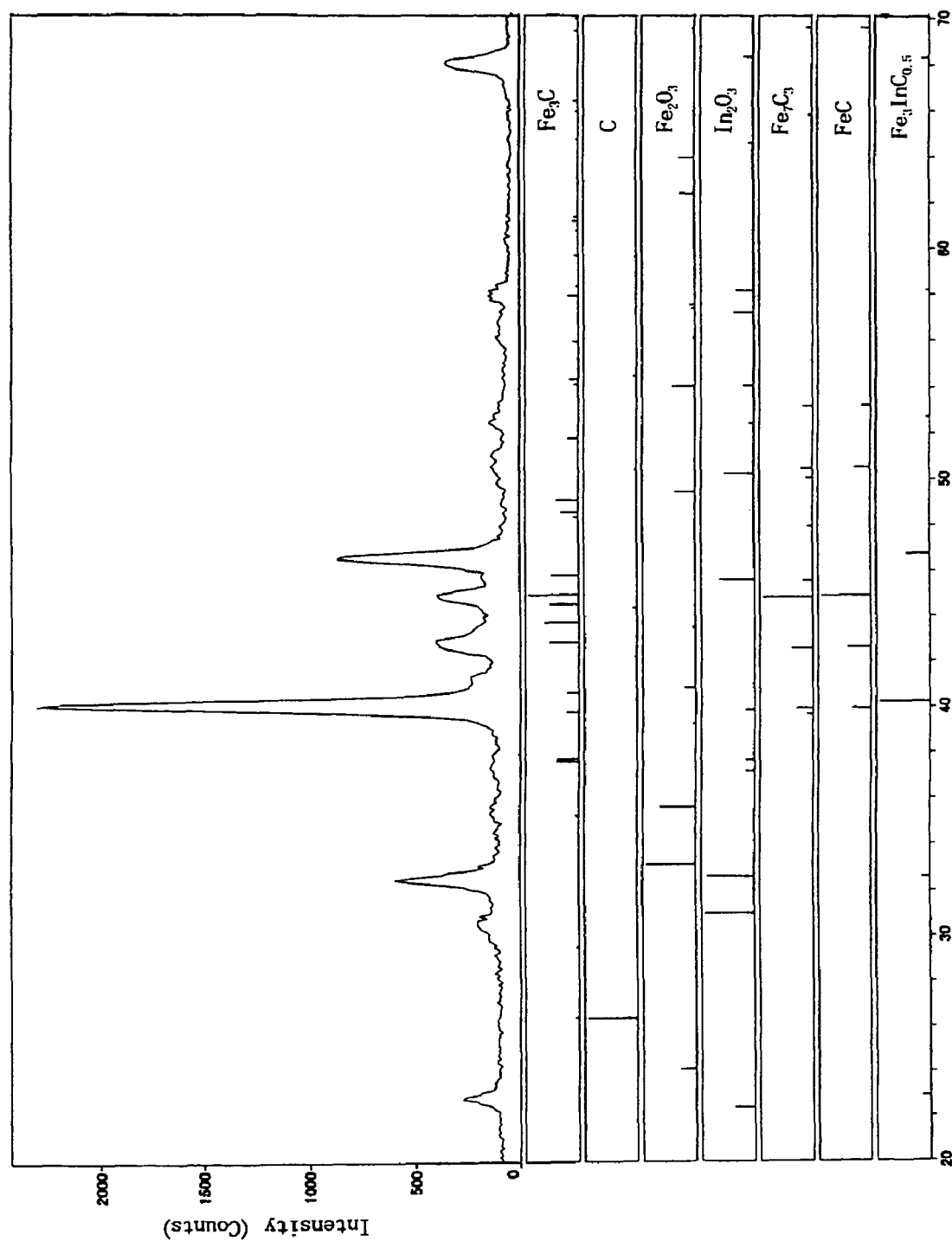
FIG. 12 is a graph showing the intensity of powder X-ray diffraction of fine particles of a catalyst after 10 seconds have passed.

FIG. 12 is a graph showing the intensity of powder X-ray diffraction of the catalyst fine particles after 10 seconds. Whether or not the catalyst fine particles were made of a carbide was determined through powder X-ray analysis. The top distribution of the intensity is the line profile of the measured strength of diffraction. If the diffraction angle is indicated as $2\theta$, the first intensity peak exists in the vicinity where $2\theta$ is 39.6°, and the second intensity peak exists in the vicinity where $2\theta$ is 46.3°. The vicinity of 39.6° is referred to as the vicinity of approximately 40°. In addition, the intensity ratio is first intensity peak:second intensity peak=7.0:2.7.

Graphs showing the intensity of known substances are drawn beneath the line profile. The seven types of known substances are $Fe_3C$, C (graphite), $Fe_2O_3$, $In_2O_3$, $Fe_7C_3$, FeC and $Fe_3InC_{0.5}$. It can be seen that the graph that most coincides with the line profile is that on the bottom, that is, $Fe_3InC_{0.5}$. That is, only $Fe_3InC_{0.5}$ depicts the first and second peaks of the line profile. In addition, the intensity ratio of $Fe_3InC_{0.5}$ is first intensity peak:second intensity peak=7.0: 3.0. It can be determined that the catalyst fine particles are made of a substance of which the composition formula is $Fe_3InC_{0.5}$, taking the possibility of error in the measured strength into consideration.

EXAMPLE 2

Formation of Carbide Catalyst Fine Particles from 1 sccm of $C_2H_2$

In Example 1, the $C_2H_2$ gas, which is a material gas, was supplied at 60 sccm, and therefore, the growth rate of the carbide catalyst fine particles was too great. Therefore, it was examined how the first intensity peak of the diffraction intensity of $Fe_3InC_{0.5}$ increases as time elapses when the $C_2H_2$ gas was supplied at 1 sccm.

The $C_2H_2$ gas was set at 1 sccm, He was set at 50 sccm, and the heating temperature was set at 700° C. A substrate on which an Fe.In.Sn oxide thin film that is exactly the same as that of FIG. 12 was placed in the reaction chamber. This substrate kept being irradiated with X-rays, and a diffraction intensity of 2θ=39.62° (in the vicinity of approximately 40°) was measured where the first peak was obtained, as time elapsed.

Figure 13:
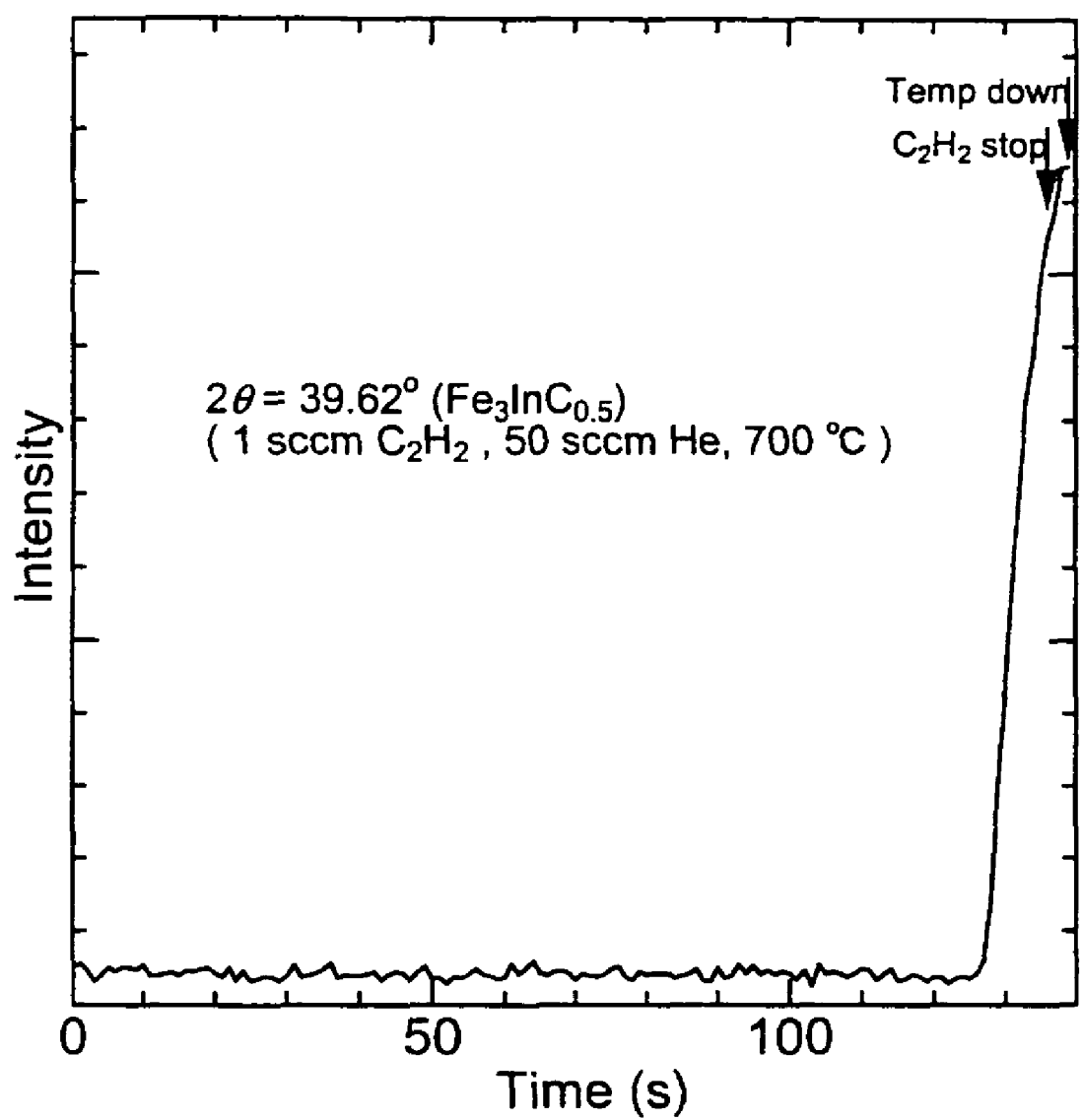
FIG. 13 is a graph showing the first peak of the diffraction intensity, where 2θ is at approximately 40° as time passes.

FIG. 13 is a graph showing the first intensity peak of the diffraction intensity where 2θ is 39.62° (in the vicinity of approximately 40°) as time elapsed. The behavior of this first peak shows the process through which $Fe_3InC_{0.5}$ grows. In other words, the growth rate of the catalyst fine particles can be observed through the first peak as time elapses.

As can be seen from FIG. 13, the first peak rose abruptly 125 seconds after the $C_2H_2$ gas was made to flow, and reached approximately the maximum after 135 seconds. At this stage, the supply of $C_2H_2$ gas was stopped, so as to stop the increase in the first peak. It was found that carbide catalyst fine particles made of $Fe_3InC_{0.5}$ were formed at a stretch over approximately 10 seconds.

EXAMPLE 3

Control of Diameter of Catalyst Fine Particles of $Fe_3InC_{0.5}$

Growth conditions may be changed in order to control the particle diameter (diameter s) of the catalyst fine particles of $Fe_3InC_{0.5}$. In this Example 3, the growing temperature, that is, the heating temperature of the substrate (temperature of the reaction chamber), was changed between 650° C. and 700° C. when the carbide catalyst fine particles were formed, and carbon nanocoils were grown using these carbide catalyst fine particles.

The $C_2H_2$ gas was set at 1 sccm, He was set at 50 sccm, and the heating temperature was set at 650° C. and 700° C. In exactly the same manner as in FIG. 12, a substrate was placed in a reaction chamber with an Fe.In.Sn oxide thin film as a starting catalyst. Catalyst fine particles of $Fe_3InC_{0.5}$ were grown on this substrate, and carbon nanocoils were grown using this substrate.

Figure 14:
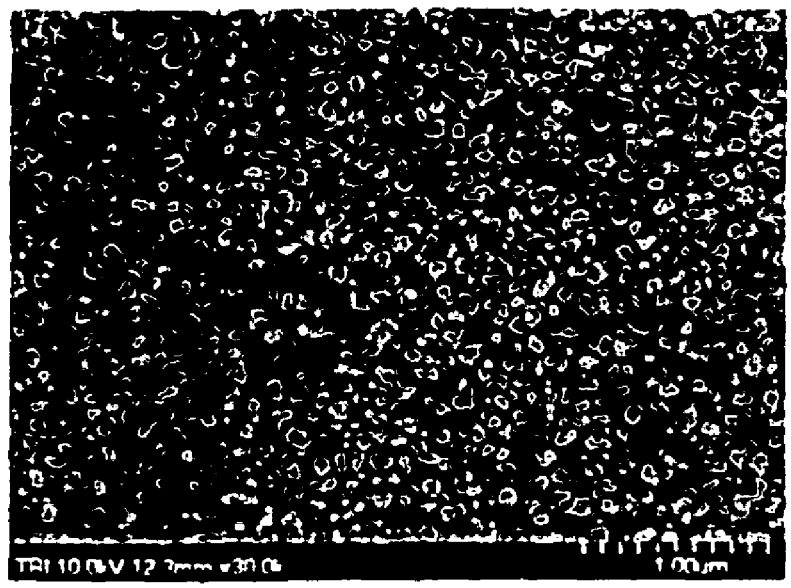
FIG. 14 shows scanning electron microscope images of fine particles of a carbide catalyst and grown carbon nanocoils at 650°.
Figure 14:
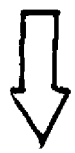
Figure 14:
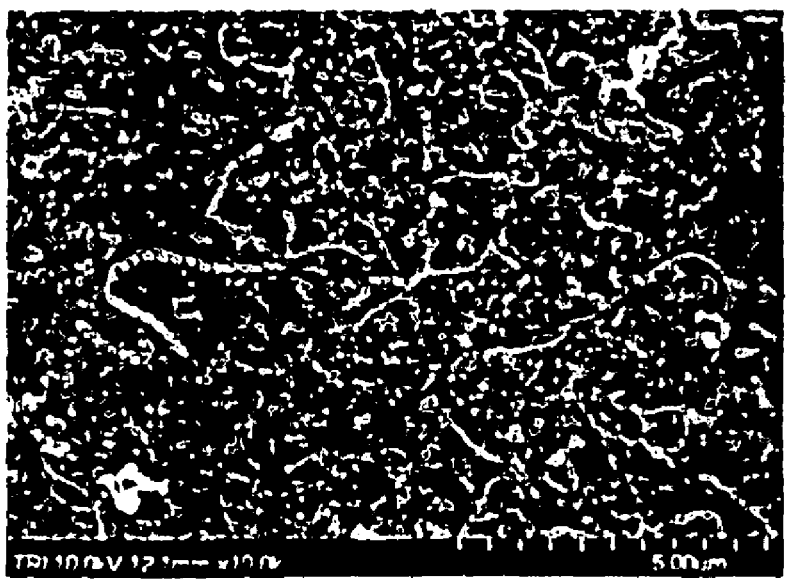

FIG. 14 is a scanning electron microscope image of the carbide catalyst fine particles and grown carbon nanocoils at 650° C. In addition, FIG. 15 is a scanning electron microscope image of the carbide catalyst fine particles and grown carbon nanocoils at 700° C.

Figure 15:
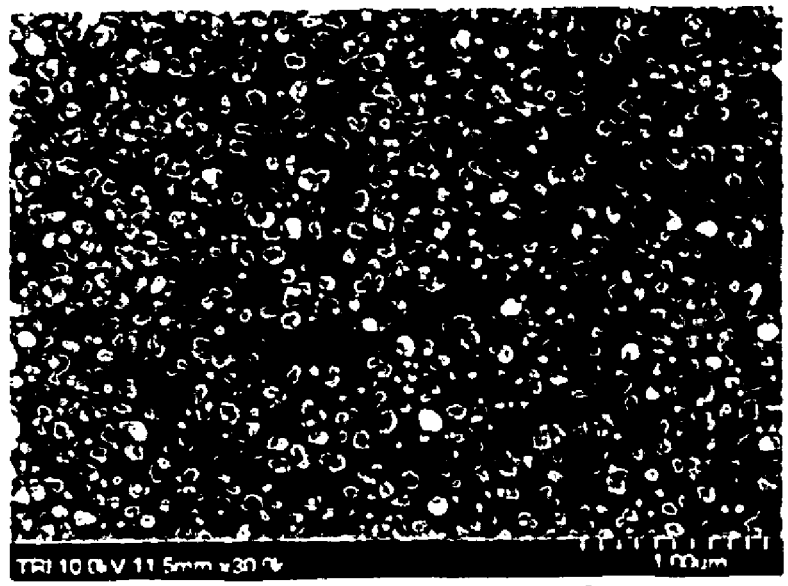
FIG. 15 shows scanning electron microscope images of fine particles of a carbide catalyst and grown carbon nanocoils at 700°.
Figure 15:
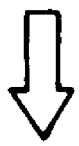
Figure 15:
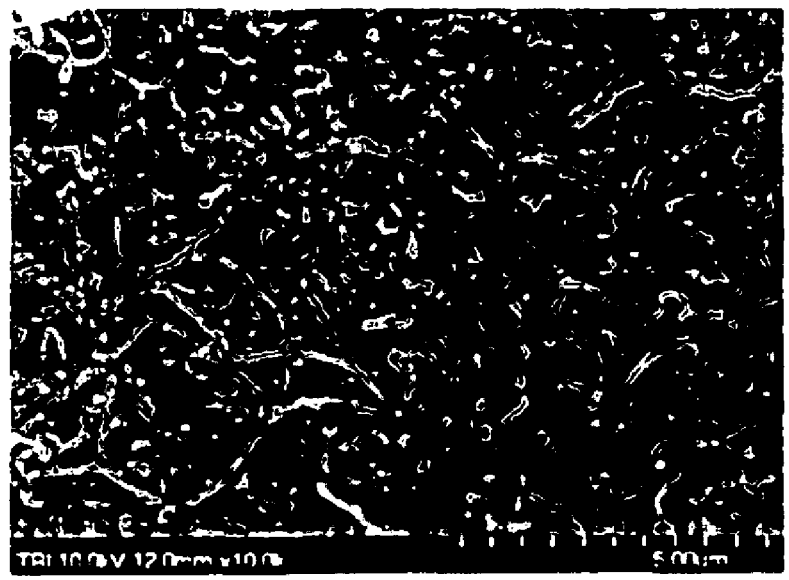

As can be seen by comparing FIG. 14 with FIG. 15, diameter s of the carbide catalyst fine particles that were formed at 650° C. becomes smaller than that of those formed at 700° C. That is, it was confirmed that the diameter of the carbide catalyst fine particles becomes smaller when formed at a lower temperature. Accordingly, it becomes possible to freely control diameter s of the carbide catalyst fine particles by changing the temperature of the reaction chamber.

In addition, carbon nanocoils having a smaller size must be synthesized when diameter s of the carbide catalyst fine particles is smaller. By comparing FIG. 14 with FIG. 15, it can be seen that the catalyst at 650° C. makes carbon nanocoils having a smaller size grow. This proves that carbon nanocoils having a smaller size can be synthesized when diameter s of the carbide catalyst fine particles is smaller.

(2) Description of Carbide Catalyst of (Transition Metal Element, Sn, C)

In this second part, Fe is adopted as a representative example of transition metal elements, and a (Fe, Sn, C) carbide catalyst is described as an example of a (transition metal element, Sn, C) carbide catalyst. The same results can be obtained in the case where a transition metal element such as Co or Ni is used instead of Fe.

EXAMPLE 4

CNC Growth of Fe—Sn—C Due to Carbide Catalyst Fine Particles

First, a (Fe, Sn, C) carbide catalyst was fabricated. The detail of the carbide catalyst was described in the first part, and therefore, repetition is avoided, and herein only different portions are described. First, solutions of iron chloride and tin chloride with a concentration of 0.1 mol/l are mixed at a ratio of 3:0.1. An appropriate amount of a solution of ammonium carbonate with a concentration of 0.3 mol/l is dropped into this mixed solution so as to prepare a mixed precipitate of iron and tin hydroxides as a result of a neutralization reaction. This mixed precipitate is baked for two hours at 400° C., and thereby, an oxide catalyst of (Fe, Sn, O) is synthesized.

This powder oxide was used and a CVD was carried out under the following conditions: 700° C. of growing temperature, 250 sccm of helium, 10 sccm of acetylene, and 30 minutes of growing time. As a result, carbon nanocoils grew on the catalyst. FIG. (16A) shows an electron microscope image of the catalyst on which carbon nanocoils grew. Accordingly, it was found that carbon nanocoils grow on the oxide catalyst of (Fe, Sn, O).

In order to confirm whether or not the oxide catalyst of (Fe, Sn, O) is changed to another catalyst at the growing stage, an X-ray diffraction pattern of the (Fe, Sn, O) catalyst was measured while carrying out the CVD. The conditions for the CVD at this time were as follows: 700° C. of growing temperature, 50 sccm of helium, and 1 sccm of acetylene.

FIG. (16B) is a diagram showing the X-ray diffraction pattern of the (Fe, Sn, O) catalyst when 3 minutes has passed after the introduction of an acetylene gas into the reaction furnace. The peak of $Fe_3SnC$ which has the first peak (maximum peak) in the vicinity of 2θ=40° appeared in addition to those of iron carbide $Fe_3C$ and iron oxide FeO. This peak does not appear during the process where carbon nanotubes grow due to an iron catalyst. As a result of this, it is considered that the (Fe, Sn, O) oxide catalyst is changed into a carbide catalyst of $Fe_3SnC$ during the growing process.

Furthermore, 4 g of a magnesium oxide powder was made to react with 200 ml of metal chloride solutions with the concentrations of 0.03 mol/l of iron chloride and 0.01 mol/l of tin chloride so that a compound hydroxide of Fe and Sn coprecipitated. This coprecipitate was filtered, cleaned and dried so as to obtain a compound hydroxide or an oxide powder of Fe, Sn and Mg. 2 g of this powder catalyst was carbonized using a rotational CVD reaction furnace.

The conditions for carbonization were as follows: 675° C. of growing temperature, 400 sccm of helium, 60 sccm of acetylene, 1 rpm of the number of rotations of the furnace and 10 minutes of carbonization time. After this, metals such as tin were removed with hydrochloric acid having a concentration of 17.5%, and the catalyst was cleaned and filtered so as to obtain a carbide catalyst. FIG. (17A) is a diagram showing the X-ray diffraction pattern of the generated carbide. The first peak appears at a position of $2\theta$=approximately 40°, and thus, it was confirmed that the carbide is $Fe_3SnC$.

Figure 16:
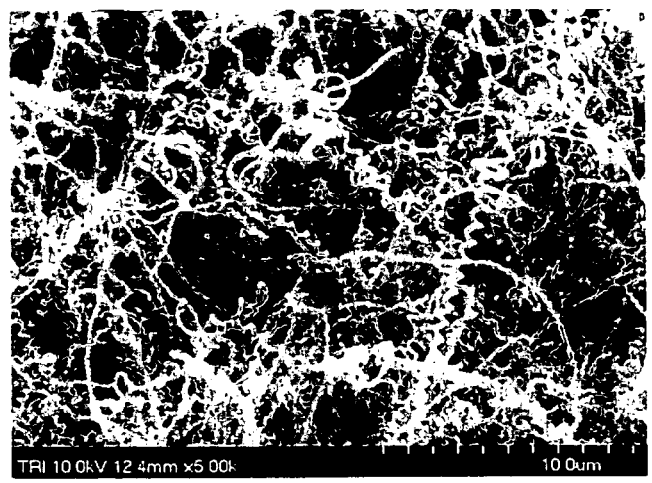
FIG. 16 shows an electron microscope image of carbon nanocoils grown with an Fe—Sn—C catalyst, as well as a graph of the X-ray diffraction pattern of the catalyst.
Figure 16:
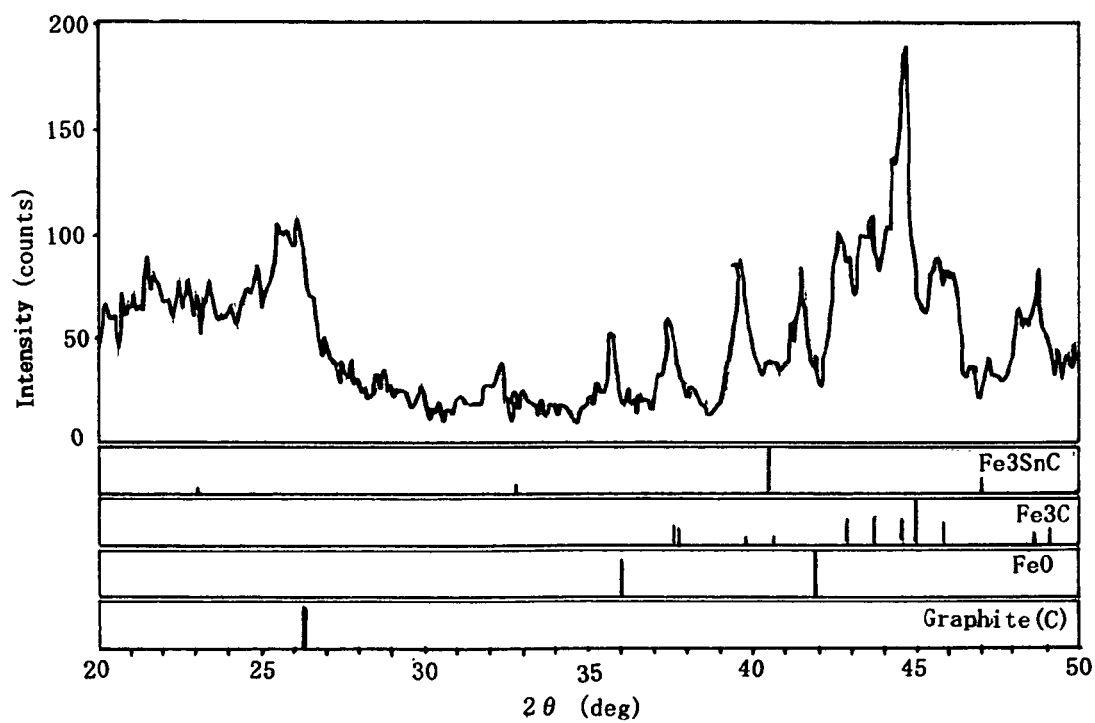
Figure 17:
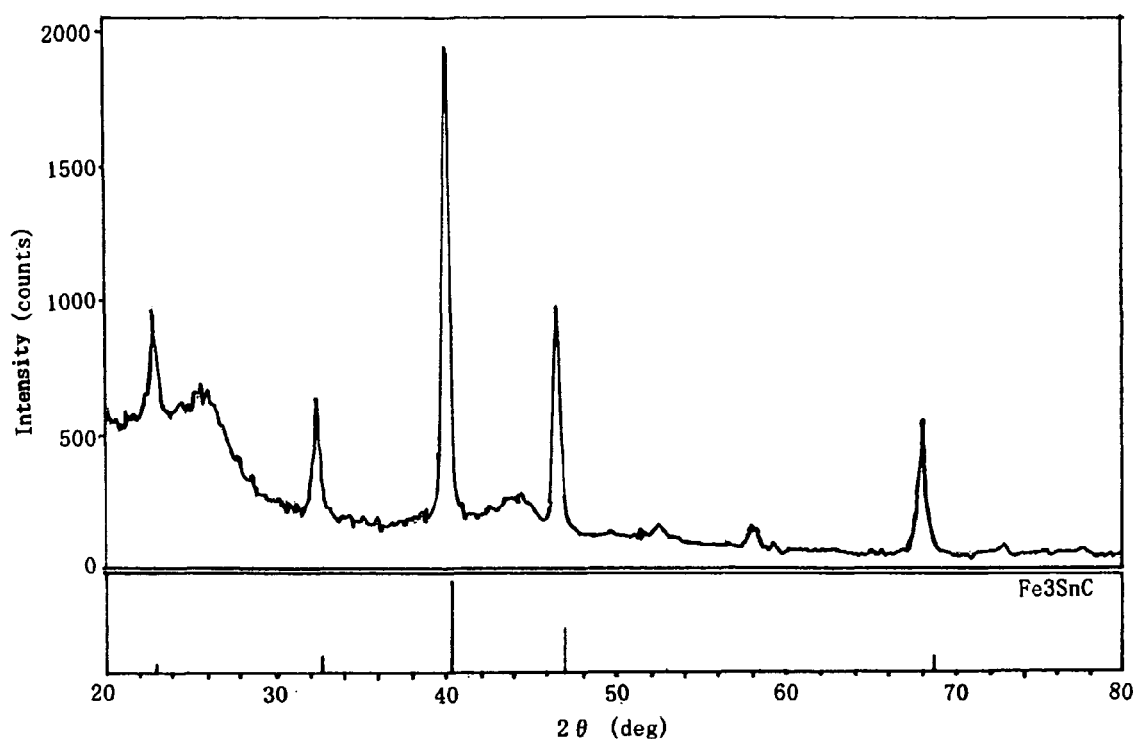
FIG. 17 shows an electron microscope image of carbon nanocoils grown with an Fe—Sn—C catalyst, as well as a graph of the X-ray diffraction pattern of the catalyst under different conditions.
Figure 17:

In addition, 0.1 g of this powder catalyst was dispersed in 5 ml of acetone, and after that, it was developed on an Si substrate on which a CVD was carried out for 10 minutes in a compact lateral furnace at 700° C. with 60 sccm of acetylene and 200 sccm of helium. The generated material was observed through an SEM, and the results are shown in FIG. (17B). It was found that carbon nanocoils grew. As described above, it was proven from FIGS. 16 and 17 that the carbide catalyst of (Fe, Sn, C) is an effective catalyst for synthesizing carbon nanocoils.

(3) Description of Metal Catalysts

In this third part, a (transition metal element, Al, Sn) catalyst, a (transition metal element, Cr, Sn) catalyst and a (Fe, In, Sn) catalyst are described. These catalysts are metal catalysts and not carbide catalysts. Transition metal elements are defined as described above, and an appropriate transition metal element is selected in accordance with the purpose. In the following, Fe is adopted as a representative example of a transition metal element and the details thereof are described.

The present inventors diligently examined the synthesis of a large amount of carbon nanocoils, during which they examined to see if it is possible to create a new catalyst material by adding any element to the base composition of iron and tin with reference to the iron.indium.tin based mixed catalyst that had already been discovered. In addition, the component ratio of the 3 metal elements in the catalyst that is optimal for the growth of carbon nanocoils was also examined.

In the present embodiments, concrete examples of three component-based catalysts for synthesizing carbon nanocoils, where three types of elements, indium In, aluminum Al and chromium Cr, are added to the iron.tin based component, are described in the following on the basis of the results of experiments.

EXAMPLE 5

Synthesis of CNC Due to Fe—In—Sn, Fe—Al—Sn and Fe—Cr—Sn (Refinement of Mixed Catalyst)

An iron.indium.tin based mixed catalyst, an iron.aluminum.tin based mixed catalyst and an iron.chromium.tin based mixed catalyst are refined in accordance with a coprecipitating method. In the case of an iron.indium.tin based mixed catalyst, for example, iron chloride $FeCl_3$, indium chloride $InCl_3$ and tin chloride $SnCl_3$ are dissolved in water so as to prepare solutions where the concentrations of Fe ions, In ions and Sn ions are the same (for example, 0.1 mol/l). Next, these solutions are mixed at an appropriate ratio so as to prepare a mixed solution of three types of metal ions. An alkaline solution (for example, a solution of ammonium carbonate $(NH_4)_2CO_3$) is put into this mixed solution so as to be neutralized, and then the metal components in the solution are reduced and deposited. As a result of this reducing process, metal hydroxides, that is, $Fe(OH)_3$, $In(OH)_3$ and $Sn(OH)_3$ are separated and deposited on the bottom of the container of the solution as a precipitate. This precipitate is a mixture where the metal oxides aggregate, and thus, the precipitate is collected through a filtering process of the solution. The collected precipitate is baked at 400° C., and thereby, an oxide catalyst Fe—In—Sn—O is obtained. In the same manner, in the case of an iron.aluminum.tin based mixed catalyst, solutions of 0.1 mol/l of aluminum nitrate $Al(NO_3)_3$, iron chloride $FeCl_3$ and tin chloride $SnCl_3$ are prepared, and these solutions are mixed at an appropriate ratio so as to prepare a mixed solution of which the catalyst component is made to precipitate using an ammonium carbonate solution, and then an oxide catalyst Fe—Al—Sn—O is obtained through the collecting and baking of the catalyst component. In addition, in the case of an iron.chromium.tin based mixed catalyst, solutions of 0.1 mol/l of chromium nitrate $Cr(NO_3)_3$, iron chloride $FeCl_3$ and tin chloride $SnCl_3$ are prepared, and these solutions are mixed at an appropriate ratio so as to prepare a mixed solution of which the catalyst component is made to precipitate using an ammonium carbonate solution, and then an oxide catalyst Fe—Cr—Sn—O is obtained through the collecting and baking of the catalyst component. Here, several mixed catalysts of which the composition ratios are slightly different from each other are refined by changing the mixture ratio (mol ratio) of the nitrate compound or the chloride compound of the material, and they are used in the following experiments for generating carbon nanocoils.

(Generation of Carbon Nanocoils in Accordance with CVD Method)

Experiments for generating carbon nanocoils (hereinafter, carbon nanocoils are referred to as CNC) using the three types of mixed catalysts, Fe—In—Sn—O, Fe—Al—Sn—O and Fe—Cr—Sn—O, are described below.

A CVD method of a carbon containing compound gas is used for the synthesis of CNC. According to the present invention, a variety of types of alkane, alkene, alkyne, aromatic hydrocarbons and the like, including methane and ethane, can be utilized as the carbon containing compound, and from among these, acetylene, allylene, benzene and the like are effective, and in particular, acetylene is highly efficient. In addition, it is effective to set the heating temperature to a temperature no lower than that where the carbon containing compound is decomposed by the function of the catalyst. The temperature where acetylene is thermally decomposed is approximately 400° C., whereas it is appropriate for the temperature where CNC are synthesized using acetylene to be approximately 600° C. to 800° C. However, the synthesizing temperature is not limited to this temperature, but rather it can be freely set to a temperature that is not lower than the temperature where the carbon-containing compound is decomposed by the catalyst, taking the efficiency of synthesis into consideration.

Figure 18:
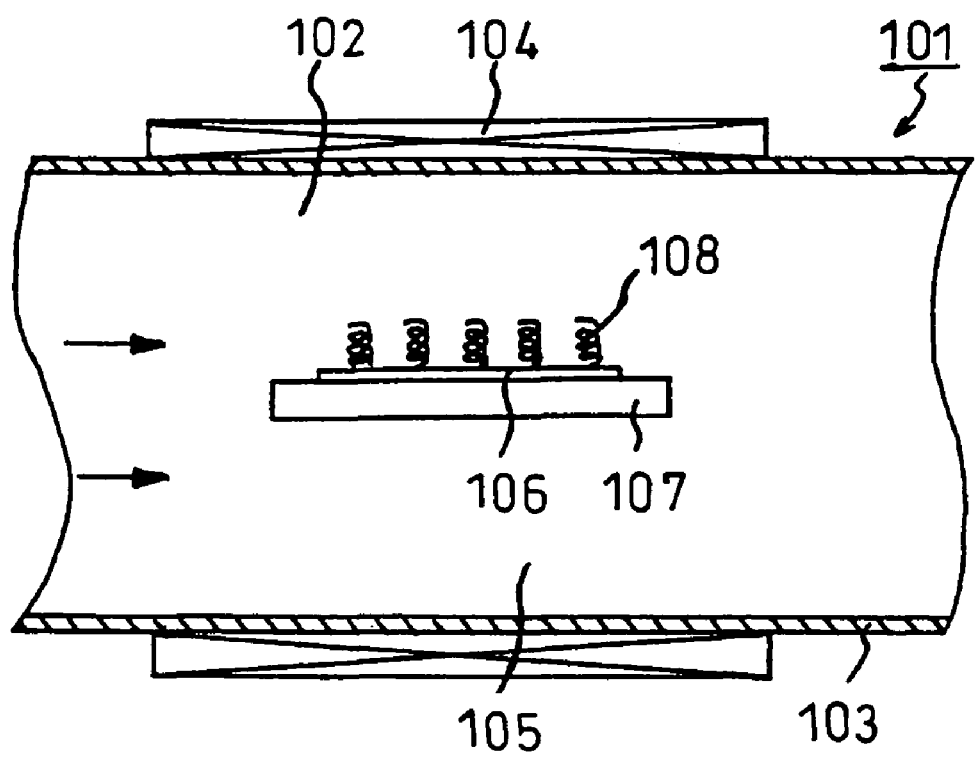
FIG. 18 is a schematic diagram showing the main portion of the configuration of a synthesizing apparatus 1 that is utilized in the embodiments of the present invention.

FIG. 18 is a schematic diagram showing the configuration of the main portion of a synthesizing apparatus for CNC that is utilized in the present embodiment. This synthesizing apparatus 101 is a flow reactor which is placed under atmospheric pressure, where a reaction chamber 102 is surrounded by a quartz tube 3 having a diameter of 30 mm and a length of 700 mm. A heater 104 in tube form having a length of 450 mm is placed around the outside of the center portion of quartz tube 103 so that an isothermal region 105 is defined over a length of approximately 250 mm in the center of reaction chamber 102. A substrate (quartz or silicon) 107, on which a catalyst 106 that is fabricated in accordance with a coprecipitating method is mounted, is placed in this isothermal region 105.

In the synthesizing apparatus for carbon nanocoils (CNC) having the configuration, first, quartz tube 103 was filled up with a flow amount of 200 sccm of helium gas, and catalyst 106 on substrate 107 was heated at a temperature that rose at a rate of 20° C. per minute up to 700° C. This helium gas was introduced in order to prevent metals from being oxidized within the reaction chamber. After the temperature reached 700° C., a flow amount of 60 sccm of acetylene $C_2H_2$ was supplied and the total flow amount of the mixed gas of helium and acetylene was adjusted to 260 sccm. The reaction time was set to approximately 30 minutes, and after that, acetylene was blocked so that only helium was made to flow, and in this helium atmosphere, catalyst 106 on substrate 107 was slowly cooled to room temperature. A large number of carbon nanocoils 108 (referred also as CNC) were generated on catalyst 106.

Figure 19:
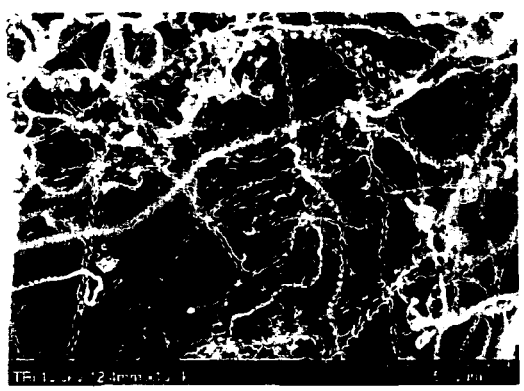
FIG. 19 is shows electron microscope images of the generated materials in synthesizing apparatus 1 when the composition ratio of the catalysts Fe:In:Sn, Fe:Al:Sn, and Fe:Cr:Sn was made to be 3:0.3:0.1.
Figure 19:
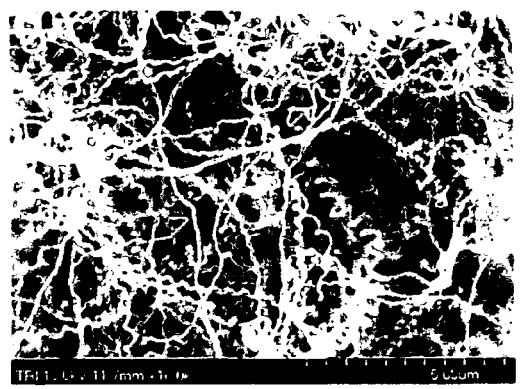
Figure 19:
Figure 19:
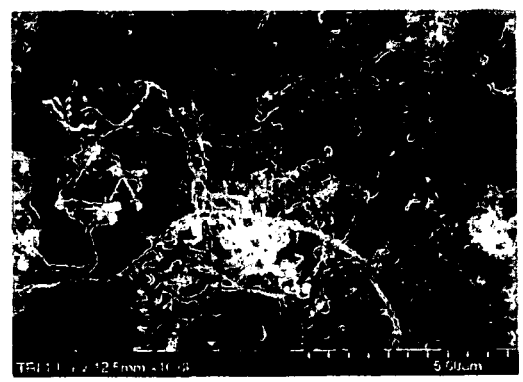
Figure 20:
FIG. 20 shows electron microscope images of the generated materials in synthesizing apparatus 1 when the catalyst composition was a mixture where In and Al each has a ratio of 1/3 of Fe.
Figure 20:
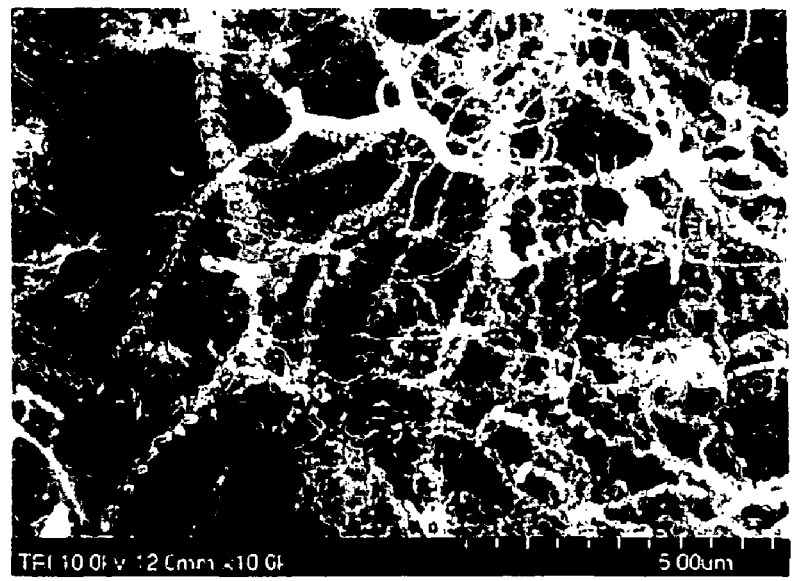

The catalyst after the reaction was analyzed with a scanning electron microscope (SEM S-4500 made by Hitachi) and an energy dispersing X-ray analyzing apparatus (EDX) that is attached to the SEM. In the present embodiment, all of the SEM images shown below were taken at a magnification of no less than 10,000 times. FIG. 19 shows SEM images of the generated materials when the composition ratios of the catalysts Fe:In:Sn, Fe:Al:Sn, and Fe:Cr:Sn were 3:0.3:0.1. FIG. 20 shows SEM images of the generated materials at the time of the catalyst compositions where In and Al were mixed to Fe in the ratio of 1/3 of Fe. FIGS. (19a) and (20b) show the existence of CNC when the Fe—In—Sn—O catalyst was utilized, FIGS. (19b) and (20a) show the existence of CNC when the Fe—Al—Sn—O catalyst was utilized and FIG. (19c) shows the existence of CNC when the Fe—Cr—Sn—O catalyst was utilized. FIG. (19d) shows a case for the purpose of comparison where a Fe—Sn—O catalyst made of only iron and tin without containing In, Al or Cr was utilized. The generation ratio of coils is estimated to be 95% judging from the amount of deposited carbon atoms and the amount of generated coils with reference to these SEM images, and it is shown that the synthesizing method using synthesizing apparatus 101 with these catalysts is highly efficient.

The results of the generation of CNC utilizing a variety of catalysts in FIGS. 19 and 20 are summarized as follows. In the case where Cr was used instead of In, coils were not generated as much and the diameters of the coils and the tubes were large in comparison with the case of In. This is because Cr possibly has a stabilizing effect on iron carbide when mixed into iron carbide. This fact was compared with the SEM images after the CVD was carried out so as to find that Cr was mixed into the Fe—Sn—O catalyst, and thereby, the deposition of graphite (carbon fibers) did not efficiently occur, and therefore, it was estimated that the material in tube and coil forms failed to be generated in comparison with the cases of the other catalysts. Meanwhile, in the case where Al was used instead of In, the number of pieces of generated material in spiral form was large in comparison with the case where the Fe—Sn—O catalyst was used. In the case of the Fe—Al—Sn—O catalyst, coils having a comparatively large coil diameter and a narrow coil pitch such as those which appeared in the case of the Fe—In—Sn—O catalyst did not appear in comparison with the generated material due to the Fe—In—Sn—O catalyst, but rather there were many pieces of the generated material in double spiral form having a small diameter. This tendency was more significant when the ratios of In and Al to iron were great (when Fe:In or Al:Sn=3:1:0.1) as can be seen in FIG. 20.

It is believed that the reason why coils having a large coil diameter and a narrow pitch did not appear when the Fe—Al—Sn—O catalyst was used is because the size of catalyst particles that become "seeds" for generating coils becomes smaller than that in the case where In is used. Accordingly, it is considered that In tends to make the size of catalyst particles larger, and this tendency is suppressed in the case where Al is used.

(Experiments for Clarifying Optimal Composition of In, Al and Cr)

It was confirmed from the results of the experiments for generating CNC shown in FIGS. 19 and 20 that Al and Cr become effective catalyst elements that correspond to In, and experiments for generating CNC with a variety of composition ratios using synthesizing apparatus 101 were carried out, in order to find the optimal catalyst composition of these elements.

Figure 21:
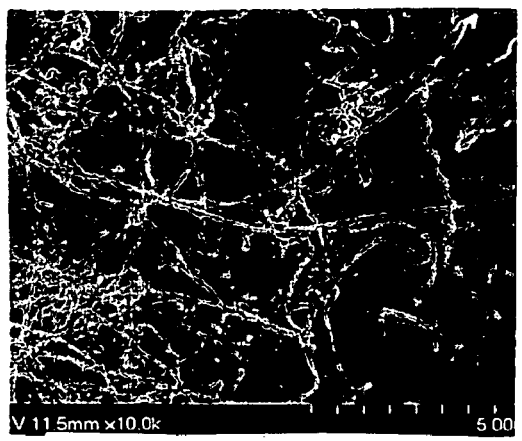
FIG. 21 shows electron microscope images of the generated materials in synthesizing apparatus 1 when a CNC generation experiment was conducted with a variety of composition ratios in a mixed catalyst Fe—Sn—O of only iron and tin.
Figure 21:
Figure 21:
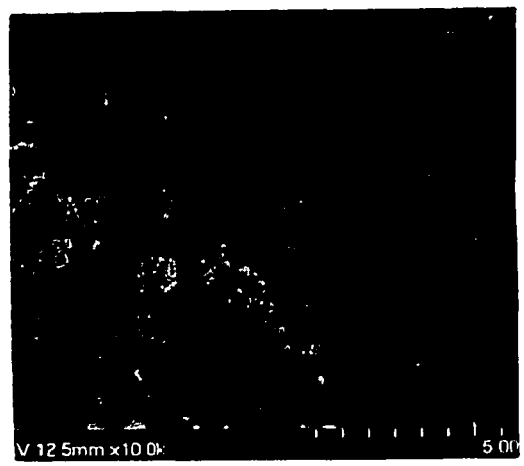
Figure 21:
Figure 21:
Figure 21:
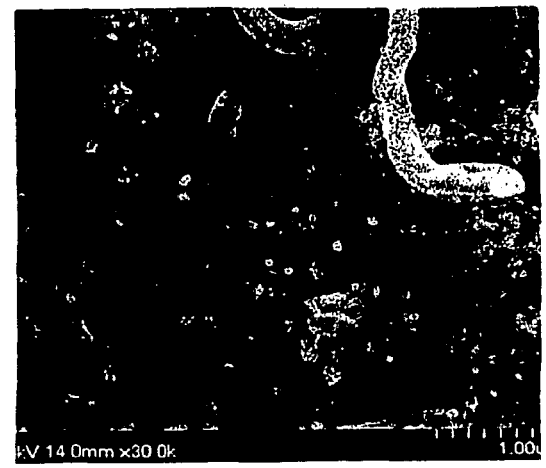
Figure 22:
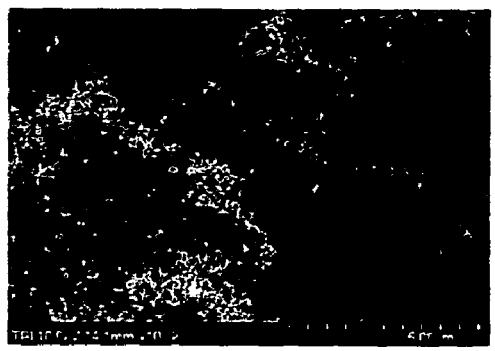
FIG. 22 shows electron microscope images of the generated materials in a CNC generation experiment for a variety of compositions of a catalyst Fex—Iny—Snz—O.
Figure 22:
Figure 22:
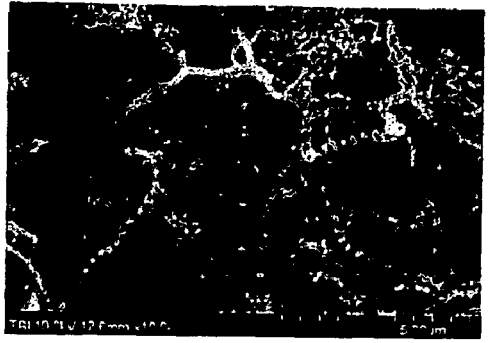
Figure 22:
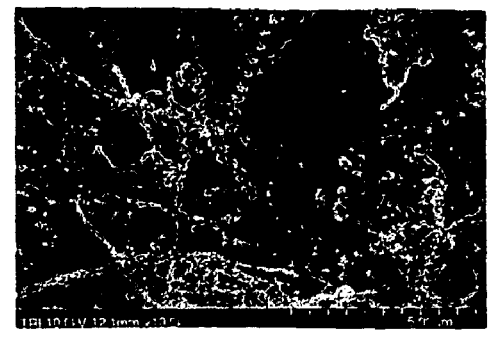
Figure 22:
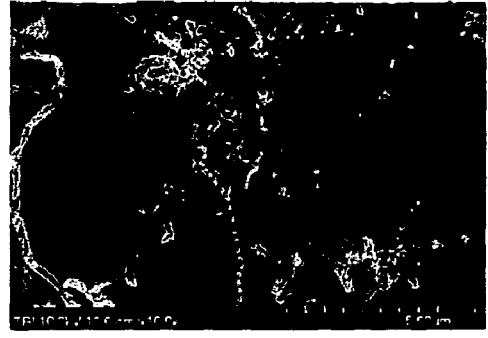
Figure 22:
Figure 22:
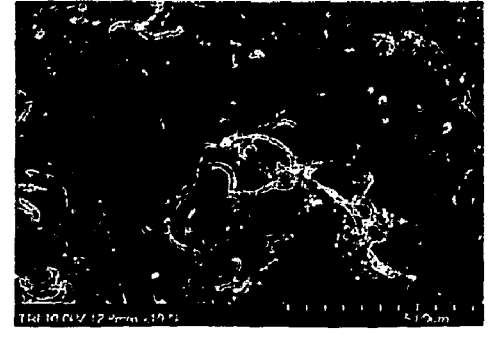
Figure 22:
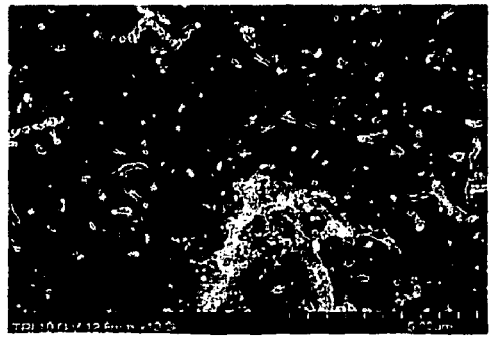

Experiments for finding effective composition ratios in mixed catalysts Fe—Sn—O having only iron and tin were carried out. The state of CNC generation was checked for a variety of components, in which the value of y was changed when x=3 in the composition mol ratio of $Fe_x$—$Sn_y$—O in the proportional distribution of (x, y). FIG. 21 shows an SEM image of a portion of the results of the experiments for CNC generation. FIG. (21a) shows a case where the composition ratio Fe:Sn=3:0.05, FIG. (21c) shows a case where the composition ratio Fe:Sn=3:0.1, FIG. (21e) shows a case where the composition ratio Fe:Sn=3:1, and FIGS. (21b), (21d) and (21f) show enlarged images of FIGS. (21a), (21c) and (21e), respectively, at a magnification of 30,000 times. In addition, experiments were carried out by changing the composition ratio of Sn in a variety of manners while fixing Fe:In=3:1 in the composition mol ratio of $Fe_x$—$In_y$—$Sn_z$—O. FIG. 22 shows SEM images of the results of the experiments for CNC generation. FIGS. (22a) to (22h) show cases where the composition ratio of Sn was set to 0, 0.03, 0.1, 0.15, 0.3, 0.5, 1 and 3 while fixing Fe:In=3:1. The results of these experiments show that y≦3 is necessary in the case where x=3 in the proportional distribution of (x, y) in the composition mol ratio of $Fe_x$—$Sn_y$—O, and the highest generation efficiency is obtained when 0<y≦0.15.

Figure 23:
FIG. 23 shows electron microscope images of the generated materials for composition ratios of a catalyst Fex—Iny—Snz—O that are different from those of FIG. 5.
Figure 23:
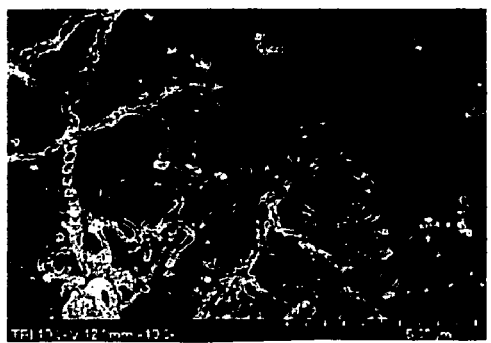
Figure 23:
Figure 23:
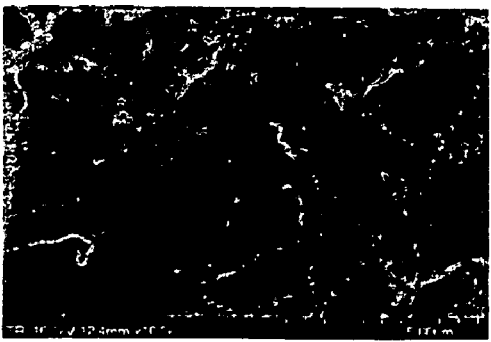
Figure 23:
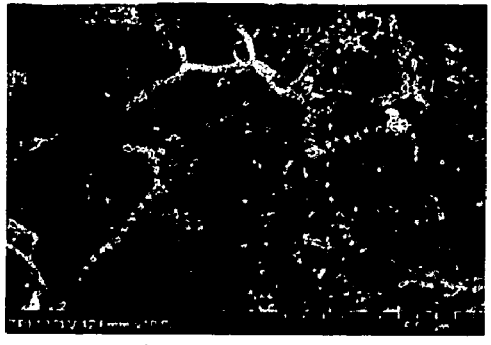
Figure 23:
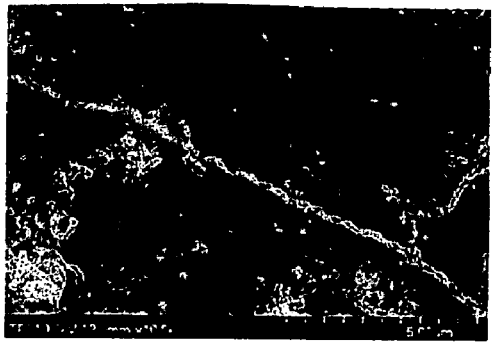
Figure 23:

Taking into account the results of the neutral relationship concerning the composition ratio of iron to tin in a catalyst that includes only iron and tin, experiments for finding the optimal composition of In, Al and Cr were conducted. Concretely, as a result of the experiments for finding the optimal composition ratio of $Fe_x$—$Sn_y$—O, Fe:Sn=3:0.1 was utilized as fixed composition information. First, experiments for CNC generation were conducted in order to check the relationship between iron.tin and indium in the composition of $Fe_x$—$In_y$—$Sn_z$—O catalysts, that is, experiments were conducted by changing the composition ratio of In in a variety of manners while fixing Fe:Sn=3:0.1. FIG. 23 shows SEM images of portions of the results of these experiments for CNC generation. FIGS. (23a) to (23g) show cases where the composition ratio of In was set to 0, 0.05, 0.1, 0.3, 1, 3 and 9 while fixing Fe:Sn=3:0.1. These experiments show that y=9 for In was the limit of the generation efficiency in the case where x=3 and z=0.1 in the proportional distribution of (x, y, z), and the most efficient composition was 0.3≦y≦1. As can be seen from these SEM images, generated matter having a large coil diameter and a small coil pitch were obtained.

Figure 24:
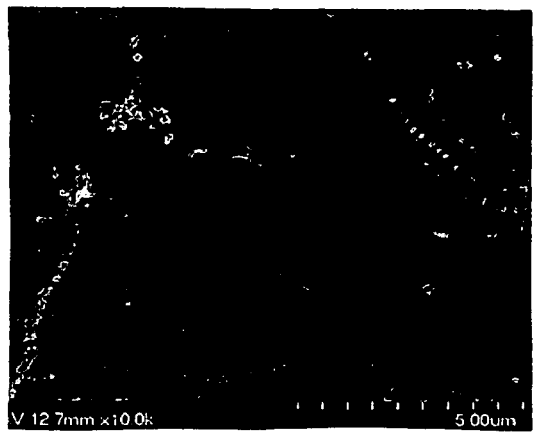
FIG. 24 shows electron microscope images of the generated materials in a CNC generation experiment for a variety of compositions of a catalyst Fex—Aly—Snz—O.
Figure 24:
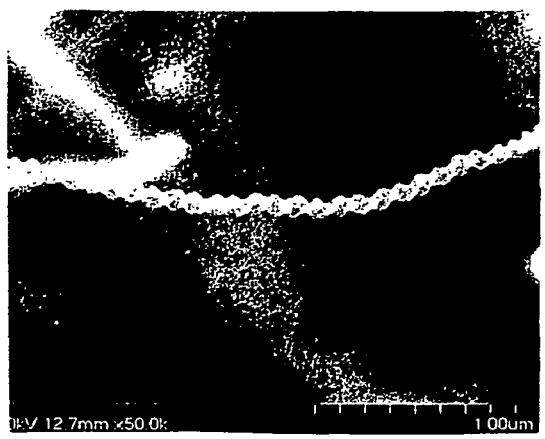
Figure 24:
Figure 24:
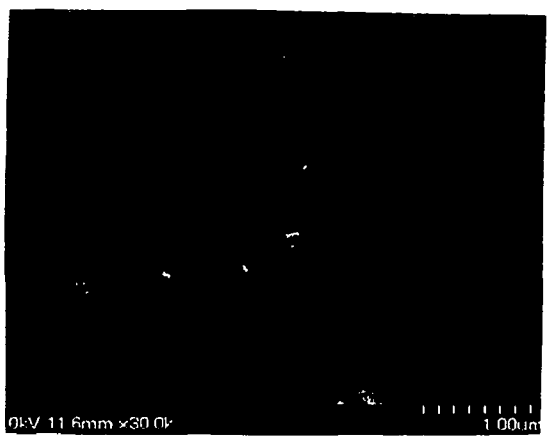
Figure 24:
Figure 24:
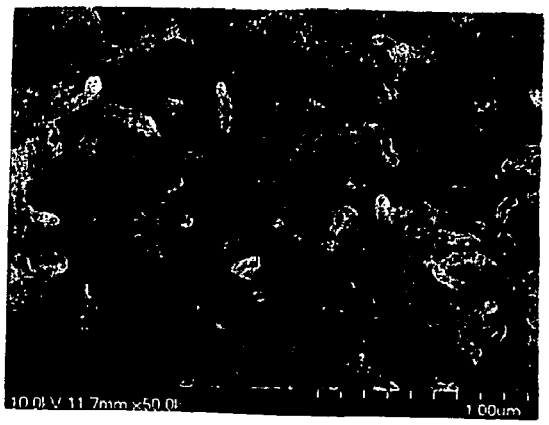

Next, experiments for CNC generation were carried out in order to check the relationship between iron.tin and aluminum in the Fex—Aly—Snz—O catalyst composition. FIG. 24 shows SEM images of portions of the results of these experiments for CNC generation. FIGS. (24a), (24c) and (24e) show cases where the composition ratio of Al was set to 0.3, 1 and 9 while fixing Fe:Sn=3:0.1. FIGS. (24b), (24d) and (24e) are enlarged images of FIGS. (24a), (24c) and (24e) at a magnification of 50,000 times. These experiments show that the generation efficiency lowers when y exceeds y=1, and no generated matter in coil form was seen when y=9 in the case where x=3 and z=0.1 in the proportional distribution of (x, y, z). It can be seen from these SEM images that there were twisted coils in fine spiral form of Al in the case where Al was contained in Fex—Aly—Snz—O.

Figure 25:
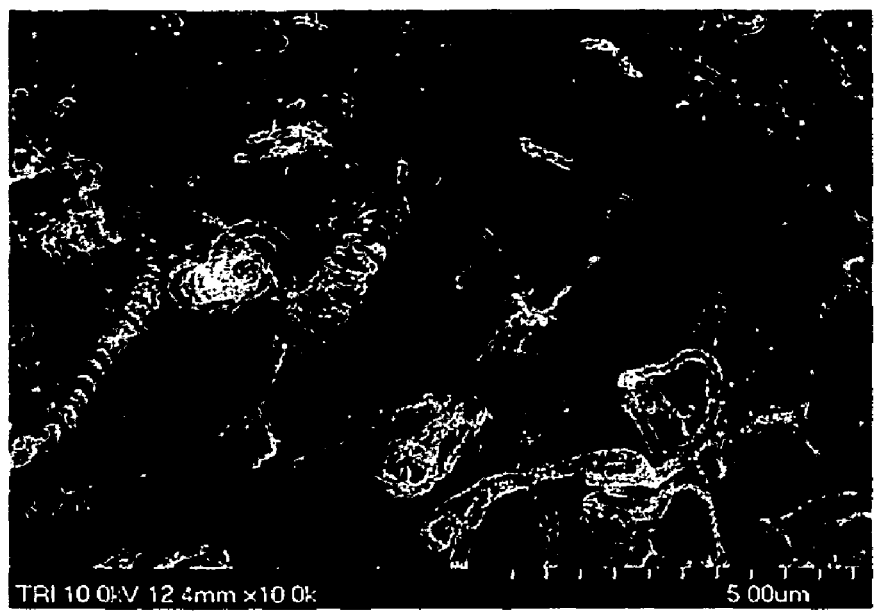
FIG. 25 shows electron microscope images of the generated materials in a CNC generation experiment for a variety of compositions of a catalyst Fex—Cry—Snz—O.
Figure 25:
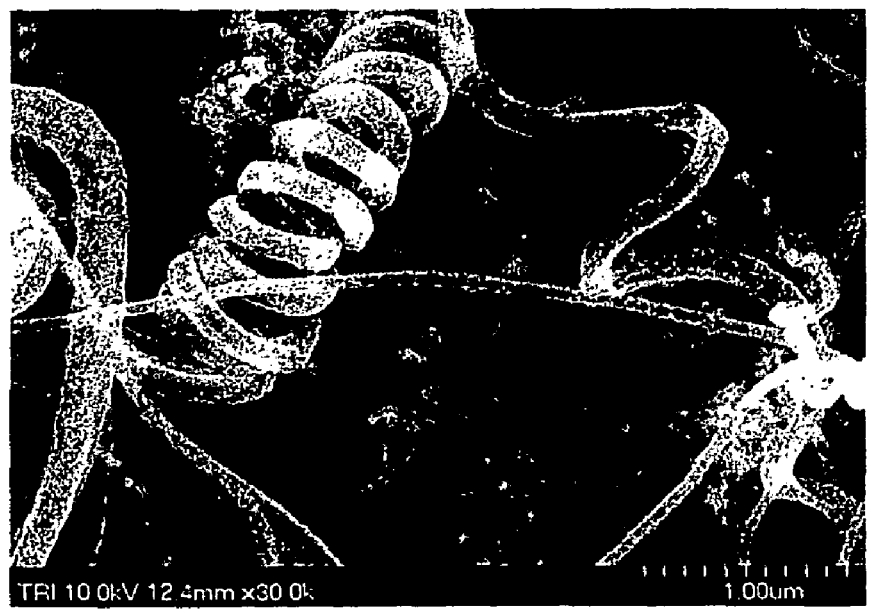
Figure 26:
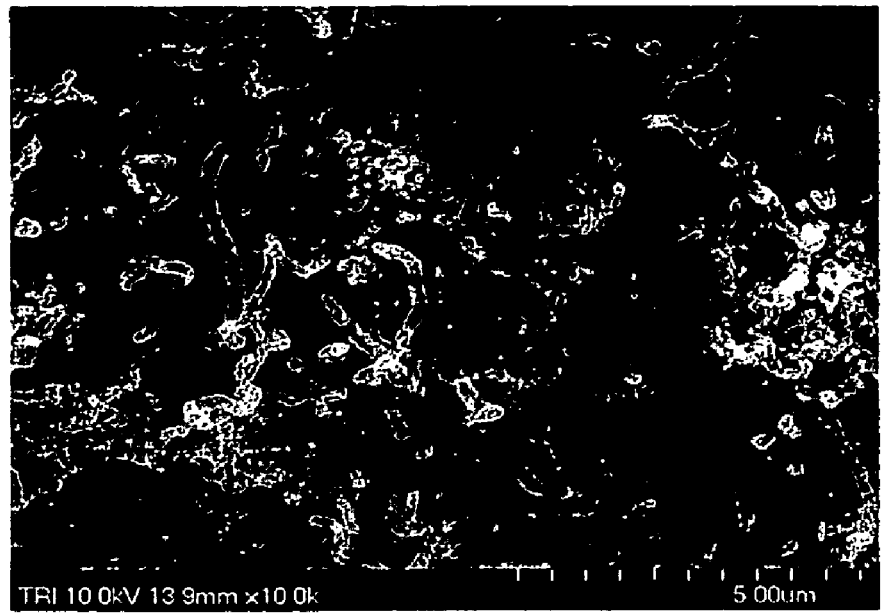
FIG. 26 shows electron microscope images of the generated materials in a CNC generation experiment with a catalyst Fex—Cry—Snz—O having a different composition ratio than that of FIG. 25.
Figure 26:

In addition, experiments for CNC generation were carried out in order to check the relationship between iron.tin and chromium in the Fex—Cry—Snz—O catalyst composition. FIGS. 25 and 26 show SEM images of portions of the results of these experiments for CNC generation. FIG. (25a) shows a case where the composition ratio of Cr was set to 0.3 and 1 while fixing Fe:Sn=3:0.1. FIG. (25b) is an enlarged image of FIG. (25a). FIG. 26 shows SEM images at a magnification of 30,000 times. It can be seen from these experiments that coils grew on portions of the catalyst in the case where y=1 for Cr when x=3 and z=0.1 in the proportional distribution of (x, y, z) in Fex—Cry—Snz—O. It can be seen from these SEM images that coils in thick spiral form can be formed when y=0.3 in the case where Cr is contained, and coils with a small pitch can be formed when y=1.

(4) Description of Porous Carrier Catalyst for Carrying Catalyst

Finally, a method for synthesizing carbon nanocoils more efficiently using the carbide catalyst, metal catalyst and oxide catalyst is described. That is, these catalysts are carried by a porous carrier having an innumerable number of pores, and this porous carrier, which carriers the catalysts, is used as a catalyst for synthesizing carbon nanocoils.

The present inventors concluded that the effects of two or more types of metal elements are important in order to synthesize carbon nanocoils with high yield, and thought up a synthesizing system for carbon nanocoils according to which the size of the coil diameter can be made uniform, the outer diameter of carbon nanocoils can be made uniform, and in addition, carbon nanocoils can be generated with high yield. That is, a method for synthesizing carbon nanocoils using a catalyst carrier where a porous carrier carries metal compounds was proposed.

EXAMPLE 6

CNC Growth Using Catalysts Carried by Zeolite

A variety of porous substances can be utilized as the porous carrier that is used in the present invention. Zeolite, ALPO (aluminophosphate), SAPO (silica aluminophosphate), resin absorbents, porous ceramics, molecular sieves, metal oxide based porous bodies, silica porous bodies and carbon based porous bodies, for example, can be cited. In addition to these, other known porous substances may be used. In particular, zeolite having a structure that is stable in baking at a high temperature is optimal for the present invention. Y type zeolite was utilized for the embodiment of the present invention.

Figure 27:
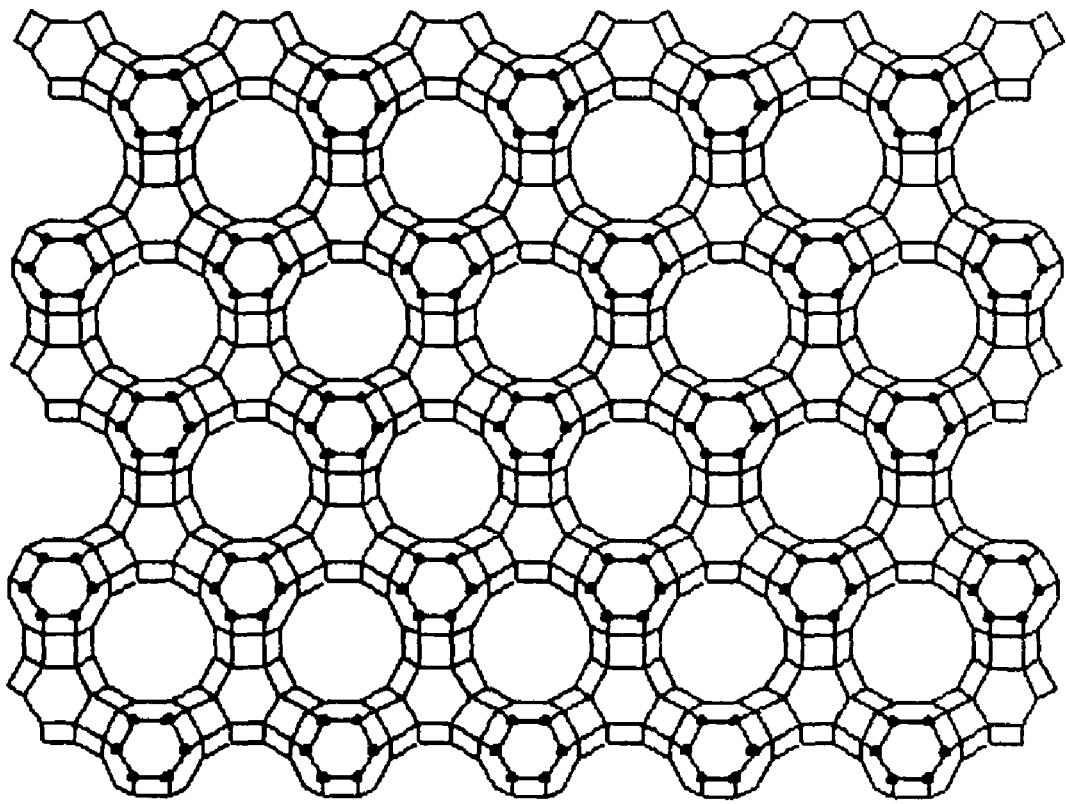
FIG. 27 is a diagram showing the crystal structure of a Y type zeolite.

FIG. 27 is a diagram showing the crystal structure of Y type zeolite. Zeolite is a general name for crystal porous aluminosilicates, where basic units made of $(SiO_4)^{4-}$ and $(AlO_4)^{5-}$ having a tetrahedral structure are combined three-dimensionally. The composition ratio is: $SiO_2$: 99.6 wt %, $Al_2O_3$: 0.4 wt % and $Na_2O$<0.01 wt %, and zeolite usually has a great number of pores, and these pores have diameters of an approximately uniform value, and therefore, zeolite is utilized as a molecular sieve for sorting molecules by size.

Multiple element-based catalysts, such as Fe.In.Sn-based catalysts, Fe.Al.Sn-based catalysts, Fe.Cr.Sn-based catalysts, Fe.Sn-based catalysts, Co.Sn-based catalysts and Ni.Sn-based catalysts can be utilized as the catalyst that is used for the present invention. Metal compounds that contain Fe, that is, iron oxides, iron organic compounds and the like can be cited as the Fe-based catalysts. Iron carboxylate, iron carbonyl, iron carbonyl derivatives, iron nitrosyl and iron nitrosyl derivatives, for example, can be cited as the iron organic compounds.

Metal compounds that contain indium, that is, indium oxides, and indium organic compounds can be cited as the In-based catalysts. Trimethyl indium, triphenyl indium, indium octylate and indium carboxylate, for example, can be cited as the indium organic compounds, and tin oxides and tin organic compounds, such as triethyl tin, trimethyl tin tetraphenyl tin, tin octylate and tin carboxylate can be cited as the Sn-based catalysts. Metal compounds and metal organic compounds that contain Co and Ni can be cited as the Co or Ni-based catalysts. Cobalt compounds, cobalt carbonyl, nickel compounds, nickel carbonyl and coordination complex of these, for example, can be cited. From among these metal organic compounds, metal organic compounds that are soluble in organic solvents are particularly useful. As for other metal elements, such as Al or Cr, metal compounds and metal organic compounds which are similar to the above can be utilized.

A liquid phase method and a gas phase method exist as a method for making a porous carrier, such as zeolite, carry metal compounds that contain the number of types of metal elements. In the case of a liquid phase method, a plurality of types of metal compounds are dissolved in a solvent, and a porous carrier is immersed in this solvent, so that the solvent is absorbed. The method for absorption is not particularly limited, and a variety of methods, such as simple natural absorption through immersion, can be used. Ion exchange can be carried out on an inorganic salt or an organic salt of the metal elements, for example, so that the solvent can be absorbed by a porous carrier having ion exchanging functions. In addition, the solvent can be absorbed through natural absorption in a porous carrier which does not have ion exchanging functions. The solution may be stirred, ultrasonic processing may be carried out, or a process may be carried out using a homogenizer or an atomizer, in order to make the solution be absorbed with high efficiency. The porous carrier that has absorbed the solvent is baked after being dried naturally, so as to form a catalyst carrier made of a plurality of types of metal elements. It is appropriate for the baking temperature to be 400° C. to 700° C., and for the baking time to be approximately 1 hour. In the case where the porous carrier is baked in an oxidizing atmosphere, the organic matter is burned out, and the metal compounds are changed to metal oxides. During baking in a non-oxidizing atmosphere, a variety of metals are generated in pores, in such a manner that the organic matter is removed, and the matter in the pores is changed to metals.

Acetone, toluene, alcohol and the like can be cited as the organic solvent that is used in the present invention. In particular, an organic solvent for dissolving organic compounds that contain metal elements, such as Fe, In, Sn, Co, Ni, Al and Cr, is useful.

In the case of a gas phase method, metal compound gases that contain the number of types of metal elements are introduced into a process chamber so as to be absorbed by a porous carrier, such a zeolite, which is placed within the process chamber. The porous carrier by which the metal compound gases are absorbed is baked after being naturally dried, so as to form a catalyst carrier made of a plurality of types of metal elements. Mixed gases made of inorganic matter or organic matter that contains he metal elements can be cited as the metal compound gases. Gases of inorganic salts or organic salts of the metal elements can be utilized. These mixed gases can be easily absorbed by appropriately adjusting the physical conditions within the process chamber in accordance with the gas phase method. In particular, application of pressure, heat and the like is effective.

Next, a method for generating carbon nanocoils using a catalyst carrier, such as zeolite, that carries catalysts is described. First, the catalyst carrier is placed in a reactor, and the reactor is heated to a predetermined temperature while making an inert carrier gas, such as nitrogen, helium or argon, flow through. When the temperature reaches the predetermined temperature, a carbon containing gas is made to flow through the reactor together with the carrier gas. Though it is desirable for the amount of flow of the carbon containing gas to be 100 cm$^3$ to 1000 cm$^3$ per 1 g of the catalysts, the amount can be appropriately adjusted. The time during which the carbon containing gas flows through the reactor depends on the used gases, and is, for example, approximately 5 minutes to 100 minutes, though this reaction time can also be freely adjusted. Methane, ethane, a variety of types of alkane, alkene, alkyne, aromatic hydrocarbons and the like can be used as the carbon containing gas that is introduced, and in particular, acetylene, allylene, benzene and the like are effective. From among these, acetylene provides the highest yield.

The heating temperature for thermally decomposing the carbon containing gas is set to a temperature that is no lower than the temperature where the carbon compound gas is decomposed by the working effects of the catalysts. Though a range from approximately 600° C. to 800° C., for example, can be selected as the temperature for synthesizing carbon nanocoils using acetylene, the temperature is not limited to this temperature range, and may be a temperature that is no lower than the temperature where the carbon containing gas is decomposed by the catalysts, and can be freely set, taking the efficiency of synthesis into account.

After the completion of reaction, the carrier gas is made to flow through the reactor, which is then cooled to room temperature. The porous carrier is taken out from the reactor, and carbon nanocoils are separated from the porous carrier. There are a variety of methods for separation, including a method where the catalyst carrier is immersed in, for example, hydrofluoric acid, hydrochloric acid, nitric acid or a sodium hydroxide solution, so that the porous carrier is dissolved and carbon nanocoils can be taken out. In this manner, in the case where a plurality of types of metal catalysts or metal oxide catalysts are carried by a porous carrier and carbon nanocoils are generated, carbon nanocoils having a uniform wire diameter and a uniform coils diameter can be mass-produced with high yield and with ease.

EXAMPLE 6-1

Baking Temperature of 650° C.)

HSZ-390HUA zeolite, made by Tosoh Corporation, was utilized, of which the mol ratio ($SiO_2/Al_2O_3$) was no less than 200, the specific surface area (BET) was 660 m$^2$/g, the average particle diameter (D50) was 6.5 μm, and the porous distribution had peaks at 0.2 nm and 10 nm. 0.5 g of this zeolite was weighed, spread on a ceramic board, and dried naturally for 30 minutes at 100° C. A solution was prepared by dissolving 151.94 g of $Fe(NO_3)_3.9H_2O$, 42.11 g of $In(NO_3).3H_2O$ and 1.30 g of $SnC_2O_4$ in 600 ml of ion exchange water. 0.5 g of the zeolite was put into 40 ml of this solution, which was stirred for 30 minutes with ultrasonic waves. This was left for 24 hours, so that zeolite settled. The supernatant was removed, and the settled zeolite and the solution were taken out onto a ceramic board with a pipet, and naturally dried. The naturally dried zeolite was again dried in the air for 30 minutes at 100° C., and after that, baked for 1 hour at 650° C. in a helium gas. As a result of this baking, an FeInSn oxide catalyst was carried on the surface and in the pores of the zeolite.

This baked zeolite was ground in a mortar, and 0.02 g of the ground matter was put into 3 g of ethanol and dispersed for 15 minutes with ultrasonic waves. This was dropped onto a silicon substrate, which was placed within a quartz tube through which 200 sccm of a helium gas was made to flow, and the temperature in the vicinity of the silicon substrate was raised to 700° C. at a rate of temperature increase of 100° C./5 minutes. After the temperature reached 700° C. (and was held for 10 minutes), acetyl of which the amount of flow was 60 sccm was made to flow for 10 minutes. After that, acetylene was blocked, so that only helium flowed, so as to cool the system to room temperature.

Figure 28:
FIG. 28 shows a scanning electron microscope image of carbon nanocoils which are formed using a catalyst carrier (zeolite) that has been baked at 650° C.

FIG. 28 shows a scanning electron microscope image (at a magnification of 100,000 times) of carbon nanocoils formed by the catalyst carrier (zeolite) which was baked at 650° C. It was ascertained from the photograph that the wire diameter of the generated fibers was 20 nm to 25 nm. It was confirmed that a great number of carbon nanocoils that were grown had the same wire diameter, and that the coil diameters were approximately uniform.

Figure 29:
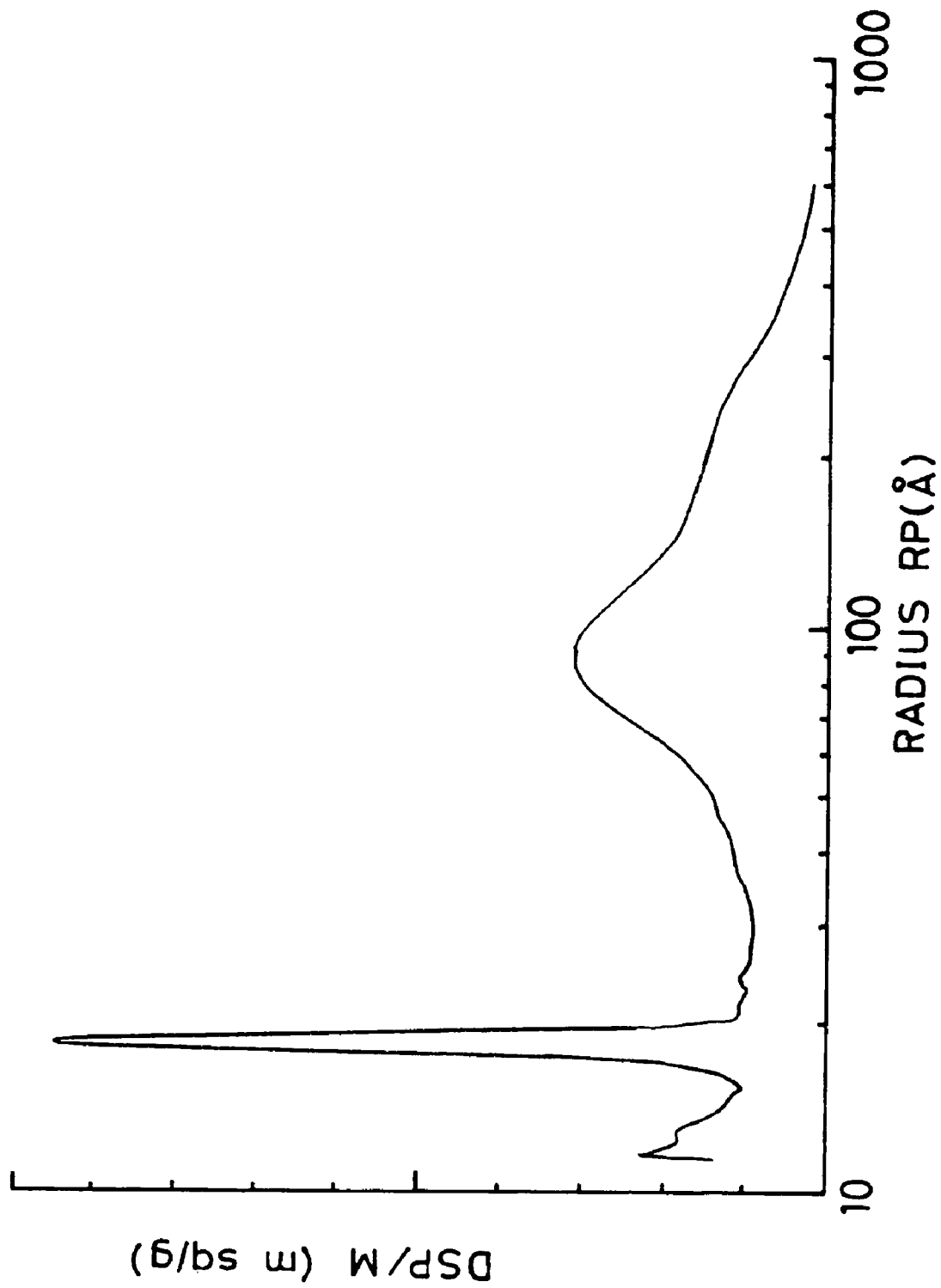
FIG. 29 is a graph showing the distribution of pores of the utilized zeolite.

FIG. 29 shows a distribution graph of the pores of the utilized zeolite. The longitudinal axis shows the surface area per g (sq/g), and the lateral axis shows the diameter (angstrom). As can be seen in this graph, the catalysts were mainly carried by pores of which the radius was in the vicinity of 10 nm, and carbon nanocoils were formed. It was confirmed that the catalysts were not carried by pores of which the radius is 0.2 nm, which corresponds to the smaller peak.

EXAMPLE 6-2

Baking Temperature of 700° C.

The catalysts were carried by zeolite having the same composition as that of Example 1, and in accordance with the same method. In addition, the zeolite was dried in the same manner as in Example 1, and the dried zeolite was baked for 1 hour at a temperature of 700° C. in a helium gas. This catalyst carrier was used, and carbon nanocoils were generated using the same method as in Example 1.

Figure 30:
FIG. 30 shows a scanning electron microscope image of carbon nanocoils which are formed using a catalyst carrier (zeolite) that has been baked at 700° C.

FIG. 30 is a scanning electron microscope image (at a magnification of 100,000 times) of carbon nanocoils generated due to the catalyst carrier (zeolite) that was baked at 700° C. It can be seen that the number of grown carbon nanocoils was relatively great in Example 2, in comparison with Example 1. It can be seen that the wire diameter of carbon nanocoils was 20 nm to 25 nm, which is the same as in Example 1.

Figure 31:
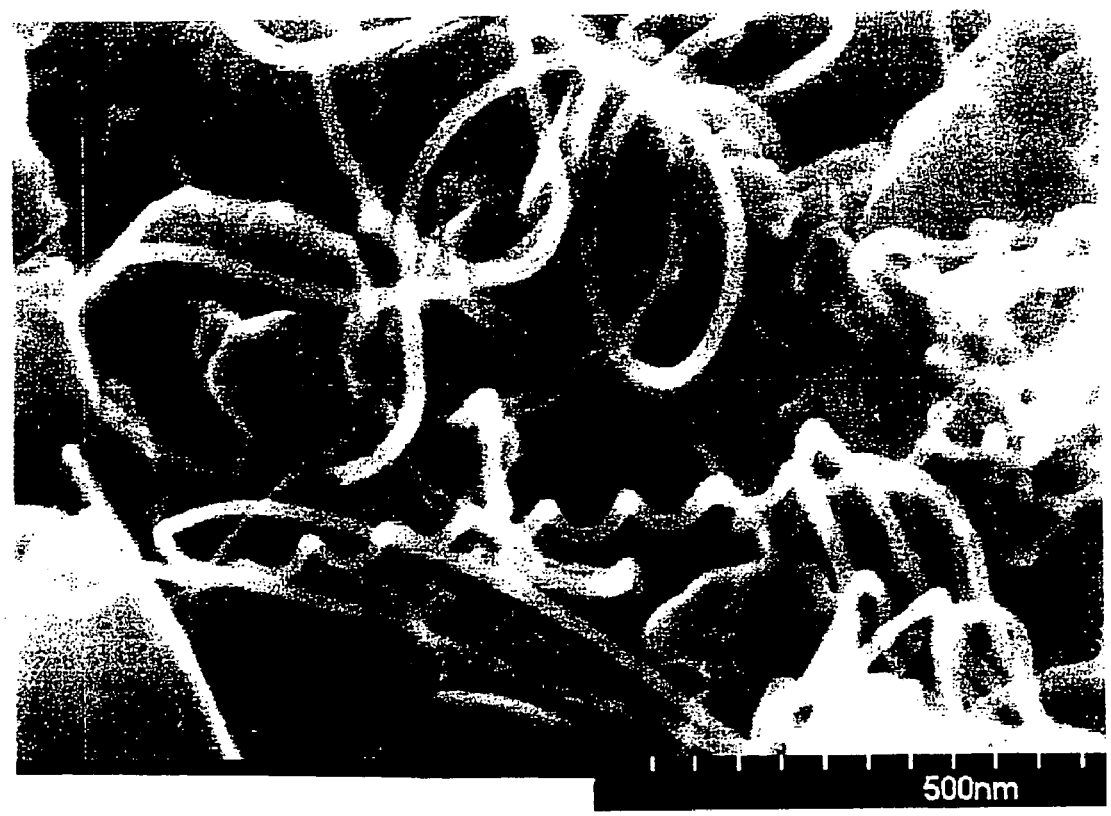
FIG. 31 is an image showing an enlarged portion of FIG. 4.

FIG. 31 is an enlarged image of FIG. 30. It can be seen from FIG. 31 that the coil diameter (outer diameter of coils) of carbon nanocoils is 50 nm to 70 nm. When the wire diameter and the coil diameter (outer diameter of coils) of these carbon nanocoils were measured, the same results were obtained as in Example 2. That is, the wire diameter of the formed carbon nanocoils was 20 nm to 25 nm, and the coil diameter (outer diameter of coils) was 50 nm to 70 nm. Accordingly, it was proven that carbon nanocoils can be formed so as to have a uniform wire diameter according to the present invention, and as a result, carbon nanocoils can be generated so as to have an approximately uniform coil diameter (outer diameter of coils).

The present invention is not limited to the modes and embodiments, and a variety of modifications, a change in design and the like, in a range that does not deviate from the technical idea of the present invention are included within the technical scope thereof.

INDUSTRIAL APPLICABILITY

According to the first mode of the present invention, it was discovered, as can be seen in an Fe.In.Sn catalyst, that a transition metal element and another element coexist, and thereby, carbon nanocoils are generated, and in addition, this catalyst becomes a carbide, and thereby, carbon nanocoils can be efficiently grown, and the present invention was completed. The catalyst nuclei are made of metal carbide of the present invention.

According to the second mode of the present invention, a carbide catalyst that is formed when a transition metal element, In and C combine is used as a useful catalyst for synthesizing carbon nanocoils.

According to the third mode of the present invention, a carbide catalyst is proposed, where the composition ratio of transition metal element A to In to C is shown by x, y and z in the carbide catalyst and this composition ratio x, y and z can be adjusted to a desired value.

According to the fourth mode of the present invention, carbon nanocoils can be synthesized with high efficiency by using an $Fe_3InC_{0.5}$ carbide catalyst. This carbide catalyst is a catalyst for synthesizing carbon nanocoils which was discovered for the first time by the present inventors, and of which the composition formula is specified, and is a true catalyst for growing carbon nanocoils.

According to the fifth mode of the present invention, carbon nanocoils (CNC) can be efficiently synthesized using a catalyst for synthesizing carbon nanocoils where one or more types of other elements are added to the carbide catalyst.

According to the sixth mode of the present invention, carbon nanocoils can be grown in a short period of time using an Fe.In.Sn based carbide catalyst which has high efficiency as a catalyst, and therefore, there is an advantage that the operation efficiency of the reaction apparatus can be increased. In addition, in the case where this carbide catalyst is formed as fine particles, the diameter of carbon nanocoils can be controlled by controlling the diameter of the fine particles of the carbide catalyst, and the synthesis of coils having an arbitrary diameter becomes possible.

According to the seventh mode of the present invention, a carbide catalyst is proposed, where the composition ratio of Fe to In to C to Sn is shown by x, y, z and w in the carbide catalyst and this composition ratio x, y, z and w can be adjusted to a desired value.

According to the eighth mode of the present invention, a carbide catalyst for allowing for efficient synthesis of carbon nanocoils can be provided, by adjusting the composition ratio v and w to an optimal value in a carbide catalyst for synthesizing carbon nanocoils, which is represented by the composition formula $Fe_3In_{1-v}C_{0.5}Sn_w$ ($1 > v \geq 0$, $w \geq 0$).

According to the ninth mode of the present invention, a carbide catalyst having the first intensity peak in the vicinity of 39.6° and the second intensity peak in the vicinity of 46.3° is proposed as a catalyst for synthesizing carbon nanocoils.

According to the tenth mode of the present invention, a carbide catalyst that is formed when a transition metal element, Sn and C combine becomes an effective catalyst for synthesizing carbon nanocoils. Concrete selection of an appropriate transition metal can be carried out freely, taking the synthesizing efficiency, the conditions for synthesis and the like into account.

According to the eleventh mode of the present invention, a carbide catalyst is proposed, where the composition ratio of transition metal element A, Sn and C is represented by x, y and z, and this composition ratio x, y and z can be adjusted to a desired value.

According to the twelfth mode of the present invention, carbon nanocoils can be synthesized with high efficiency by utilizing an $Fe_3SnC$ carbide catalyst. This carbide catalyst is a catalyst for synthesizing carbon nanocoils which was discovered by the present inventors, and of which the composition formula is specified, and is a catalyst for growing carbon nanocoils.

According to the thirteenth mode of the present invention, a catalyst for synthesizing carbon nanocoils where one or more types of other elements are added to the carbide catalyst is proposed, so that carbon nanocoils can be synthesized with high efficiency.

According to the fourteenth mode of the present invention, the element A is a carbide catalyst of Fe, and a catalyst for synthesizing carbon nanocoils which exhibits a diffraction intensity distribution having the first intensity peak in the vicinity of approximately 40° is proposed.

According to the fifteenth mode of the present invention, a catalyst that includes at least one or more types of transition metal elements and elements Al and Sn is applied to synthesis in accordance with a CVD method or the like, so that carbon nanocoils can be efficiently synthesized, which can contribute to industrial mass production of carbon nanocoils.

According to the sixteenth mode of the present invention, a catalyst for synthesizing carbon nanocoils where a transition metal element, Al and Sn exist as oxides is proposed, which cannot further be oxidized, even when utilized in the air, and thus, a stable catalyst can be provided.

According to the seventeenth mode of the present invention, a catalyst for synthesizing carbon nanocoils is provided, where $y \leq 1$ and $z \leq 3$ when $x=3$ in the proportional distribution of (x, y, z) in the composition ratio (mol ratio) of (Fex—Aly—Snz).

According to the eighteenth mode of the present invention, a catalyst that includes at least, one or more types of transition metal elements and elements Cr and Sn is applied to synthesis in accordance with a CVD method or the like, so that carbon nanocoils can be efficiently synthesized, which can contribute to industrial mass production of carbon nanocoils.

According to the nineteenth mode of the present invention, a transition metal element, chromium and tin are used in the form of a transition metal oxide, aluminum oxide and tin oxide, so as to form a catalyst for synthesizing carbon nanocoils, and therefore, these cannot be further oxidized when used in the air, and thus, a stable catalyst can be provided.

According to the twentieth mode of the present invention, a catalyst for synthesizing carbon nanocoils is provided, where $y \leqq 1$ and $z \leqq 3$ when $x=3$ in the proportional distribution of (x, y, z) in the composition ratio (mol ratio) of (Fex—Cry—Snz).

According to the twenty-first mode of the present invention, a catalyst for synthesizing carbon nanocoils is provided, where $y \leqq 9$ and $z \leqq 3$ when $x=3$ in the proportional distribution of (x, y, z) in (Fex—Iny—Snz).

According to the twenty-second mode of the present invention, iron, indium and tin are used in the form of iron oxide, indium oxide and tin oxide, so as to form a catalyst for synthesizing carbon nanocoils, and therefore, these cannot be further oxidized when used in the air, and thus, a stable catalyst can be provided.

According to the twenty-third mode of the present invention, there is an advantage that the coil wire diameter and the coil outer diameter of carbon nanocoils can be controlled to desired uniform values by adjusting the diameter of the carbide fine particles.

According to the twenty-fourth mode of the present invention, it becomes possible to mass-produce a carbide catalyst that contains elements of (a transition metal element, In, C) or (a transition metal element, Sn, C) from a thin film that contains (a transition metal element, In) or (a transition metal element, Sn). The transition metal elements are of a variety of types, as described above, and a carbide catalyst that contains an arbitrary transition metal element can be mass-produced inexpensively.

According to the twenty-fifth mode of the present invention, a carbide catalyst that contains elements of (a transition metal element, In, C) or (a transition metal element, Sn, C) can be synthesized from fine particles that contain (a transition metal element, In) or (a transition metal element, Sn).

According to the twenty-sixth mode of the present invention, fine particles of a carbide catalyst of (a transition metal element, In, C) or (a transition metal element, Sn, C) can be synthesized from a solution or dispersion liquid of (a transition metal element and an In compound) or (a transition metal element and an Sn compound). It is also possible to utilize a variety of compounds, in addition to oxides, as the material to be carbonized.

According to the twenty-seventh mode of the present invention, fine particles of (a transition metal element, In) or (a transition metal element, Sn) are generated in accordance with a solution method, and these fine particles are carbonized so as to synthesize fine particles of a carbide catalyst of (a transition metal element, In, C) or (a transition metal element, Sn, C). There is an advantage that a large amount of fine particles of a carbide catalyst can be synthesized.

According to the twenty-eighth mode of the present invention, it become possible to mass-produce fine particles of a target carbide catalyst through a chemical gas reaction using a gas having a catalyst material component, which can contribute to reduction in the price of the catalyst.

According to the twenty-ninth mode of the present invention, a catalyst for synthesizing carbon nanocoils which includes transition metal element A and can be represented by $A_x In_y C_z$ or $A_x Sn_y C_z$ can be synthesized. A carbide catalyst of which the composition ratio x, y and z can be adjusted to a desired value is proposed.

According to the thirtieth mode of the present invention, a catalyst for synthesizing carbon nanocoils where the compound formula of the carbide catalyst is represented by at least $Fe_3 In C_{0.5}$ or $Fe_3 SnC$ is proposed. Carbides made of $Fe_3 In C_{0.5}$ and $Fe_3 SnC$ as catalysts for synthesizing nanocoils are substances that were discovered by the present inventors before anyone else in the world.

According to the thirty-first mode of the present invention, a synthesizing method of a catalyst for synthesizing carbon nanocoils is provided, by adding one or more elements to the carbide catalyst. The properties of the catalyst can be adjusted by adding an appropriate element.

According to the thirty-second mode of the present invention, a catalyst for synthesizing carbon nanocoils where a carbide catalyst or/and an oxide catalyst for synthesizing carbon nanocoils are carried by a porous carrier is provided. The wire diameter of carbon nanocoils and the coil diameter can be made uniform. Porous carriers have a variety of types of forms, for example, block form, sheet form, plate form, particle form, fine particle form and ultra-fine particle form.

According to the thirty-third mode of the present invention, a catalyst where any of a variety of types of catalysts discovered by the present inventors is carried by a porous carrier is implemented, and there is an advantage that carbon nanocoils can be synthesized with high efficiency.

According to the thirty-fourth mode of the present invention, a catalyst where a metal catalyst discovered by the present inventors is carried by a porous carrier is implemented, and there is an advantage that carbon nanocoils can be synthesized with high efficiency.

According to the thirty-fifth mode of the present invention, a catalyst for synthesizing carbon nanocoils where a two element based or three element-based catalyst is carried by a porous carrier is provided, and it becomes possible to freely adjust the efficiency of generation.

According to the thirty-sixth mode of the present invention, a catalyst for synthesizing carbon nanocoils, where the transition metal element is one or more types of elements selected from among Fe, Co and Ni, is provided, and makes it possible to mass-produce carbon nanocoils, which can contribute to reduction in the price.

According to the thirty-seventh mode of the present invention, zeolite, aluminophosphate, silica-aluminophosphate, meso-porous bodies, porous ceramics, molecular sieves, metal oxide based porous bodies, silica-porous bodies and carbon based porous bodies can be selected as the porous carrier.

According to the thirty-eighth mode of the present invention, a catalyst can be provided by immersing a porous carrier in a solvent, so that catalysts for synthesizing carbon nanocoils are uniformly absorbed by the same pore of the porous carrier.

According to the thirty-ninth mode of the present invention, a catalyst for synthesizing carbon nanocoils, where fine particles of a catalyst are carried by porous carriers in a space is provided. Carbon nanocoils can be synthesized efficiently and inexpensively by making porous carriers absorb fine particles of a catalyst for synthesizing carbon nanocoils in accordance with this method.

According to the fortieth mode of the present invention, a catalyst for synthesizing carbon nanocoils which has durability can be provided by baking a porous carrier that carries fine particles of a catalyst.

According to the forty-first mode of the present invention, carbon nanocoils can be synthesized by using any of the variety of types of catalysts of the present invention and making the carbon compound gas flow so as to make contact with this catalyst. Carbon nanocoils can be generated with high efficiency on the surface of the catalyst, and industrial mass production of carbon nanocoils can be implemented.

According to the forty-second mode of the present invention, a two-stage sequential synthesizing method of mass producing carbon nanocoils is provided by carbonizing a non-carbide catalyst during a reaction process, and immediately after this, decomposing a carbon compound gas using this carbide catalyst in a heated state.

According to the forty-third mode of the present invention, a two-stage sequential synthesizing method is provided by changing a catalyst precursor substance that contains a transition metal element and Sn into a carbide catalyst, and immediately after this, mass producing carbon nanocoils.

According to the forty-fourth mode of the present invention, a two-stage sequential synthesizing method is provided by changing a catalyst precursor substance that contains a transition metal element, In and Sn into a carbide catalyst, and immediately after this, mass producing carbon nanocoils.

According to the forty-fifth mode of the present invention, carbon nanocoils can be generated with high density on a catalyst film. There is an advantage that carbon nanocoils can be freely mass-produced by controlling the diameter of fine particles of the catalyst.

According to the forty-sixth mode of the present invention, a synthesizing method of carbon nanocoils where a carbon compound gas is decomposed by fine particles of a catalyst so that carbon nanocoils are grown in a floating state is provided. The time for growing carbon nanocoils can be relatively easily controlled, and the size of carbon nanocoils can be easily controlled.

According to the forty-seventh mode of the present invention, a powder of fine particles of a catalyst is deposited in a rotary kiln, and the rotary kiln is rotated while a carbon compound gas is made to flow through, and thus, the catalyst powder becomes of a stirred state, and carbon nanocoils can be mass-produced with the fine particles of the catalyst as catalyst nuclei.

According to the forty-eighth mode of the present invention, inexpensive carbon nanocoils that are synthesized in accordance with any of the synthesizing methods for carbon nanocoils are provided. In addition, carbon nanocoils having a uniform wire diameter and a uniform coil outer diameter can be provided. These carbon nanocoils having a uniform wire diameter and a uniform outer diameter can be utilized in order to synthesize high quality nano-substances, such as nano-springs, nano-machines, electromagnetic wave absorbers, electron emitters, nano-electron devices and hydrogen occluding bodies, so as to meet the requirements of various fields.

The invention claimed is:

1. A catalyst for synthesizing carbon nanocoils having an outer diameter of no greater than 1000 nm in accordance with a chemical vapor deposition method, wherein
this catalyst is a carbide catalyst that contains at least one or more types of transition metal elements, In, Sn, and C, and
in the case where powder X ray diffraction measurement is carried out with a diffraction angle of 2θ, the first intensity peak appears at approximately 40° in the diffraction intensity distribution, and the second intensity peak appears at approximately 46°.

2. The catalyst for synthesizing carbon nanocoils according to claim 1, wherein said catalyst is carried by a porous carrier.

3. A catalyst for synthesizing carbon nanocoils having an outer diameter of no greater than 1000 nm in accordance with a chemical vapor deposition method, wherein
this catalyst is a carbide catalyst that contains at least one or more types of transition metal elements, In, Sn, and C, and
a compound formula for said carbide catalyst is represented by $Fe_3In_{1-v}C_{0.5}Sn_w$ ($1>v\geq0$, $w>0$).

4. The catalyst for synthesizing carbon nanocoils according to claim 3, wherein said catalyst is carried by a porous carrier.

5. A catalyst for synthesizing carbon nanocoils having an outer diameter of no greater than 1000 nm in accordance with a chemical vapor deposition method, wherein
this catalyst is a carbide catalyst that contains at least one or more types of transition metal elements, In, Sn, and C, and
one or more types of other elements are added to said carbide catalyst.

6. The catalyst for synthesizing carbon nanocoils according to claim 5, wherein said catalyst is carried by a porous carrier.

7. A catalyst for synthesizing carbon nanocoils having an outer diameter of no greater than 1000 nm in accordance with a chemical vapor deposition method, wherein this catalyst includes at least one or more types of transition metal elements and elements Al and Sn, wherein said transition metal elements are Fe and $y\leq1$ and $z\leq3$ when $x=3$ in a proportional distribution of (x, y, z) in a compound ratio (mol ratio) of a compound (Fex.Aly.Snz).

8. The catalyst for synthesizing carbon nanocoils according to claim 7, wherein said catalyst is carried by a porous carrier.

9. A catalyst for synthesizing carbon nanocoils having an outer diameter of no greater than 1000 nm in accordance with a chemical vapor deposition method, wherein this catalyst includes at least one or more types of transition metal elements and elements Cr and Sn, wherein said transition metal elements are Fe and $y\leq1$ and $z\leq3$ when $x=3$ in a proportional distribution of (x, y, z) in a compound ratio (mol ratio) of a compound (Fex.Cry.Snz).

10. The catalyst for synthesizing carbon nanocoils according to claim 9, wherein said catalyst is carried by a porous carrier.

* * * * *